United States Patent
Takaku et al.

(10) Patent No.: US 12,492,415 B2
(45) Date of Patent: Dec. 9, 2025

(54) LIPID PRODUCTION CONTROL FACTOR FOR OLEAGINOUS YEAST

(71) Applicants: THE NIIGATA INSTITUTE OF SCIENCE AND TECHNOLOGY, Niigata (JP); FUJI OIL CO., LTD., Izumisano (JP)

(72) Inventors: Hiroaki Takaku, Niigata (JP); Harutake Yamazaki, Niigata (JP); Hideo Araki, Tsukubamirai (JP); Sachiyo Aburatani, Tokyo (JP); Katsuro Yaoi, Tsukuba (JP)

(73) Assignees: NIIGATA INSTITUTE OF SCIENCE AND TECHNOLOGY, Niigata (JP); FUJI OIL CO., LTD., Osaka (JP)

( * ) Notice: Subject to any disclaimer, the term of this patent is extended or adjusted under 35 U.S.C. 154(b) by 421 days.

(21) Appl. No.: 17/802,694

(22) PCT Filed: Feb. 2, 2021

(86) PCT No.: PCT/JP2021/003621
§ 371 (c)(1),
(2) Date: Aug. 26, 2022

(87) PCT Pub. No.: WO2021/171925
PCT Pub. Date: Sep. 2, 2021

(65) Prior Publication Data
US 2023/0265469 A1    Aug. 24, 2023

(30) Foreign Application Priority Data
Feb. 28, 2020  (JP) .................... 2020-032655

(51) Int. Cl.
| | | |
|---|---|---|
| C12N 5/10 | (2006.01) | |
| C12N 1/16 | (2006.01) | |
| C12N 15/90 | (2006.01) | |
| C12P 7/6409 | (2022.01) | |

(52) U.S. Cl.
CPC .............. C12P 7/6409 (2013.01); C12N 1/16 (2013.01); C12N 15/905 (2013.01)

(58) Field of Classification Search
CPC ........ C07K 14/39; C12N 5/10; C12N 15/905; C12N 1/16
See application file for complete search history.

(56) References Cited

FOREIGN PATENT DOCUMENTS

JP        2019146543 A    9/2019

OTHER PUBLICATIONS

Metabolism and Regulation of Glycerolipids in the Yeast *Saccharomyces cerevisiae*. Henry A, Susan et al. Genetics, vol. 190, 317-349 Feb. 2012 (Year: 2012).*

Liu et al., "Surveying the lipogenesis landscape in Yarrowia lipolytica through understanding the function of a Mga2p regulatory protein mutant", Metabolic Engineering , 2015 , vol. 31 , pp. 102-111.
Search on Aug. 21, 2.IPT/TIG domain / containing protein , Aug. 18, 2017,https://www.uniprot.org/uniprotkb/A0A1E3QE57/entry, Date : Aug. 1, 2015, pp. to Lypomyces starkeyi NRRL Y 11557, Database UniProtKB, accession A0A1E3QE57 [online], [2024 IPT / TIG domain-containing protein—Lypomyces starkeyi NRRL Y-11557, 2017, 5 pages.
Office Action dated Aug. 27, 2024, for corresponding JP Patent Application No. 2020-032655 with English Translation, 10 pages.
Romanauska et al., "Reprogrammed lipid metabolism protects inner nuclear membrane against unsaturated fat", Developmental Cell, Sep. 27, 2021, vol. 56, pp. 2562-2578.
Kandasamy et al., "Regulation of Unsaturated Fatty Acid Biosynthesis in *Saccharomyces*", The Journal of Biological Chemistry, 2004, vol. 279, No. 35, pp. 36586-36592.
Ba et al., "NLStradamus: a simple Hidden Markov Model for nuclear localization signal prediction.", Analysis results using prediction programs of NLS: Nuclear Localization Signal[online], <URL:http://www.moseslab.csb.utoronto.ca/NLStradamus/>, BMC Bioinformatics. Jun. 29, 2009;10(1):202.
Analysis results using cNLS Mapper [online] <URL: https://nls-mapper.iab.keio.ac.jp/cgi-bin/NLS_Mapper_form.cgi>, results dated Nov. 29, 2024, 1 page.
International Search Report for International Application No. PCT/JP2021/003621 dated Apr. 13, 2021, 8 pages Including English Translation.
Takaku, Hiroaki, "The analysis and application of oleaginous yeast for the improvement of fat self-sufficiency ratio in Japan: Important genes relating to lipid biosynthesis in oleaginous yeast", Kagaku t o Seibutsu, 2019, vol. 57, No. 10, pp. 609-615. See the first paragraph of p. 1 of the English translation of the International Search Report for International Application No. PCT/JP2021/003621 dated Apr. 13, 2021 for a concise explanation.
Takaku, Hiroaki, "Modification of fat productivity and fatty acid composition of oleaginous yeast using information science", The 2019 NEDO Smart Cell Project Technology Seminar, Improvement of fat productivity, 2019, https://www.nedo.go.jp/content/100898997.pdf, p. 7. See the first paragraph of p. 2 of the English translation of the International Search Report for International Application No. PCT/JP2021/003621 dated Apr. 13, 2021 for a concise explanation.
Yamazaki et al., "Highly selective isolation and characterization of Lipomyces starkeyi mutants with increased production of triacylglycerol", Applied Microbiology and Biotechnology, 2019, vol. 103, No. 15, pp. 6297-6308.

(Continued)

*Primary Examiner* — Tekchand Saidha
(74) *Attorney, Agent, or Firm* — MH2 TECHNOLOGY LAW GROUP, LLP

(57) ABSTRACT

Lipid production control factors in yeasts are provided. A yeast 115694 gene, a yeast 4888 gene, and a yeast 45559 gene are provided as lipid production control factors.

2 Claims, 15 Drawing Sheets
Specification includes a Sequence Listing.

(56) References Cited

OTHER PUBLICATIONS

Kazama et al., "Identification of genes encoding key enzymes in lipid biosynthesis by gene expression analysis", Abstracts of the Japan Society for Bioscience and Biotechnology Conference (2019 Annual Meeting), 2019, Speech number 3C1p01, 1 page. See the fourth paragraph of p. 2 of the English translation of the International Search Report for International Application No. PCT/JP2021/003621 dated Apr. 13, 2021 for a concise explanation.

Lipomyces starkeyi NRRL Y-11557 hypothetical protein, EMBL-EBI, Sep. 15, 2016, ID ODQ75878, amino acid sequence, 3 pages.

Lypomyces starkeyi NRRL Y-11557 hypothetical protein, EMBL-EBI, Sep. 15, 2016, ID ODQ71662, amino acid sequence, 2 pages.

Kazama et al., "Identification and functional analysis of a novel lipid accumulation regulatory factor of oleaginous yeast Lipomyces starkeyi using comparative genome analysis", Abstracts of the Japan Society for Bioscience and Biotechnology Conference (2020 Annual Meeting), 2020, Speech Number 2A12a04, 1 page. See the first paragraph of p. 3 of the English translation of the International Search Report for International Application No. PCT/JP2021/003621 dated Apr. 13, 2021 for a concise explanation.

Niwayama et al., "Acquirement of a novel lipid production regulatory factor of oleaginous yeast Lipomyces starkeyi using computational approach", Abstracts of the Japan Society for Bioscience and Biotechnology Conference (2020 Annual Meeting), 2020, Speech No. 2A12a05, 1 page. See the second paragraph of p. 3 of the English translation of the International Search Report for International Application No. PCT/JP2021/003621 dated Apr. 13, 2021 for a concise explanation.

Report on prediction of importin a-dependent nuclear localization signals, generated using cNLS Mapper available at https://nls-mapper.iab.keio.ac.jp/cgi-bin/NLS_Mapper_form.cgi as submitted in Third Party Observations dated Jul. 3, 2025 in Japanese counterpart Application No. 2020-32655.

Report on nuclear localization signal prediction, generated using NLStradamus hidden Markov model available at http://www.moseslab.csb.utoronto.ca/NLStradamus/ as submitted in Third Party Observations dated Jul. 3, 2025 in Japanese counterpart Application No. 2020-32655.

"Frequently Asked Questions: How can I interpret confidence metrics to check the accuracy of structures?", AlfaFold Server, https://alphafoldserver.com/faq#how-can-i-interpret-confidence-metrics-to-check-the-accuracy-of-structures as submitted in Third Party Observations dated Jul. 3, 2025 in Japanese counterpart Application No. 2020-32655.

Report on biomolecular structure prediction, generated using AlphaFold 3 model available at https://alphafoldserver.com as submitted in Third Party Observations dated Jul. 3, 2025 in Japanese counterpart Application No. 2020-32655.

* cited by examiner

SEQUENCE LISTING

<160> NUMBER OF SEQ ID NOS: 71

<210> SEQ ID NO 1
<211> LENGTH: 1301
<212> TYPE: PRT
<213> ORGANISM: Lipomyces starkeyi

<400> SEQUENCE: 1

```
Met Asp Pro Leu Met Asp Asn Ala Glu Ala Ser Asp Arg Ala Phe Ala
1               5                   10                  15

Ser Pro Val Phe Tyr Leu Asp Thr Asp Asp Ala Asp Tyr Phe Ala Phe
            20                  25                  30

His Asp Leu Asp Leu Asp Ser Ala Ala Asn Gln Ser Gly Asn Ser Ala
        35                  40                  45

Ser Thr Thr Asn Val Val Asp Pro Phe Asp Glu Met Met Val Asp Gly
    50                  55                  60

Ser Pro Val Ser Met Thr His Arg His Phe Leu Gln Pro Thr Val Met
65                  70                  75                  80

Ser Glu Gln Phe Gly Asp Asn Thr Ser Pro Ser Ser Ser Asn Thr Thr
                85                  90                  95

Pro Val Leu Thr His Asp Glu Asp Asp Ile Glu Asp Glu Glu Asp Asp
```

```
                100                 105                 110
Asp Arg Tyr Met Ala Glu His Phe Asp Phe Asp Ser Ala Thr Thr Pro
            115                 120                 125
His Asn Arg Leu Arg Gly His Arg Glu Gly Leu Thr Ala Asp Pro Ala
            130                 135                 140
Gly Gly Ser Ala Val Ser Gly Ile Thr Ile Arg Ser Ser Asp Ser Asp
145                 150                 155                 160
Ser Ser Leu Ser Ser Val Lys Arg Asp Thr Phe Ser Tyr Pro Pro Ser
                165                 170                 175
Pro Lys Ser Leu Ser Ser Gln His Ser Thr Pro Phe Ser Met Lys Ser
                180                 185                 190
Ala Ser Gln Val Pro Ala Ser Ser Lys Leu Val His Pro Ala Gln Lys
                195                 200                 205
Gln Gln Pro Met Arg Asn Gly Leu Pro Leu Ser Val Arg Asp Ile Thr
            210                 215                 220
Pro Pro Gln His Ser Pro Gly His Thr Pro Pro Thr Ser Leu Ala
225                 230                 235                 240
Asn Gly Asp Ala Asp Asp Ser Ile Tyr Gln Lys Pro His Asp Trp Val
                245                 250                 255
Pro Pro Pro Met Met Pro Asp Phe Asp Pro Leu Asp Trp Leu His Asp
                260                 265                 270
Glu Ala Thr Tyr Arg Leu Ser Val Ser Thr Asp Thr Leu Lys Ser Arg
            275                 280                 285
Val Glu Thr Gln Ile Lys Ala Leu Leu Thr Phe Val Pro Ala Pro Asn
            290                 295                 300
Gln Leu Tyr Met His Leu Pro Ala Thr Thr Ile Ala Lys Pro Arg Gln
305                 310                 315                 320
Gln Leu Arg Lys Thr Phe Thr Ser Asp Pro Lys Thr Leu Glu Leu Asp
                325                 330                 335
Ala Ile Val Val Cys Asp His Asn Arg Tyr Arg Tyr Ile Asn Val Cys
            340                 345                 350
Pro Gly Cys Met Asn Arg Glu Arg Lys Arg Ala Ser Arg Lys Lys Leu
            355                 360                 365
Pro Ser Val Asp Asp Thr His Trp Leu Glu Ser Gln Asp Asn Arg Gly
            370                 375                 380
Ile Met Phe Asn Cys Ala Glu Leu Met Glu Ile Ser Asp Ala Asn Thr
385                 390                 395                 400
Pro Ser Thr Ala Ser Asp Ser Phe Asn Ser Lys Ala Pro Glu Phe Asn
                405                 410                 415
Gly Asp Val Lys His Val Glu Ile Pro Met Arg Ile Pro Cys Tyr Cys
                420                 425                 430
Arg His His Ser Glu Lys Thr Gly Phe Arg Val Tyr Phe Val Ile Lys
            435                 440                 445
Asp His Thr Gly Lys Val Val Ala Arg Thr Phe Thr Glu Pro Ile Met
            450                 455                 460
Ile Thr Asp Asp His Lys Thr Asn Ala Asn Ala Arg Arg Lys Thr
465                 470                 475                 480
Ala Ala Gly Thr Ala Ser Ser Thr His Pro Ala Ser Ser Ala Asn Val
                485                 490                 495
Ser Asp Asn Ser Ser Glu Ser Pro Thr Asn Glu Tyr Gly Phe Ala Glu
                500                 505                 510
Ser Ala Asn Pro Arg Lys Arg Lys Met Ser Pro Ser Ile Gly Arg Thr
                515                 520                 525
```

-continued

```
Gln Ser Thr Ser Val Leu Ser Thr Thr Ser Val Pro Gln Gln Gln
    530                 535                 540

Ser Gln Pro Gln Arg Gly Leu Gln Asn Gly Ser Gln Ala Arg Pro Arg
545                 550                 555                 560

Gln His Ser Thr Thr Ser Ile Leu Ala Gly Ser Gln Pro Glu Pro Phe
                565                 570                 575

Tyr Arg Ala Tyr Asp Glu Ser Asn Phe Asn Thr Arg Ser His Ser Val
            580                 585                 590

Glu Ser Phe Gly Phe Pro Ala Tyr Ser Ser Ser Asn Pro Leu Gln Val
        595                 600                 605

His Gln Gln Leu Gln Gly Gln Gln Met Gln Pro Ala Ala Gly Leu Ser
    610                 615                 620

Pro Leu Ser His Ala Ser Pro Val Leu Ser Asn Ala Ser Thr Pro Glu
625                 630                 635                 640

Ser Thr Val Ser Gly Thr Phe Ser Arg Arg Thr Ser Lys Tyr Ser Thr
                645                 650                 655

Ala Ser Ala Val Ala Ser Val Gln Ser Pro Arg Glu Arg Thr Ser Asn
            660                 665                 670

Ala Glu Leu Glu Cys Pro Ala Leu Gln Arg Leu Ile Pro Thr Glu Gly
        675                 680                 685

Pro Ile Arg Gly Gly Ile Glu Val Thr Leu Leu Gly Thr Ser Phe His
690                 695                 700

Gln Gly Leu Thr Val Met Phe Gly Asp Gln Pro Ala Val Lys Thr His
705                 710                 715                 720

Ile Trp Asn Asp Ser Thr Ile Val Ala Ile Leu Pro Pro Ala Ala Thr
                725                 730                 735

Pro Gly Pro Val Val Arg Leu Arg Ser Ile Ser Glu Ile Ser Ser
            740                 745                 750

Asp Asn Leu Lys Leu Phe Thr Tyr Ile Asp Asp Thr Asp Arg Gln Leu
        755                 760                 765

Met Glu Leu Ala Leu Gln Val Ile Gly Leu Lys Met Thr Gly Arg Leu
770                 775                 780

Glu Asp Ala Arg Gln Ile Ala Met Arg Ile Val Ser Gln Thr Gly Ser
785                 790                 795                 800

Gly Gly Asp Asn Gly Ser Gly Gln Asn Asn Ile Met Ala Ala Thr Thr
                805                 810                 815

Ala Ser Gly Ser Asn Gly Leu Glu Lys Thr Leu Leu Lys Cys Leu Asp
            820                 825                 830

Leu Val Asp Tyr Asn Glu Ser Pro His Lys Val Gln Trp Gln Leu His
        835                 840                 845

Asn Ser Ala Gly Gln Thr Met Leu His Leu Ala Ala Leu Leu Gly Phe
850                 855                 860

Gln Arg Leu Val Ala Ala Leu Leu Ala Arg Gly Ala Ser Tyr Arg Met
865                 870                 875                 880

Lys Asp Ser Ser Gly Tyr Thr Pro Leu His Phe Ala Ala Met Arg Gly
                885                 890                 895

Tyr Arg Glu Ile Val Leu Arg Leu Leu Asn Ser Gly Ala Asp Pro Leu
            900                 905                 910

Ala Arg Ser Val Leu Gly His Thr Val Val Asp Leu Ser Cys Asn Glu
        915                 920                 925

Glu Ile Ser Ala Leu Leu Thr Ser Phe Ile Ala Glu Pro Met Asp Tyr
930                 935                 940
```

```
Gly Thr His Ser Arg Gln His Ser Glu Ile Met His Arg Ala Ser Ser
945                 950                 955                 960

Arg Gln Lys Val Phe Thr Arg Gln Ser Ser Glu Phe Pro Asp Trp Pro
            965                 970                 975

Ser Ser Ser Gly Pro Ser Ser Pro Ala Ala Ser Thr Ser Asp Glu Ile
        980                 985                 990

Glu Tyr Ser Asp Ser Leu Asp Asp Asp Ser Pro Pro Asp Ile Gly Arg
    995                 1000                1005

Ser Arg Leu Asp Glu Asp Gln Asp Glu Ala Pro Leu Ser Met Glu
    1010                1015                1020

Gly Leu Arg Arg Thr Arg Leu Ala Met Asn Ala Ala Pro Ala Glu
    1025                1030                1035

Thr Lys Lys Ala Glu Lys Lys Ser Lys Pro Trp Ser Arg Lys Lys
    1040                1045                1050

Leu Phe Gly Arg Pro Ser Gln Lys Pro Thr Thr Asp Val Leu Asp
    1055                1060                1065

Thr Lys Gly Ser Ser Lys Gln Lys Gln Leu Gln Leu Arg Leu Ala
    1070                1075                1080

Glu Tyr Leu Ala Ser Leu His Glu Gln Thr Val Asn Arg Met His
    1085                1090                1095

Pro Asn Trp His Ala Ala Asn His Phe Met His Asp Ala Phe Thr
    1100                1105                1110

Ser Phe Ser Ser Phe Lys Pro Ala Leu Ala Asn Ile Ala Asn Gln
    1115                1120                1125

His Ser Arg Arg Ala Asn Glu Ile Met Gln Ser Ala Phe Glu Asn
    1130                1135                1140

Ser Trp Phe Ser Asp Tyr Phe Ser Ser Thr Gly Ala Gly Gly Asn
    1145                1150                1155

Lys Asn Asp Asn Ser Ala Pro Pro Ser Tyr Glu Glu Ile Tyr Pro
    1160                1165                1170

Glu Ala Ser Ala Ser Ser Ala Phe Ala His Pro Ser Ala Thr Leu
    1175                1180                1185

Asp Gly Lys Asp Gly Ala Val Arg Ala Ala Thr Leu Gln Asp Glu
    1190                1195                1200

Gln Ser Lys Leu Arg Glu Gln Glu Ile Leu Leu Lys Phe Trp Gln
    1205                1210                1215

Asn Lys Lys Lys Gln Met Arg Asn Asp Leu Met Leu Phe Ala
    1220                1225                1230

Phe Trp Leu Pro Val Leu Cys Val Ile Leu Ala Trp Gly Ala Met
    1235                1240                1245

Ser Phe Phe Gly Ile His Val Leu Asp Tyr Ile Pro Ile Pro Gln
    1250                1255                1260

Lys Leu Val Glu Phe Val Thr Asp Arg Gln Lys Leu Pro Ile Ala
    1265                1270                1275

Asp Pro Gly Arg Ala Leu Gln Val Gly Arg Asp Ile Leu Gly Ala
    1280                1285                1290

Gln Asn Arg Ile Val Leu Val Glu
    1295                1300

<210> SEQ ID NO 2
<211> LENGTH: 3906
<212> TYPE: DNA
<213> ORGANISM: Lipomyces starkeyi

<400> SEQUENCE: 2
```

```
atggacccgt taatggacaa tgctgaagct tccgaccggg cgttcgcgtc accggtcttc      60
tatctcgaca ccgatgatgc cgattacttt gccttccacg acctcgacct tgacagcgcc     120
gcgaaccagt ccgggaacag cgcaagtacg accaatgtgg ttgatccgtt tgatgagatg     180
atggtcgacg gttcgcctgt ttctatgacc caccggcact ttctccagcc gactgttatg     240
tctgaacaat tcggtgataa tacgtcacct tcgtcgtcca atacgacgcc tgttcttact     300
cacgatgaag acgacatcga agatgaggag gacgacgatc gctatatggc cgagcacttt     360
gatttcgatt ccgctaccac gcctcacaat cgcttacgtg gccatcgcga aggattgacc     420
gcagatcccg ctggcggctc tgctgtcagt ggtattacca tacggtcgag cgattcggac     480
tcgtcgttat cgtccgttaa gcgcgacaca ttttcatatc caccatcccc aaagtcattg     540
tcgtcgcaac attctactcc gttctccatg aagtctgcat cgcaagttcc ggcgtcttcc     600
aagcttgttc accccgctca gaaacagcag ccgatgcgaa atggtctacc tctttcagtt     660
cgcgatatta ctccgcccca acattcgcca ggtcacactc cgccacctac aagccttgca     720
aacggcgacg ccgatgattc aatctatcag aagccccacg attgggtgcc gccaccgatg     780
atgccagatt tgatcctct  tgactggctt cacgacgaag ctacgtatcg gctatccgtc     840
tccaccgata ccctcaagtc tcgtgtcgag acgcagatca aagcgttgct tactttcgtg     900
cctgctccga atcaattgta catgcatctt cccgcaacaa caatcgccaa gccaaggcaa     960
cagttgcgga aaacatttac ttcggatcct aagactttgg aattggatgc gattgtcgtg    1020
tgcgaccaca accggtacag atacatcaat gtctgtcccg gatgcatgaa tcgcgaacgg    1080
aaacgggcgt cacggaagaa attgccttct gtggatgaca cgcattggtt agagagtcaa    1140
gataatcgtg gaattatgtt taactgtgcc gagctcatgg aaatttccga tgcaaatacg    1200
ccaagcacgg cttctgattc tttcaattcg aaagctccgg aatttaatgg tgacgtaaag    1260
catgtagaaa tccctatgag aattccatgc tattgcagac atcattctga aagacgggga    1320
ttcagggtgt attttgttat caaagatcac actggaaaag tcgttgcgag acattcaca     1380
gaacccatca tgatcacgga tgatcacaag acgacaaatg cgaatgccag acggaagact    1440
gctgcgggga cggcctcatc cacgcacccg gcctcatctg cgaatgtcag tgataattca    1500
tctgaatccc cgactaatga gtacggtttt gccgaatcgg ccaatccgcg taagaggaag    1560
atgtctccat ctatagggcg cacacagtca actagtgtcc tctcaactac ttcagttcca    1620
cagcaacagc aatcacagcc acagcgcggt ctccagaacg gtagtcaggc gcgacctcgt    1680
caacattcga ctacgtcaat actcgcagga agtcagccgg agccgttttta tcgagcatat    1740
gacgaaagta acttcaacac gcggtcgcac agtgtcgaga gttttggctt ccagcatac    1800
agcagcagca atcctttgca ggtccatcag cagttacagg gtcagcagat gcagccagca    1860
gcaggcctgt cgccattgtc gcatgcgagt cctgtattgt caaatgccag tacgccagaa    1920
tctacggtct cgggcacgtt ttctcgacgg acttcgaagt actccacagc ttccgcagtt    1980
gcgtcggtgc agtcaccgag agagcgtact agcaatgcgg aacttgagtg tcctgcgttg    2040
cagcgattaa ttcctacgga gggcccgatt cgcggtggta tcgaagttac gttgctcggc    2100
acgtcttttcc accaaggatt aactgttatg ttcggcgatc agcctgcggt caaaacacat    2160
atttggaacg acagcacaat tgttgccatt ctaccgcccg ctgctacgcc aggacctgtg    2220
gttgttcgtc tacgaagcat ttccgagatt agcagtgata acttgaagct gttcacctac    2280
attgatgaca ccgatcgaca gttgatggaa ctcgctcttc aagttattgg tttgaaaatg    2340
```

| accggtcgtc tggaagatgc tcgacaaatt gctatgcgta ttgtgagcca gactggaagc | 2400 |
| ggcggcgata acggctcagg gcagaataac atcatggcgg ctaccacagc tagtgggtca | 2460 |
| aatggccttg agaaaacgct attaaagtgc ttggatctag ttgattataa cgagtcccca | 2520 |
| cataaggttc agtggcagtt gcataacagt gctggacaga cgatgctaca tcttgctgcc | 2580 |
| ttgcttggtt tccagagatt ggttgctgcg ctacttgcgc ggggtgcgtc atacagaatg | 2640 |
| aaagatagct ctggatatac cccacttcat tttgctgcta tgcgtggcta ccgcgagatt | 2700 |
| gtgttgcgac tgttgaatag cggcgctgat cctctggcac ggtcggtact tggacatacc | 2760 |
| gtagtcgatc tctcgtgcaa cgaagaaatt cggctctttt gacgagctt cattgccgag | 2820 |
| ccgatggatt atggtacgca ctcgcgacag cattcagaaa tcatgcatcg agcctcatcc | 2880 |
| aggcagaaag tcttcactcg tcagagctca gagtttcctg actggccctc gtcatccggg | 2940 |
| ccttcctcac ctgcggcatc aacgtccgat gaaattgaat actcagattc tttggatgat | 3000 |
| gacagtcctc cagacatcgg acgttctaga ctcgacgaag accaagacga agcaccgctg | 3060 |
| tccatggaag gtctccgtcg aacgcgcctc gcaatgaatg ccgctcctgc ggaaacgaag | 3120 |
| aaggcagaga agaagtctaa gccatggtct cgtaaaaagt tattcggcag gccctcgcag | 3180 |
| aaacccacga ctgatgttct cgataccaaa ggatccagta agcagaaaca gcttcagctt | 3240 |
| cgacttgcag agtacctcgc gtcgctgcat gagcagacag tcaaccggat gcatccgaac | 3300 |
| tggcatgccg cgaaccattt catgcatgat gctttcacgt cgtttcttc gtttaagccg | 3360 |
| gcactcgcaa atattgcgaa tcaacacagc cggcgtgcga acgagattat gcagtccgcc | 3420 |
| tttgagaatt cgtggtttag tgactacttc tcgtcaacag gggcaggtgg gaacaagaat | 3480 |
| gacaatagtg cgccgcctag ttacgaggag atttatcctg aagccagtgc gtcatcagcg | 3540 |
| ttcgcgcatc cgtctgcaac tttgacgggg aaggatggtg cagtccgagc agccacattg | 3600 |
| caagacgagc agtcgaaatt gcgggaacag gaaattttat tgaagttttg gcagaataag | 3660 |
| aagaagaaac agatgagaaa cgatttgatg ttgtttgcgt tctggctccc agttttgtgt | 3720 |
| gtgatattgg catggggagc gatgagtttc tttggaattc atgtactcga ttacatcccg | 3780 |
| attccacaga agcttgtcga attcgtcact gatcgtcaga agcttccaat tgctgatcct | 3840 |
| ggtcgggcac tacaagtcgg gcgtgatata cttggcgcac agaatcggat tgtactagtt | 3900 |
| gagtga | 3906 |

<210> SEQ ID NO 3
<211> LENGTH: 30
<212> TYPE: DNA
<213> ORGANISM: Artificial Sequence
<220> FEATURE:
<223> OTHER INFORMATION: 115694kpnFw

<400> SEQUENCE: 3
ggggtaccat ggacccgtta atggacaatg                                    30

<210> SEQ ID NO 4
<211> LENGTH: 35
<212> TYPE: DNA
<213> ORGANISM: Artificial Sequence
<220> FEATURE:
<223> OTHER INFORMATION: 115694pstRv

<400> SEQUENCE: 4
ttctgcagtc actcaactag tacaatccga ttctg                              35

```
<210> SEQ ID NO 5
<211> LENGTH: 39
<212> TYPE: DNA
<213> ORGANISM: Artificial Sequence
<220> FEATURE:
<223> OTHER INFORMATION: pKSFw Primer

<400> SEQUENCE: 5
gggctgcagg aattcgatat caagcttatc gataccgtc                                39

<210> SEQ ID NO 6
<211> LENGTH: 22
<212> TYPE: DNA
<213> ORGANISM: Artificial Sequence
<220> FEATURE:
<223> OTHER INFORMATION: pKSRv Primer

<400> SEQUENCE: 6
gggggatcca ctagttctag ag                                                  22

<210> SEQ ID NO 7
<211> LENGTH: 34
<212> TYPE: DNA
<213> ORGANISM: Artificial Sequence
<220> FEATURE:
<223> OTHER INFORMATION: p18SrDNA Fw Primer

<400> SEQUENCE: 7
actagtggat ccccgggc ttcttcggaa gctc                                       34

<210> SEQ ID NO 8
<211> LENGTH: 36
<212> TYPE: DNA
<213> ORGANISM: Artificial Sequence
<220> FEATURE:
<223> OTHER INFORMATION: 18SrDNA Rv Primer

<400> SEQUENCE: 8
gaattcctgc agcccgggcg actatatctt aagccg                                   36

<210> SEQ ID NO 9
<211> LENGTH: 19
<212> TYPE: DNA
<213> ORGANISM: Artificial Sequence
<220> FEATURE:
<223> OTHER INFORMATION: pBlue18SFw Primer

<400> SEQUENCE: 9
aactagctca agggacgtg                                                      19

<210> SEQ ID NO 10
<211> LENGTH: 20
<212> TYPE: DNA
<213> ORGANISM: Artificial Sequence
<220> FEATURE:
<223> OTHER INFORMATION: pBlue18S Rv Primer

<400> SEQUENCE: 10
aactagccgg tacctttccg                                                     20

<210> SEQ ID NO 11
<211> LENGTH: 44
<212> TYPE: DNA
<213> ORGANISM: Artificial Sequence
<220> FEATURE:
<223> OTHER INFORMATION: ACTp Fw Primer
```

<400> SEQUENCE: 11
acgcgcggaa aggtaccggc tagttttacc gtctaccgct gacg          44

<210> SEQ ID NO 12
<211> LENGTH: 44
<212> TYPE: DNA
<213> ORGANISM: Artificial Sequence
<220> FEATURE:
<223> OTHER INFORMATION: ACTt Rv Primer

<400> SEQUENCE: 12
ttcagcaaat taaaggagta tagagttgaa tttaatggac gttg          44

<210> SEQ ID NO 13
<211> LENGTH: 2040
<212> TYPE: DNA
<213> ORGANISM: Artificial Sequence
<220> FEATURE:
<223> OTHER INFORMATION: ACT1-P

<400> SEQUENCE: 13

| | |
|---|---|
| ttaccgtcta ccgctgacgt tttgcgcggg ttgaagtaga tctgtatgac gcgtctcttc | 60 |
| gatcgggatt gcgcggattg cgcggatgtt gtcgcgtgga ggtggcaaag cagctcggaa | 120 |
| tatttggaga aaatgtggct gtgcggtgta gttgtgcggc tggtgcttgc tggcgtggcg | 180 |
| aagttcgcgc agcatctggc cagcttatcc cggcgcacaa ctatagttgg cgcaatcttg | 240 |
| tggctgatca atggctgggg cctaagatag taacagaatt ttacagcacg aggccgcgta | 300 |
| agtgtcggca cgtgcggcag tgcaataagc acgctgctca agctgcgccg gccagtatcg | 360 |
| cgttgccctc tcgcccgcta aacttctgtc accattcctt cttcctctta aagcccttg | 420 |
| caacctatt tccgatccaa tcagttccct caatccatcc cattttgtc tttctacagt | 480 |
| taattgtata atatttcaca atgaaaaagc ctgaactcac cgcgacgtct gtcgagaagt | 540 |
| ttctgatcga aaagttcgac agcgtctccg acctgatgca gctctcggag ggcgaagaat | 600 |
| ctcgtgcttt cagcttcgat gtaggagggc gtggatatgt cctgcgggta aatagctgcg | 660 |
| ccgatggttt ctacaaagat cgttatgttt atcggcactt tgcatcggcc gcgctcccga | 720 |
| ttccggaagt gcttgacatt ggggagttca gcgagagcct gacctattgc atctcccgcc | 780 |
| gtgcacaggg tgtcacgttg caagacctgc ctgaaaccga actgcccgct gttctccagc | 840 |
| cggtcgcgga ggccatggat gcgatcgctg cggccgatct tagccagacg agcgggttcg | 900 |
| gcccattcgg accgcaagga atcggtcaat acactacatg gcgtgatttc atatgcgcga | 960 |
| ttgctgatcc ccatgtgtat cactggcaaa ctgtgatgga cgacaccgtc agtgcgtccg | 1020 |
| tcgcgcaggc tctcgatgag ctgatgcttt gggccgagga ctgccccgaa gtccggcacc | 1080 |
| tcgtgcatgc ggatttcggc tccaacaatg tcctgacgga caatggccgc ataacagcgg | 1140 |
| tcattgactg gagcgaggcg atgttcgggg attcccaata cgaggtcgcc aacatcctct | 1200 |
| tctggaggcc gtggttggct tgtatggagc agcagacgcg ctacttcgag cggaggcatc | 1260 |
| cggagcttgc aggatcgccg cgcctccggg cgtatatgct ccgcattggt cttgaccaac | 1320 |
| tctatcagag cttggttgac ggcaatttcg atgatgcagc ttgggcgcag gtcgatgcg | 1380 |
| acgcaatcgt ccgatccgga gccgggactg tcggcgtac acaaatcgcc cgcagaagcg | 1440 |
| cggccgtctg gaccgatggc tgtgtagaag tactcgccga tagtggaaac cgacgcccca | 1500 |
| gcactcgtcc gagggcaaag gaatagagta gatgccgacc gcggacgttg ttccggatga | 1560 |
| atgacttctg cgctgtgatt ttgtcttttg tgaacattat gtgtacgtga tgtcgagacg | 1620 |

```
gagggcatgt gttatgatag atagcccgtt gtttgaagga agatatgaaa gcttttttat    1680
gtcaatgtta tttgtctacg tttgttgtcc ttgatctaac gagcaatcga tatattctta    1740
aaaatttgta ttgaagtgcg aacagtggat gacagttcaa cgtcctttgt ggagtaggtc    1800
tcggtcttac gcgtacgtca gtacccataa gcgccgttca agtaacagag taaatttaag    1860
gaagtcaaag caggttcaac tgtatatgcg atgcagacta aatgctgctc aggtattggt    1920
tgtcatagct atcattgtct caaagttacc aatttgttac tttgtgagct tgtaagtcgg    1980
cttgcagttt gcacttatat attagacaac aacgtccatt aaattcaact ctatactcct    2040
```

<210> SEQ ID NO 14
<211> LENGTH: 36
<212> TYPE: DNA
<213> ORGANISM: Artificial Sequence
<220> FEATURE:
<223> OTHER INFORMATION: TDHACC1 Fw Primer

<400> SEQUENCE: 14

```
actctatact cctttaattt gctgaagcgg tttgcc                              36
```

<210> SEQ ID NO 15
<211> LENGTH: 43
<212> TYPE: DNA
<213> ORGANISM: Artificial Sequence
<220> FEATURE:
<223> OTHER INFORMATION: TDHACC1 Rv Primer

<400> SEQUENCE: 15

```
gaatagcacg tcccttgagc tagttatgta gcgggtggtg atg                      43
```

<210> SEQ ID NO 16
<211> LENGTH: 41
<212> TYPE: DNA
<213> ORGANISM: Artificial Sequence
<220> FEATURE:
<223> OTHER INFORMATION: TDH-P1

<400> SEQUENCE: 16

```
accatcacca cccgctacat taatttgct gaagcggttt g                         41
```

<210> SEQ ID NO 17
<211> LENGTH: 31
<212> TYPE: DNA
<213> ORGANISM: Artificial Sequence
<220> FEATURE:
<223> OTHER INFORMATION: TDH-P2

<400> SEQUENCE: 17

```
ccgcagcaga cattgcgaat gtggattaga g                                   31
```

<210> SEQ ID NO 18
<211> LENGTH: 31
<212> TYPE: DNA
<213> ORGANISM: Artificial Sequence
<220> FEATURE:
<223> OTHER INFORMATION: TDH-TT1

<400> SEQUENCE: 18

```
cttctaatta agtgtgcggt tgatggtctt c                                   31
```

<210> SEQ ID NO 19
<211> LENGTH: 38
<212> TYPE: DNA

```
<213> ORGANISM: Artificial Sequence
<220> FEATURE:
<223> OTHER INFORMATION: TDH-TT2

<400> SEQUENCE: 19
gcacgtccct tgagctagtt atgtagcggg tggtgatg                              38

<210> SEQ ID NO 20
<211> LENGTH: 28
<212> TYPE: DNA
<213> ORGANISM: Artificial Sequence
<220> FEATURE:
<223> OTHER INFORMATION: ACC1-1

<400> SEQUENCE: 20
cacattcgca atgtctgctg cggccagt                                         28

<210> SEQ ID NO 21
<211> LENGTH: 40
<212> TYPE: DNA
<213> ORGANISM: Artificial Sequence
<220> FEATURE:
<223> OTHER INFORMATION: ACC1-2

<400> SEQUENCE: 21
aaccgcacac ttaattagaa gcctgcttga aaatcgcatc                            40

<210> SEQ ID NO 22
<211> LENGTH: 47
<212> TYPE: DNA
<213> ORGANISM: Artificial Sequence
<220> FEATURE:
<223> OTHER INFORMATION: HE115694 Fw Primer

<400> SEQUENCE: 22
tatcttactc taatccacat tcgcaatgga cccgttaatg gacaatg                    47

<210> SEQ ID NO 23
<211> LENGTH: 50
<212> TYPE: DNA
<213> ORGANISM: Artificial Sequence
<220> FEATURE:
<223> OTHER INFORMATION: HE115694 Rv Primer

<400> SEQUENCE: 23
agatagaaga ccatcaaccg cacactcact caactagtac aatccgattc                 50

<210> SEQ ID NO 24
<211> LENGTH: 28
<212> TYPE: DNA
<213> ORGANISM: Artificial Sequence
<220> FEATURE:
<223> OTHER INFORMATION: TDH3-18SrDNA-ACT1-hph Fw Primer

<400> SEQUENCE: 24
gtgtgcggtt gatggtcttc tatcttcc                                         28

<210> SEQ ID NO 25
<211> LENGTH: 41
<212> TYPE: DNA
<213> ORGANISM: Artificial Sequence
<220> FEATURE:
<223> OTHER INFORMATION: TDH3-18SrDNA-ACT1-hph Rv Primer

<400> SEQUENCE: 25
tgcgaatgtg gattagagta agatagataa cttttatctg g                          41
```

<210> SEQ ID NO 26
<211> LENGTH: 45
<212> TYPE: DNA
<213> ORGANISM: Artificial Sequence
<220> FEATURE:
<223> OTHER INFORMATION: 115694 Fw Primer

<400> SEQUENCE: 26
ccattaaatt caactctata ctcctacata ctcggcgagg ccttc    45

<210> SEQ ID NO 27
<211> LENGTH: 50
<212> TYPE: DNA
<213> ORGANISM: Artificial Sequence
<220> FEATURE:
<223> OTHER INFORMATION: 115694 Rv Primer

<400> SEQUENCE: 27
gaatagcacg tcccttgagc tagttactac atctcattag caaacctctc    50

<210> SEQ ID NO 28
<211> LENGTH: 20
<212> TYPE: DNA
<213> ORGANISM: Artificial Sequence
<220> FEATURE:
<223> OTHER INFORMATION: TDH3-18SrDNA-ACT1-hph Fw Primer

<400> SEQUENCE: 28
aactagctca agggacgtgc    20

<210> SEQ ID NO 29
<211> LENGTH: 31
<212> TYPE: DNA
<213> ORGANISM: Artificial Sequence
<220> FEATURE:
<223> OTHER INFORMATION: TDH3-18SrDNA-ACT1-hph Rv Primer

<400> SEQUENCE: 29
aggagtatag agttgaattt aatggacgtt g    31

<210> SEQ ID NO 30
<211> LENGTH: 19
<212> TYPE: DNA
<213> ORGANISM: Artificial Sequence
<220> FEATURE:
<223> OTHER INFORMATION: pBlueFw Primer

<400> SEQUENCE: 30
gggccccatc gaattcctg    19

<210> SEQ ID NO 31
<211> LENGTH: 21
<212> TYPE: DNA
<213> ORGANISM: Artificial Sequence
<220> FEATURE:
<223> OTHER INFORMATION: pBlueRv Primer

<400> SEQUENCE: 31
gggcccggta cccagctttt g    21

<210> SEQ ID NO 32
<211> LENGTH: 36
<212> TYPE: DNA
<213> ORGANISM: Artificial Sequence
<220> FEATURE:

<223> OTHER INFORMATION: pNatFw Primer

<400> SEQUENCE: 32
ccccggcgtc ccattaattt gctgaagcgg tttgcc                               36

<210> SEQ ID NO 33
<211> LENGTH: 31
<212> TYPE: DNA
<213> ORGANISM: Artificial Sequence
<220> FEATURE:
<223> OTHER INFORMATION: pNatRv Primer

<400> SEQUENCE: 33
gacgagaagt agtatgtagc gggtggtgat g                                    31

<210> SEQ ID NO 34
<211> LENGTH: 51
<212> TYPE: DNA
<213> ORGANISM: Artificial Sequence
<220> FEATURE:
<223> OTHER INFORMATION: pTranscript Id:115694 5'Fw Primer

<400> SEQUENCE: 34
ggaacaaaag ctgggtaccg ggccccaagc gggagcggtt gctcaatttg c              51

<210> SEQ ID NO 35
<211> LENGTH: 31
<212> TYPE: DNA
<213> ORGANISM: Artificial Sequence
<220> FEATURE:
<223> OTHER INFORMATION: pTranscript Id:115694 5'Rv Primer

<400> SEQUENCE: 35
ttcagcaaat taatgggacg ccgggggtgc a                                    31

<210> SEQ ID NO 36
<211> LENGTH: 34
<212> TYPE: DNA
<213> ORGANISM: Artificial Sequence
<220> FEATURE:
<223> OTHER INFORMATION: pTranscript Id:115694 3'Fw Primer

<400> SEQUENCE: 36
ccacccgcta catactactt ctcgtcaaca gggg                                 34

<210> SEQ ID NO 37
<211> LENGTH: 45
<212> TYPE: DNA
<213> ORGANISM: Artificial Sequence
<220> FEATURE:
<223> OTHER INFORMATION: pTranscript Id:115694 3'Rv Primer

<400> SEQUENCE: 37
gggctgcagg aattcgatgg ggccctacaa actgtccggc tgaac                     45

<210> SEQ ID NO 38
<211> LENGTH: 38
<212> TYPE: DNA
<213> ORGANISM: Artificial Sequence
<220> FEATURE:
<223> OTHER INFORMATION: HE1072 Fw

<400> SEQUENCE: 38
tactctaatc cacattcgca atgtcacaat cacgacag                             38

```
<210> SEQ ID NO 39
<211> LENGTH: 42
<212> TYPE: DNA
<213> ORGANISM: Artificial Sequence
<220> FEATURE:
<223> OTHER INFORMATION: HE4888 Fw

<400> SEQUENCE: 39
tactctaatc cacattcgca atgaagaaga gcgtgatcaa gc                    42

<210> SEQ ID NO 40
<211> LENGTH: 42
<212> TYPE: DNA
<213> ORGANISM: Artificial Sequence
<220> FEATURE:
<223> OTHER INFORMATION: HE45559 Fw

<400> SEQUENCE: 40
tactctaatc cacattcgca gttctcacgc tcctctatgt tg                    42

<210> SEQ ID NO 41
<211> LENGTH: 42
<212> TYPE: DNA
<213> ORGANISM: Artificial Sequence
<220> FEATURE:
<223> OTHER INFORMATION: HE65921 Fw

<400> SEQUENCE: 41
tactctaatc cacattcgca atgtctgagg agcagaaata tc                    42

<210> SEQ ID NO 42
<211> LENGTH: 39
<212> TYPE: DNA
<213> ORGANISM: Artificial Sequence
<220> FEATURE:
<223> OTHER INFORMATION: HE216324 Fw

<400> SEQUENCE: 42
tactctaatc cacattcgca atgtcttctc cattagcac                        39

<210> SEQ ID NO 43
<211> LENGTH: 40
<212> TYPE: DNA
<213> ORGANISM: Artificial Sequence
<220> FEATURE:
<223> OTHER INFORMATION: HE1072 Rv

<400> SEQUENCE: 43
gaagaccatc aaccgcacac ttaatctaaa gatgcctcag                       40

<210> SEQ ID NO 44
<211> LENGTH: 41
<212> TYPE: DNA
<213> ORGANISM: Artificial Sequence
<220> FEATURE:
<223> OTHER INFORMATION: HE4888 Rv

<400> SEQUENCE: 44
gaagaccatc aaccgcacac tcacttcagc tcgttgagtt c                     41

<210> SEQ ID NO 45
<211> LENGTH: 42
<212> TYPE: DNA
<213> ORGANISM: Artificial Sequence
<220> FEATURE:
<223> OTHER INFORMATION: HE45559 Rv
```

<400> SEQUENCE: 45
gaagaccatc aaccgcacac aattgcattc ggagtcttcg tc                42

<210> SEQ ID NO 46
<211> LENGTH: 38
<212> TYPE: DNA
<213> ORGANISM: Artificial Sequence
<220> FEATURE:
<223> OTHER INFORMATION: HE65921 Rv

<400> SEQUENCE: 46
gaagaccatc aaccgcacac tcactccttg tgactagc                     38

<210> SEQ ID NO 47
<211> LENGTH: 38
<212> TYPE: DNA
<213> ORGANISM: Artificial Sequence
<220> FEATURE:
<223> OTHER INFORMATION: HE216324 Rv

<400> SEQUENCE: 47
gaagaccatc aaccgcacac tcactcacat tgtcgttg                     38

<210> SEQ ID NO 48
<211> LENGTH: 28
<212> TYPE: DNA
<213> ORGANISM: Artificial Sequence
<220> FEATURE:
<223> OTHER INFORMATION: TDH3-18SrDNA-ACT1-hph Fw Primer

<400> SEQUENCE: 48
gtgtgcggtt gatggtcttc tatcttcc                                28

<210> SEQ ID NO 49
<211> LENGTH: 41
<212> TYPE: DNA
<213> ORGANISM: Artificial Sequence
<220> FEATURE:
<223> OTHER INFORMATION: TDH3-18SrDNA-ACT1-hph Rv Primer

<400> SEQUENCE: 49
tgcgaatgtg gattagagta agatagataa cttttatctg g                 41

<210> SEQ ID NO 50
<211> LENGTH: 39
<212> TYPE: DNA
<213> ORGANISM: Artificial Sequence
<220> FEATURE:
<223> OTHER INFORMATION: pBluescript Fw Primer

<400> SEQUENCE: 50
ctgcaggaat tcgatatcaa gcttatcgat accgtcgac                    39

<210> SEQ ID NO 51
<211> LENGTH: 20
<212> TYPE: DNA
<213> ORGANISM: Artificial Sequence
<220> FEATURE:
<223> OTHER INFORMATION: pBluescript Primer

<400> SEQUENCE: 51
ggatccacta gttctagagc                                         20

<210> SEQ ID NO 52
<211> LENGTH: 34

<212> TYPE: DNA
<213> ORGANISM: Artificial Sequence
<220> FEATURE:
<223> OTHER INFORMATION: TDH3-P

<400> SEQUENCE: 52
gccctaccca gcgttaattt gctgaagcgg tttg                                34

<210> SEQ ID NO 53
<211> LENGTH: 34
<212> TYPE: DNA
<213> ORGANISM: Artificial Sequence
<220> FEATURE:
<223> OTHER INFORMATION: TDH3-P

<400> SEQUENCE: 53
ttttgtgctc tcattaattt gctgaagcgg tttg                                34

<210> SEQ ID NO 54
<211> LENGTH: 31
<212> TYPE: DNA
<213> ORGANISM: Artificial Sequence
<220> FEATURE:
<223> OTHER INFORMATION: TDH3-P

<400> SEQUENCE: 54
ctctttcttc aacatgtagc gggtggtgat g                                   31

<210> SEQ ID NO 55
<211> LENGTH: 31
<212> TYPE: DNA
<213> ORGANISM: Artificial Sequence
<220> FEATURE:
<223> OTHER INFORMATION: TDH3-P

<400> SEQUENCE: 55
actctgaata caaatgtagc gggtggtgat g                                   31

<210> SEQ ID NO 56
<211> LENGTH: 43
<212> TYPE: DNA
<213> ORGANISM: Artificial Sequence
<220> FEATURE:
<223> OTHER INFORMATION: Transcript Id:4888 5' Fw

<400> SEQUENCE: 56
cggccgctct agaactagtg gatccgcagt gttgccgcag ccg                      43

<210> SEQ ID NO 57
<211> LENGTH: 35
<212> TYPE: DNA
<213> ORGANISM: Artificial Sequence
<220> FEATURE:
<223> OTHER INFORMATION: Transcript Id:4888 3' Fw

<400> SEQUENCE: 57
ccacccgcta catgttgaag aaagagacga ataag                               35

<210> SEQ ID NO 58
<211> LENGTH: 44
<212> TYPE: DNA
<213> ORGANISM: Artificial Sequence
<220> FEATURE:
<223> OTHER INFORMATION: Transcript Id:45559 5' Fw

<400> SEQUENCE: 58
cggccgctct agaactagtg gatccggcag gtgatgttct tatg                44

<210> SEQ ID NO 59
<211> LENGTH: 34
<212> TYPE: DNA
<213> ORGANISM: Artificial Sequence
<220> FEATURE:
<223> OTHER INFORMATION: Transcript Id:45559 3' Fw

<400> SEQUENCE: 59
ccacccgcta catttgtatt cagagtctgc attg                34

<210> SEQ ID NO 60
<211> LENGTH: 34
<212> TYPE: DNA
<213> ORGANISM: Artificial Sequence
<220> FEATURE:
<223> OTHER INFORMATION: Transcript Id:4888 5' Rv

<400> SEQUENCE: 60
ttcagcaaat taacgctggg tagggccctg attg                34

<210> SEQ ID NO 61
<211> LENGTH: 46
<212> TYPE: DNA
<213> ORGANISM: Artificial Sequence
<220> FEATURE:
<223> OTHER INFORMATION: Transcript Id:4888 3' Rv

<400> SEQUENCE: 61
taagcttgat atcgaattcc tgcagattta cagagttttt cgacag                46

<210> SEQ ID NO 62
<211> LENGTH: 31
<212> TYPE: DNA
<213> ORGANISM: Artificial Sequence
<220> FEATURE:
<223> OTHER INFORMATION: Transcript Id:45559 5' Rv

<400> SEQUENCE: 62
ttcagcaaat taatgagagc acaaaatcat g                31

<210> SEQ ID NO 63
<211> LENGTH: 44
<212> TYPE: DNA
<213> ORGANISM: Artificial Sequence
<220> FEATURE:
<223> OTHER INFORMATION: Transcript Id:45559 3' Rv

<400> SEQUENCE: 63
taagcttgat atcgaattcc tgcagattga aggcgattat agac                44

<210> SEQ ID NO 64
<211> LENGTH: 43
<212> TYPE: DNA
<213> ORGANISM: Artificial Sequence
<220> FEATURE:
<223> OTHER INFORMATION: 4888 deletion Fw

<400> SEQUENCE: 64
cggccgctct agaactagtg gatccgcagt gttgccgcag ccg                43

<210> SEQ ID NO 65

-continued

<211> LENGTH: 44
<212> TYPE: DNA
<213> ORGANISM: Artificial Sequence
<220> FEATURE:
<223> OTHER INFORMATION: 45559 deletion Fw

<400> SEQUENCE: 65
cggccgctct agaactagtg gatccggcag gtgatgttct tatg        44

<210> SEQ ID NO 66
<211> LENGTH: 46
<212> TYPE: DNA
<213> ORGANISM: Artificial Sequence
<220> FEATURE:
<223> OTHER INFORMATION: 4888 deletion Rv

<400> SEQUENCE: 66
taagcttgat atcgaattcc tgcagattta cagagttttt cgacag      46

<210> SEQ ID NO 67
<211> LENGTH: 44
<212> TYPE: DNA
<213> ORGANISM: Artificial Sequence
<220> FEATURE:
<223> OTHER INFORMATION: 45559 deletion Rv

<400> SEQUENCE: 67
taagcttgat atcgaattcc tgcagattga aggcgattat agac        44

<210> SEQ ID NO 68
<211> LENGTH: 331
<212> TYPE: PRT
<213> ORGANISM: Lipomyces starkeyi

<400> SEQUENCE: 68

Met Lys Lys Ser Val Ile Lys Arg Arg Lys Arg Val Ala Pro Pro Val
1               5                   10                  15

Thr Pro Asn Ala Leu Pro Pro Val Gln Tyr Pro Glu Gln Gln Gln
            20                  25                  30

Gln Gly Phe Glu Ala Ser Ser Gln Gln Tyr Arg Pro Val Ser Gly Gly
        35                  40                  45

Gly Ser Glu Ser Asp Glu Asp Gly Glu Ser Gly Ala Asn Gln Gly Pro
    50                  55                  60

Thr Gln Arg Ser Gln Leu Arg Ser Pro Tyr Ser Gly Pro His Asp Asp
65                  70                  75                  80

Asn Glu Ser Leu Pro Arg Tyr Leu Pro Gln Ile Phe Gly Pro Arg Ser
                85                  90                  95

Val Asp Gln Leu Ser Arg Pro Gln Gln Gln Ser Leu Gln Ala Tyr
            100                 105                 110

Pro Pro Val Pro Ser Val Ala Pro Glu Asn Ser Ser Ala Ile Arg Arg
        115                 120                 125

Leu Gly Val Pro Ser Trp Lys His Ser Pro Ser His Ser Ala Ala Ser
    130                 135                 140

Thr Pro Pro Pro Ile Asp Phe Thr Gly Ala Phe Arg Ser Thr Ser
145                 150                 155                 160

Pro Thr Ser Ser Ser Thr Leu Leu Pro Arg Pro Asn Leu Pro Ala Met
                165                 170                 175

Thr Asp Arg Ser Lys Ser Pro Ile Asp Val Asn Val Asp Gly Ala Glu
            180                 185                 190

Gln Gln Ser Glu Glu Ser Ser Arg Leu Pro Pro Ile Gln Tyr Pro Leu

```
                195                200                205
Asn Gln Pro Thr Glu Gly Arg Ile Gln Val Leu Ala Thr Lys Arg Arg
    210                215                220

Asn Ser Asp Thr Glu Gly Asn Ala Pro Ala Thr Ala Ser Glu Ile Ala
225                230                235                240

Arg Val Asn Ser Ile Ser Ser Ile Leu Asn Pro Ser Ser Ser Ser Thr
                245                250                255

Val Val Ser Ser Gln Thr Thr Thr Ser Ser Glu Pro Gly Ala Leu Pro
            260                265                270

Ala Ser Asn Arg Gly Phe Asp Ile Pro Val Asp Ile Arg Gly Asp Ala
            275                280                285

Glu Lys Val Arg Glu Phe Leu Arg Ser Lys Arg Gln Lys Ile Glu Asp
    290                295                300

Glu Leu Glu Ser His Arg Arg Ala Ile Ala Glu Ser Glu Asn Leu Leu
305                310                315                320

Ala Ile Tyr Glu Gln Glu Leu Asn Glu Leu Lys
                325                330

<210> SEQ ID NO 69
<211> LENGTH: 996
<212> TYPE: DNA
<213> ORGANISM: Lipomyces starkeyi

<400> SEQUENCE: 69
atgaagaaga gcgtgatcaa gcgtcgcaag cgggtcgcgc ccccgttac ccccaatgcg        60 ctcccaccag tccagtatcc acccgagcag caacagcagg gcttcgaggc ttcgagccag      120
caatatcgtc cggtatcggg tggtgggtcc gaatccgacg aggatggcga agcggtgcc       180 aatcagggcc ctaccagcg cagccaatta cgttcgcctt actcgggacc gcacgatgat       240
aacgaatctc tgccccggta tctccctcag attttcggtc ctcggtcagt cgatcagctc      300
tcgcggccac agcagcagca atctctacag gcttacccgc cggtcccttc ggttgcgcct      360
gagaattctt cggcaattcg acgtcttggc gttccaagct ggaagcactc gccctctcat      420
tccgccgcat ccactcctcc gccgccattt gacttcactg gtgcgtttcg gtctacatct      480
ccgacttcct catccaccct gctgccacga ccgaatttgc cggcaatgac ggatcgatca      540
aaatcgccga tcgatgtcaa cgtcgacggt gccgagcagc aatccgagga tcttctcgt       600 ctcccccga tccagtatcc cttaaaccaa ccgactgagg ccgaattca agtacttgca        660 acgaaacggc gcaattcgga tacagaggga aatgctcctg caacagcgag tgaaatcgct      720
cgtgtaaata gcattagttc gatcctgaat cccagttcct catccacggt cgtatccagt      780
caaacgacta cgtcgtcaga gcccggtgcg ttgccagctt cgaatcgagg ctttgacatt      840
ccagtcgaca ttcgtggcga tgccgaaaaa gtgcgcgaat tcctccgatc caaacgccag      900
aaaattgagg atgagctcga gagtcaccgt cgcgcgattg cagagagcga aaatttgctg      960
gctatatatg agcaggaact caacgagctg aagtga                               996

<210> SEQ ID NO 70
<211> LENGTH: 280
<212> TYPE: PRT
<213> ORGANISM: Lipomyces starkeyi

<400> SEQUENCE: 70

Met Asn Ser Phe Thr Gly Phe Leu Ala Ser Thr Val Leu Thr Leu Leu
1               5                   10                  15
```

Tyr Val Gly Val Leu Tyr Ile His Pro Arg Ser Arg Pro Ser Ala Thr
            20                  25                  30

Val Ser Arg Asn Asp Asp Val Ile Lys Thr Arg Ala Ala Ala Ile
    35                  40                  45

Ile Phe Ser Ser Val Leu Ser Gly Ala Leu Thr Ala Trp Leu Leu Ser
50                  55                  60

Asn Asp Gly Ser Ile Ser Pro Glu His Ala Leu Lys Ser Leu Arg Ile
65                  70                  75                  80

Trp Pro Ile Pro Pro Ala Met Glu Leu Phe Arg Ser Ser Leu Leu Ile
                85                  90                  95

Thr Gly Ile Leu Phe Ile Gly Pro Leu Val Glu Lys Val Val Phe Ser
            100                 105                 110

Arg Gly Trp Lys Tyr Leu Arg Ala Asp Ile Glu Ile Ala Leu Thr Gly
            115                 120                 125

Trp Ile Gly Cys Arg Asn Tyr Ile Ile Gly Pro Leu Thr Glu Glu Phe
            130                 135                 140

Val Phe Arg Val Cys Ile Val Ser Ile Glu Leu Ala Ser Gly Met Ser
145                 150                 155                 160

Pro Leu Lys Ala Ile Phe Leu Ser Pro Leu Tyr Phe Gly Thr Ala His
                165                 170                 175

Val His His Ala Tyr Glu Val Cys Leu Val Gln Pro Asp Ala Leu Met
            180                 185                 190

Phe Ala Leu Leu Ser Ser Leu Phe Gln Phe Ala Phe Thr Thr Ile Phe
            195                 200                 205

Gly Trp Tyr Ala Thr Phe Leu Phe Leu Arg Thr Gly Ser Phe Trp Gln
210                 215                 220

Pro Phe Ile Ala His Ala Phe Cys Asn Ile Met Gly Val Pro Lys Phe
225                 230                 235                 240

Gly Ala Lys Leu Asp Gly Pro Arg Trp Tyr Met His Ala Tyr Asn Leu
                245                 250                 255

Leu Leu Val Ser Gly Thr Ile Ala Phe Gly Ala Leu Leu Phe Pro Leu
            260                 265                 270

Thr Lys Thr Pro Asn Ala Ile Ile
            275                 280

<210> SEQ ID NO 71
<211> LENGTH: 843
<212> TYPE: DNA
<213> ORGANISM: Lipomyces starkeyi

<400> SEQUENCE: 71
atgaactcat tcaccgggtt cctagcctct accgttctca cgctcctcta tgttggggtg      60
ctctacatac accccgcag tagaccatca gctacagtgt ctcgcaatga tgatgacgtg      120
ataaaaacga gagctgcagc aattatattt agttcggttt tgtccggtgc tcttacggct      180
tggctcttgt cgaacgatgg gtcgatatct ccggagcatg ctctgaaatc attacgaata      240
tggcccattc cgccagccat ggagctgttt agatcaagtc tgttgattac aggaatattg      300
tttattgggc cattggtaga gaaagttgtg ttttctagag atggaaaata tttgagggcg      360
gatattgaaa ttgcgttgac cggctggatt gggtgcagga attacatcat tggaccactc      420
actgaggagt ttgtattcag agtctgcatt gtatctatcg agttggcgtc aggaatgtca      480
cctttaaagg caatcttttt gtcaccatta tacttcggca ccgcacatgt acatcatgcg      540
tatgaggtct gccttgtgca acccgatgca cttatgttcg ctctactaag ttccctttc      600

```
cagttcgcat tcacaactat tttcggctgg tacgcgacct tccttttctt ccgaacaggc    660
agcttctggc agccattcat cgcgcacgca ttctgcaata ttatgggcgt cccaaaattt    720
ggggcgaagt tagacgggcc gcggtggtat atgcatgcct acaacttgct gttggtgagc    780
ggaacaatcg catttggggc gctgctcttt ccgttgacga agactccgaa tgcaattata    840
tag                                                                  843
```

LIPID PRODUCTION CONTROL FACTOR FOR OLEAGINOUS YEAST

CROSS-REFERENCE TO RELATED APPLICATIONS

This application is a U.S. National Stage application of PCT/JP2021/003621 filed 2 Feb. 2021, which claims priority to Japanese Application No. 2020-032655 filed 28 Feb. 2020, the entire disclosures of which are hereby incorporated by reference in their entireties.

SEQUENCE LISTING

The present application contains a Sequence Listing which has been submitted electronically in ASCII format and is hereby incorporated by reference in its entirety. Said ASCII copy, created on 26 Aug. 2022, is named 0223_0090_PCT_US_SL.txt and is 39 kilobytes in size.

TECHNICAL FIELD

The present invention relates to lipid production control factors of oleaginous yeasts.

BACKGROUND ART

Fat and oil are closely involved in our daily lives, and their applications are largely categorized into food and industrial use. Fat and oil used in food include salad oil for cooking, and processed fat and oil such as margarine and dressing prepared by processing fat-and-oil materials. Fat and oil used in industrial application include those directly used as fuels or lubrication oil, and fat-and-oil chemical products produced through chemical conversion, such as shampoos, conditioners, and cosmetics.

The raw materials of major three fat and oil items (soybean oil, rapeseed oil, and palm oil) are vegetable oils obtained mostly by pressing seeds such as rapeseed and soybean, or the flesh of fruits such as palm and olive. Other countries can supply fat and oil by growing oilseed plants (raw materials of fat and oil). In Japan, however, there is a need to develop a fat and oil production system suitable for the nation in order to increase the self-sufficiency rate of edible fat and oil.

Fat and oil production by using microorganisms has been a focus of attention these days, as a substitute for fat and oil production from oilseed plants. In particular, oleaginous yeasts such as yeasts of genus Lipomyces have a high fat-and-oil accumulation capacity.

CITATION LIST

Patent Literature

PTL 1: JP2019-146543A

Non-Patent Literature

NPL 1: H. Yamazaki, S. Kobayashi, S. Ebina, S. Abe, S. Ara, Y. Shida, W. Ogasawara, K. Yaoi, H. Araki & H. Takaku: Appl. Microbiol. Biotechnol., 103, 6297 (2019).

SUMMARY OF INVENTION

Technical Problem

PTL 1 and NPL 1 report that mutation processing was performed on yeasts of genus Lipomyces, and that yeasts with a higher lipid production capacity were screened. However, these studies identified no lipid production control factors. Once the factors are identified, the lipid production capacity of yeasts will be more freely regulated, and accumulation of the factors will enable the production of a yeast with a higher lipid production capacity.

An object of the present invention is to provide lipid production control factors in yeasts.

Solution to Problem

The present inventors conducted extensive research and found that the yeast 115694 gene, yeast 4888 gene, and yeast 45559 gene are lipid production control factors; and further found that a lipid production capacity can be regulated by regulating the expression and/or function of these genes, or by expressing mutants of these genes. The inventors conducted further research on the basis of these findings and completed the invention. Specifically, the present invention includes the following subject matter.

Item 1.

A method for producing a yeast with a regulated lipid production capacity, the method comprising performing on a yeast at least one selected from the group consisting of the following (1), (2), (3), and (4):
 (1) regulating the expression and/or function of a yeast 115694 gene,
 (2) expressing the yeast 115694 gene having a mutation in a region between the transmembrane domain and the nuclear localization signal,
 (3) regulating the expression and/or function of a yeast 4888 gene, and
 (4) regulating the expression and/or function of a yeast 45559 gene.

Item 2.

The method according to Item 1, producing a yeast with an increased lipid production capacity, the method comprising performing at least one selected from the group consisting of the following (1A), (2), (3A), and (4A):
 (1A) increasing the expression and/or function of the yeast 115694 gene,
 (2) expressing the yeast 115694 gene having a mutation in a region between the transmembrane domain and the nuclear localization signal,
 (3A) increasing the expression and/or function of the yeast 4888 gene, and
 (4A) decreasing the expression and/or function of the yeast 45559 gene.

Item 3.

The method according to Item 1 or 2, producing a yeast with an increased lipid production capacity, the method comprising performing at least one selected from the group consisting of the following (1Aa), (2), (3Aa), and (4Aa):
 (1Aa) increasing the expression of the yeast 115694 gene,
 (2) expressing the yeast 115694 gene having a mutation in a region between the transmembrane domain and the nuclear localization signal,
 (3Aa) increasing the expression of the yeast 4888 gene, and
 (4Aa) decreasing the expression of the yeast 45559 gene.

Item 4.

The method according to any one of Items 1 to 3, wherein the region between the transmembrane domain and the nuclear localization signal is an amino acid region at positions 1100 to 1200 from the N-terminus of the amino acid sequence of the yeast 115694 gene represented by SEQ ID NO: 1.

Item 5.
The method according to any one of Items 1 to 4, wherein the yeast is an oleaginous yeast.
Item 6.
The method according to any one of Items 1 to 5, wherein the yeast belongs to the genus Lipomyces.
Item 7.
A reagent for use in the production of a yeast with a regulated lipid production capacity, comprising at least one member selected from the group consisting of the following (1'), (2'), (3'), and (4'):
- (1') at least one member selected from the group consisting of an expression regulator for a yeast 115694 gene and a function regulator for the yeast 115694 gene,
- (2') at least one member selected from the group consisting of a mutation introducer for a region between the transmembrane domain and the nuclear localization signal of the yeast 115694 gene, and an expression cassette of the yeast 115694 gene having a mutation in a region between the transmembrane domain and the nuclear localization signal,
- (3') at least one member selected from the group consisting of an expression regulator of a yeast 4888 gene and a function regulator of the yeast 4888 gene, and
- (4') at least one member selected from the group consisting of an expression regulator of a yeast 45559 gene and a function regulator of the yeast 45559 gene.

Item 8.
The reagent according to Item 7, for use in the production of a yeast with an increased lipid production capacity, comprising at least one member selected from the group consisting of the following (1A'), (2'), (3A'), and (4A'):
- (1A') at least one member selected from the group consisting of an expression promoter for the yeast 115694 gene and a function promoter for the yeast 115694 gene,
- (2') at least one member selected from the group consisting of a mutation introducer for a region between the transmembrane domain and the nuclear localization signal of the yeast 115694 gene, and an expression cassette of the yeast 115694 gene having a mutation in a region between the transmembrane domain and the nuclear localization signal,
- (3A') at least one member selected from the group consisting of an expression promoter for the yeast 4888 gene and a function promoter of the yeast 4888 gene, and
- (4A') at least one member selected from the group consisting of an expression inhibitor for the yeast 45559 gene and a function inhibitor for the yeast 45559 gene.

Item 9.
The reagent according to Item 7 or 8, for use in the production of a yeast with an increased lipid production capacity, comprising at least one member selected from the group consisting of the following (1Aa'), (2'), (3Aa'), and (4Aa'):
- (1Aa') an expression promoter for the yeast 115694 gene,
- (2') at least one member selected from the group consisting of a mutation introducer for a region between the transmembrane domain and the nuclear localization signal of the yeast 115694 gene, and an expression cassette of the yeast 115694 gene having a mutation in a region between the transmembrane domain and the nuclear localization signal,
- (3Aa') an expression promoter for the yeast 4888 gene, and
- (4Aa') an expression inhibitor for the yeast 45559 gene.

Item 10.
A lipid-producing yeast being in at least one state selected from the group consisting of the following (1Aa"), (3Aa"), and (4Aa"):
- (1Aa") having the expression of a yeast 115694 gene increased,
- (3Aa") having the expression of a yeast 4888 gene increased, and
- (4Aa") having the expression of a yeast 45559 gene decreased.

Item 11.
A composition for lipid production, comprising the lipid-producing yeast of Item 10.
Item 12.
A method for producing a lipid, comprising collecting a lipid from at least one member selected from the group consisting of a cultured product of the lipid-producing yeast of Item 10 and the composition for lipid production of Item 11.

Advantageous Effects of Invention

The present invention provides a method for producing a yeast with a regulated lipid production capacity, a reagent for use in the production of a yeast with a regulated lipid production capacity, a lipid-producing yeast, a composition for lipid production, a method for producing a lipid, and the like on the basis of the newly found lipid production control factors.

Each graph shows the average of three independent measurements, and error bars show standard errors. The horizontal axis of each graph shows the elapsed time from the start of culture.

Figure 10:
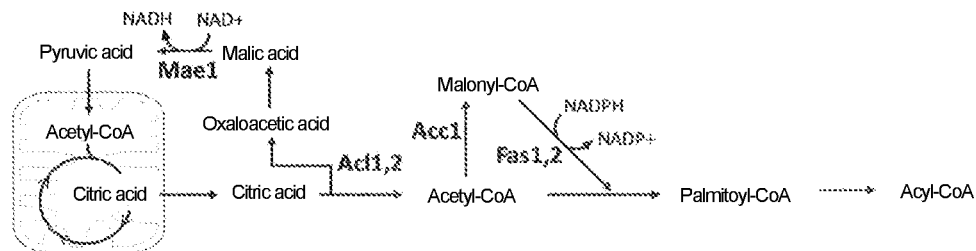
Figure 10:
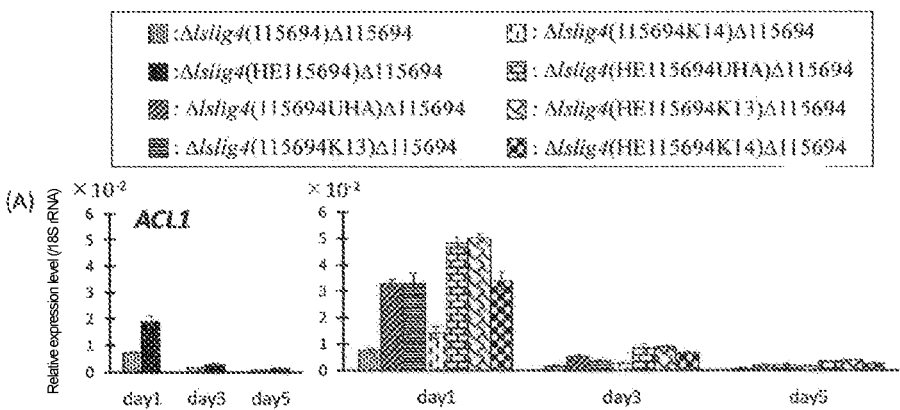

FIG. 10 shows the relative expression levels of acyl CoA-related gene: (A) ACL1 in wild-type 115694 gene high-expression strain, 115694 gene mutant strains, and mutant 115694 gene high-expression strains. Each graph shows the average of three independent measurements, and error bars show standard errors. The horizontal axis of each graph shows the elapsed time from the start of culture.

Figure 11:
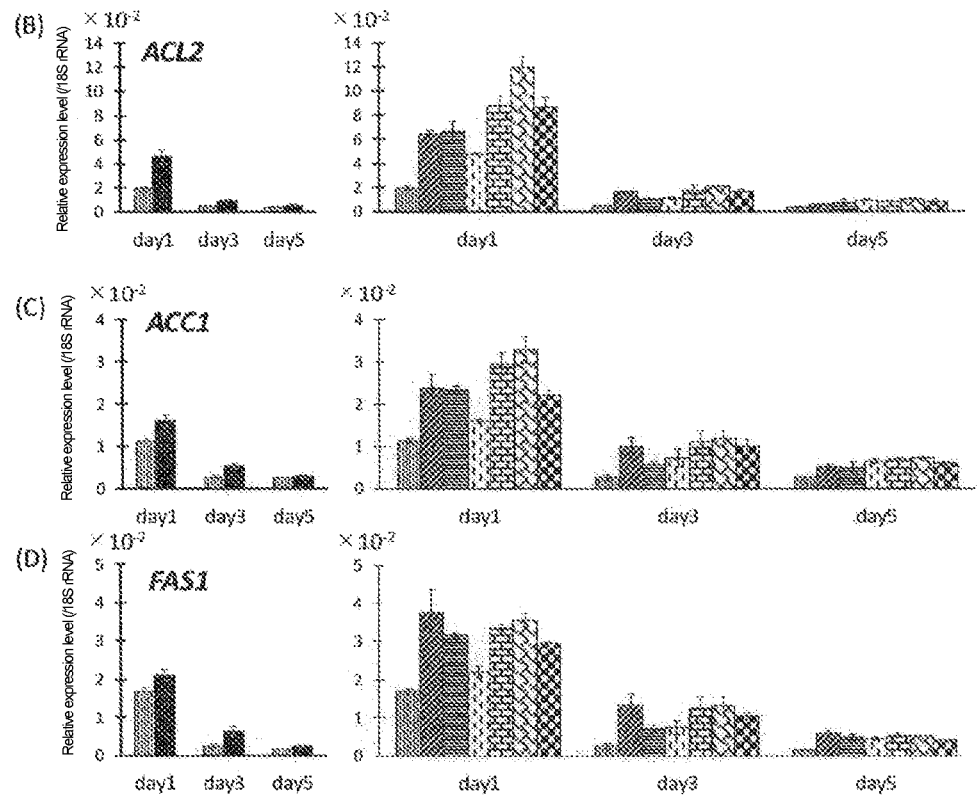

FIG. 11 shows the relative expression levels of acyl CoA-related genes: (B) ACL2, (C) ACC1, and (D) FAS1. Others, such as the legend and horizontal axis, are the same as those in FIG. 10.

Figure 12:
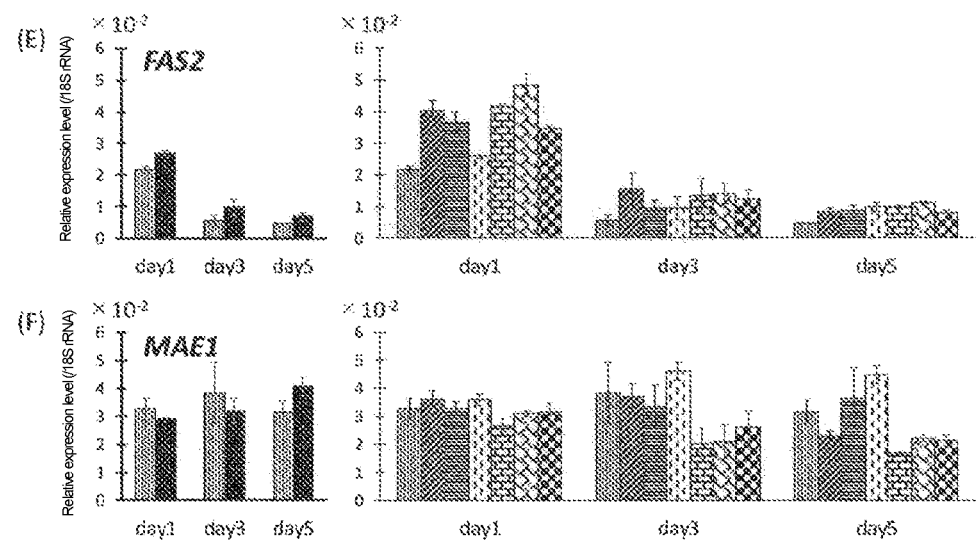

FIG. 12 shows the relative expression levels of acyl CoA-related genes: (E) FAS2 and (F) MAE1. Others, such as the legend and horizontal axis, are the same as those in FIG. 10.

Figure 13:
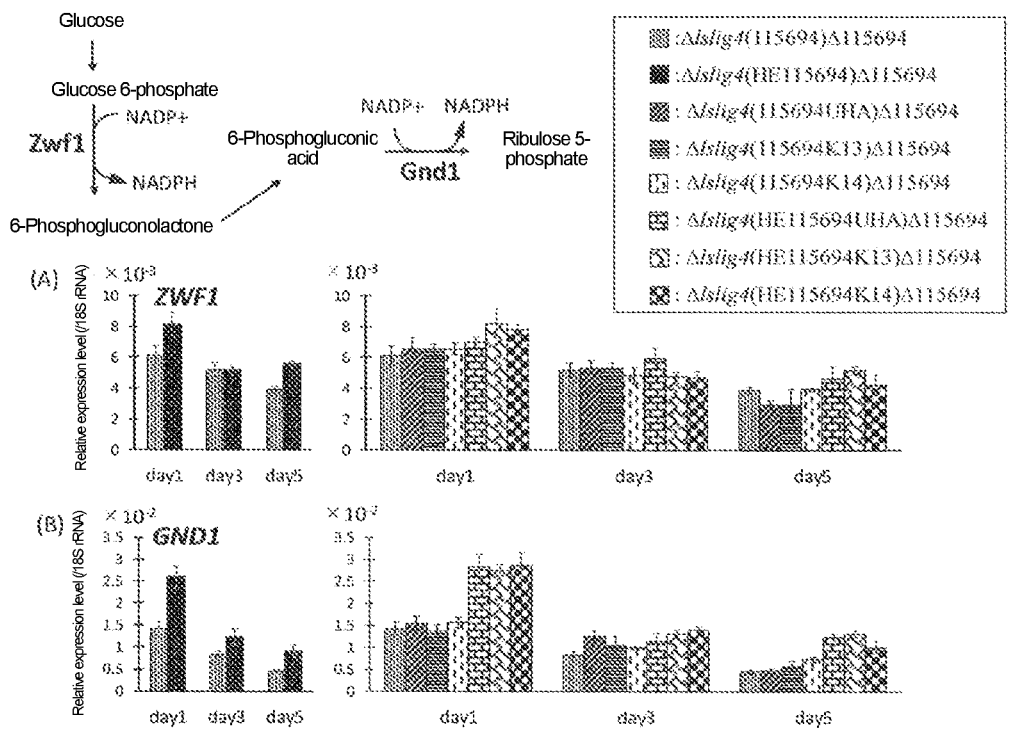

FIG. 13 shows the relative expression levels of pentose phosphate pathway-related genes: (A) ZWF1 and (B) GND1 in wild-type 115694 gene high-expression strain, 115694 gene mutant strains, and mutant 115694 gene high-expression strains. Each graph shows the average of three independent measurements, and error bars show standard errors. The horizontal axis of each graph shows the elapsed time from the start of culture.

Figure 14:
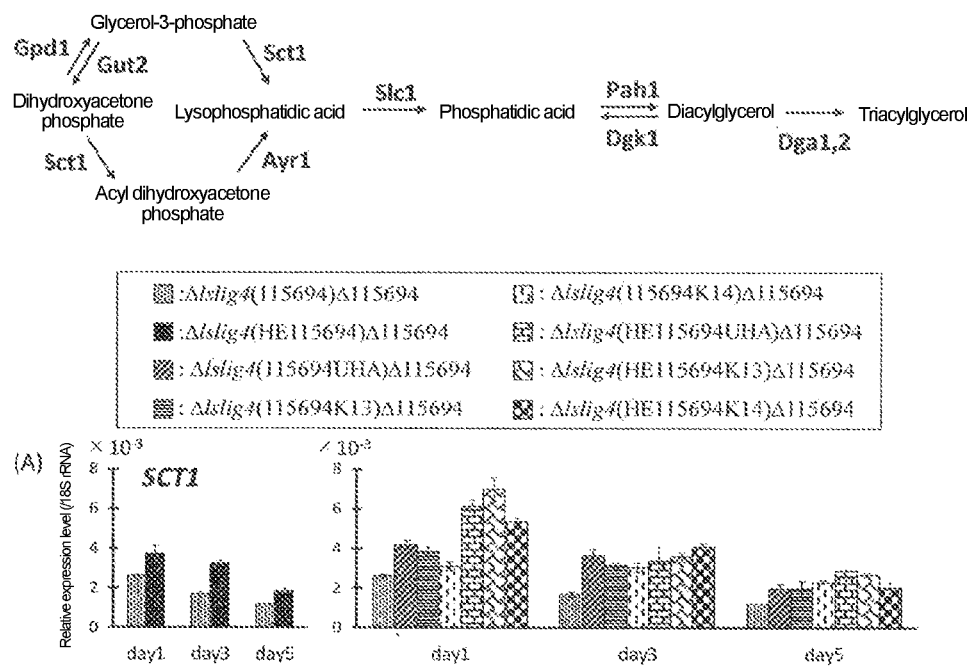

FIG. 14 shows the relative expression levels of Kennedy pathway-related gene: (A) SCT1 in wild-type 115694 gene high-expression strain, 115694 gene mutant strains, and mutant 115694 gene high-expression strains. Each graph shows the average of three independent measurements, and error bars show standard errors. The horizontal axis of each graph shows the elapsed time from the start of culture.

Figure 15:
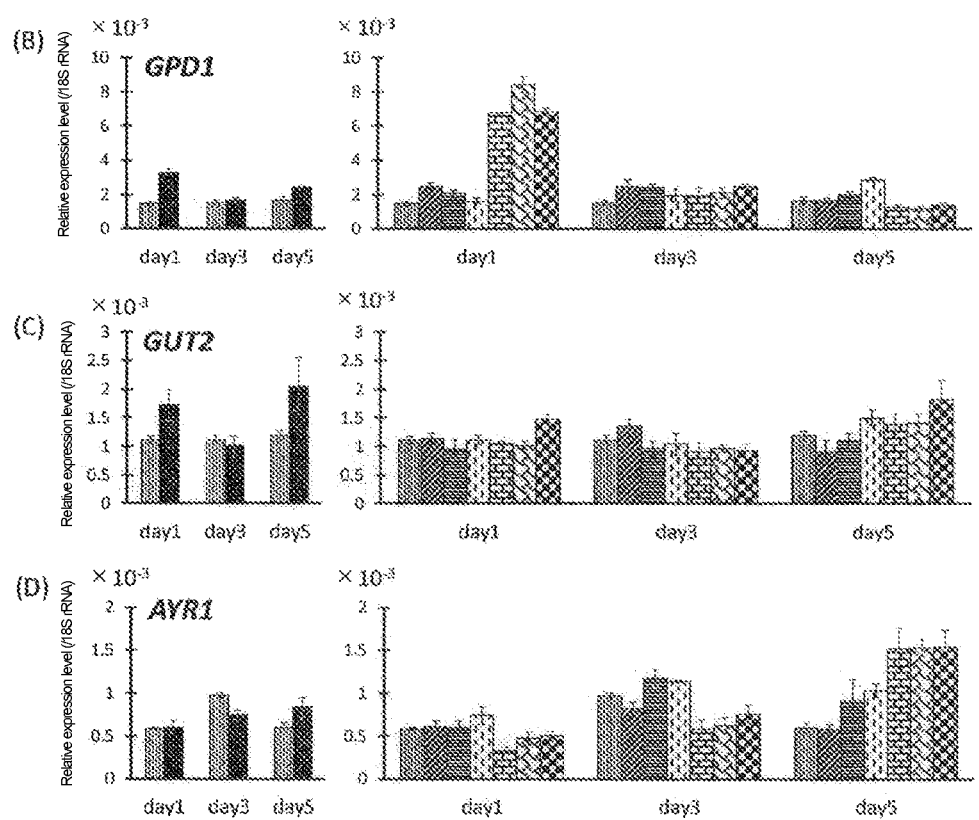

FIG. 15 shows the relative expression levels of Kennedy pathway-related genes: (B) GPD1, (C) GUT2, and (D) AYR1. Others, such as the legend and horizontal axis, are the same as those in FIG. 14.

Figure 16:
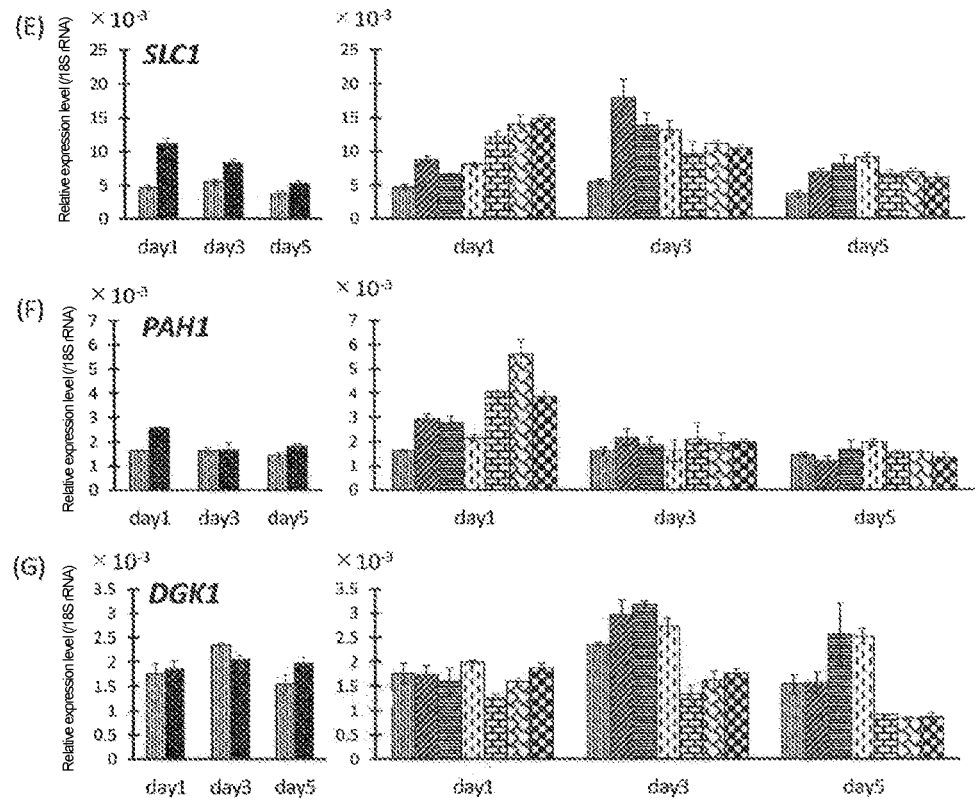

FIG. 16 shows the relative expression levels of Kennedy pathway-related genes: (E) SLC1, (F) PAH1, and (G) DGK1. Others, such as the legend and horizontal axis, are the same as those in FIG. 14.

Figure 17:
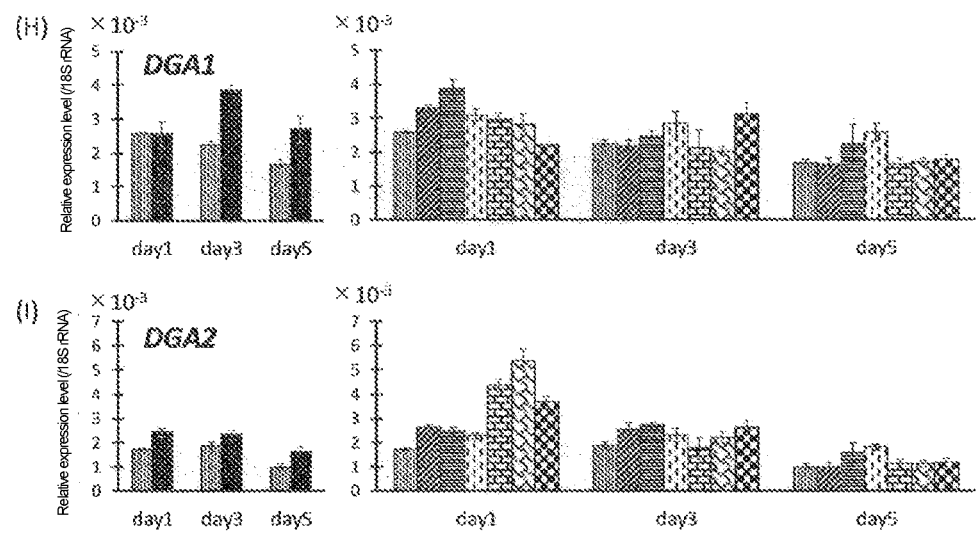

FIG. 17 shows the relative expression levels of Kennedy pathway-related genes: (H) DGA1 and (I) DGA2. Others, such as the legend and horizontal axis, are the same as those in FIG. 14.

Figure 18:
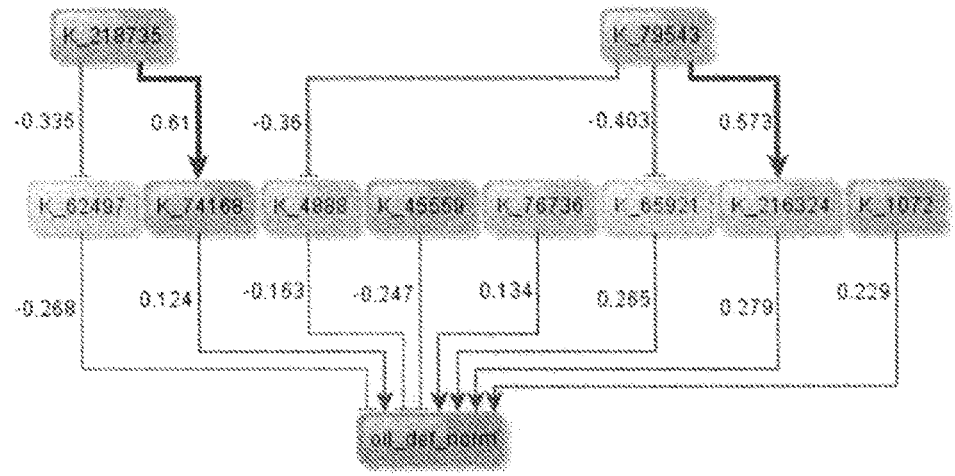

FIG. 18 shows an excerpt of a gene network that is highly correlated with lipid productivity.

Figure 19:
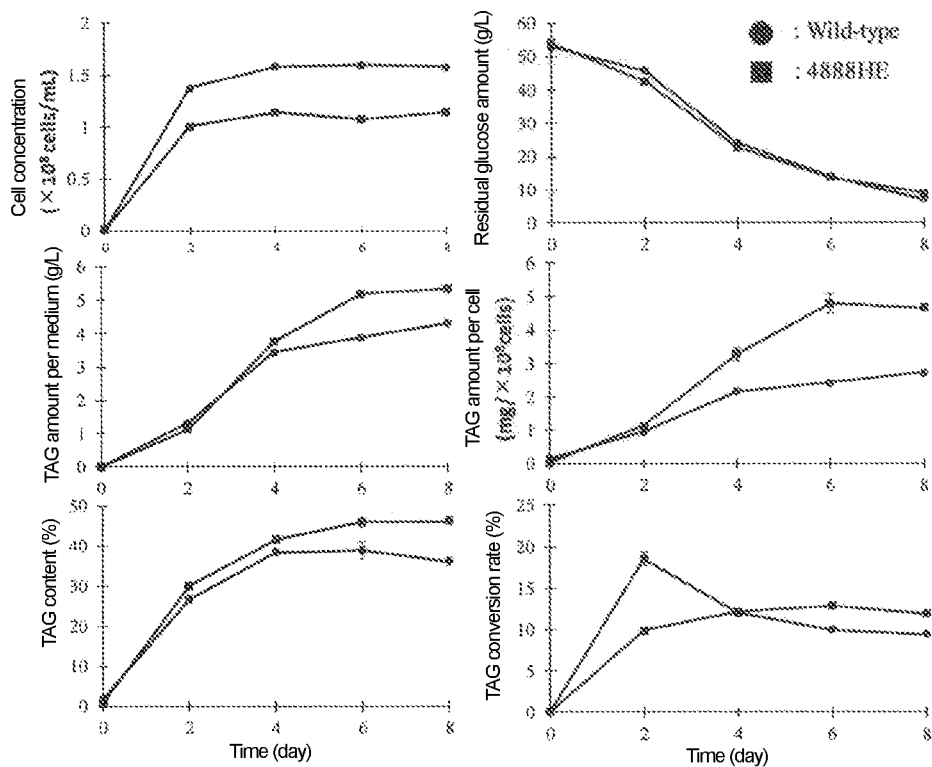

FIG. 19 shows the lipid productivity of 4888 gene high-expression strain. The horizontal axis of each graph shows the elapsed time from the start of culture.

Figure 20:
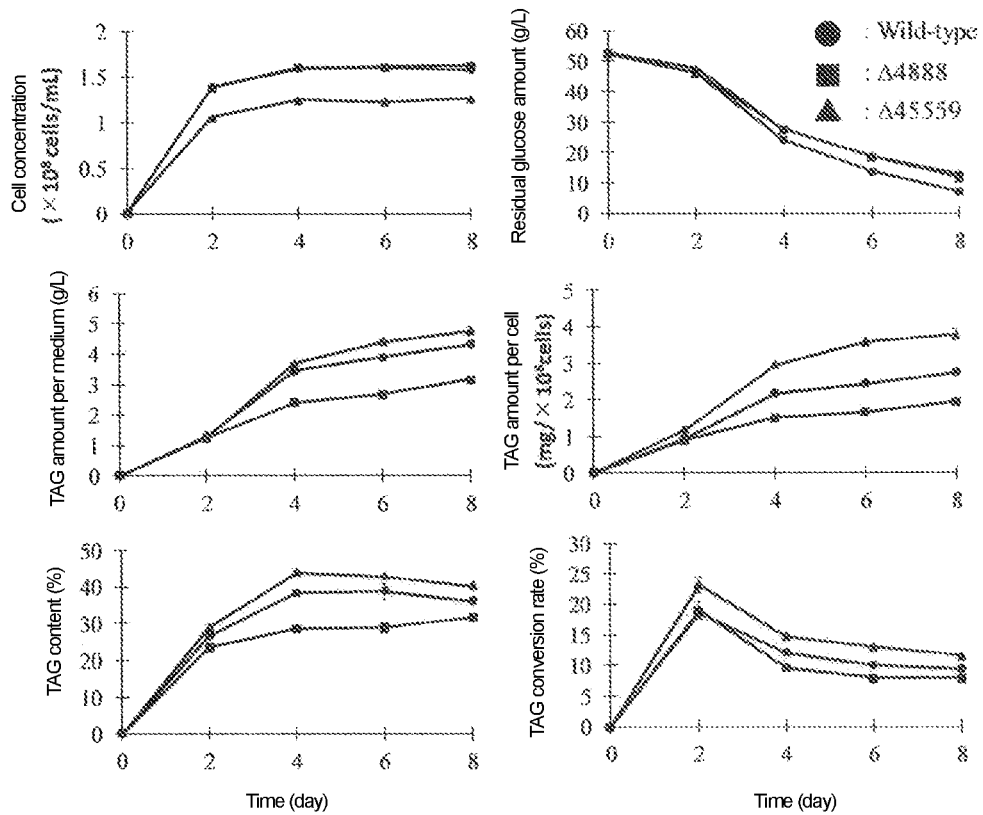

FIG. 20 shows the lipid productivity of 4888 gene-disrupted strain and 45559 gene-disrupted strain. The horizontal axis of each graph shows the elapsed time from the start of culture.

Figure 21:
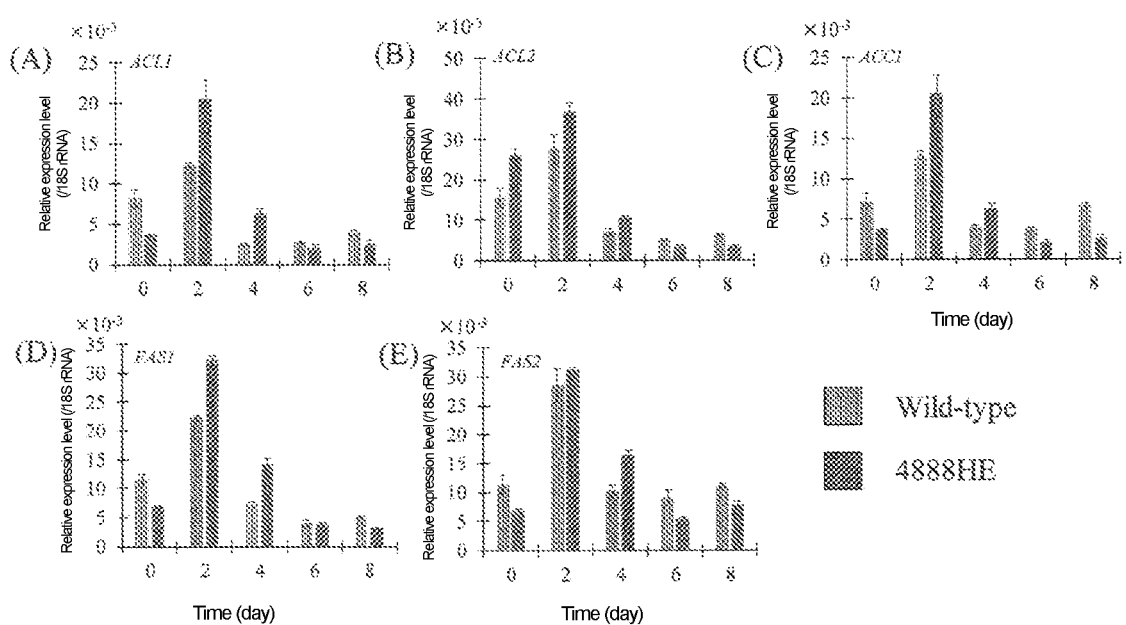

FIG. 21 shows the relative expression levels of acyl CoA-related genes: (A) ACL1, (B) ACL2, (C) ACC1, (D) FAS1, and (E) FAS2 in 4888 gene high-expression strain. Each graph shows the average of three independent measurements, and error bars show standard errors. The horizontal axis of each graph shows the elapsed time from the start of culture.

Figure 22:
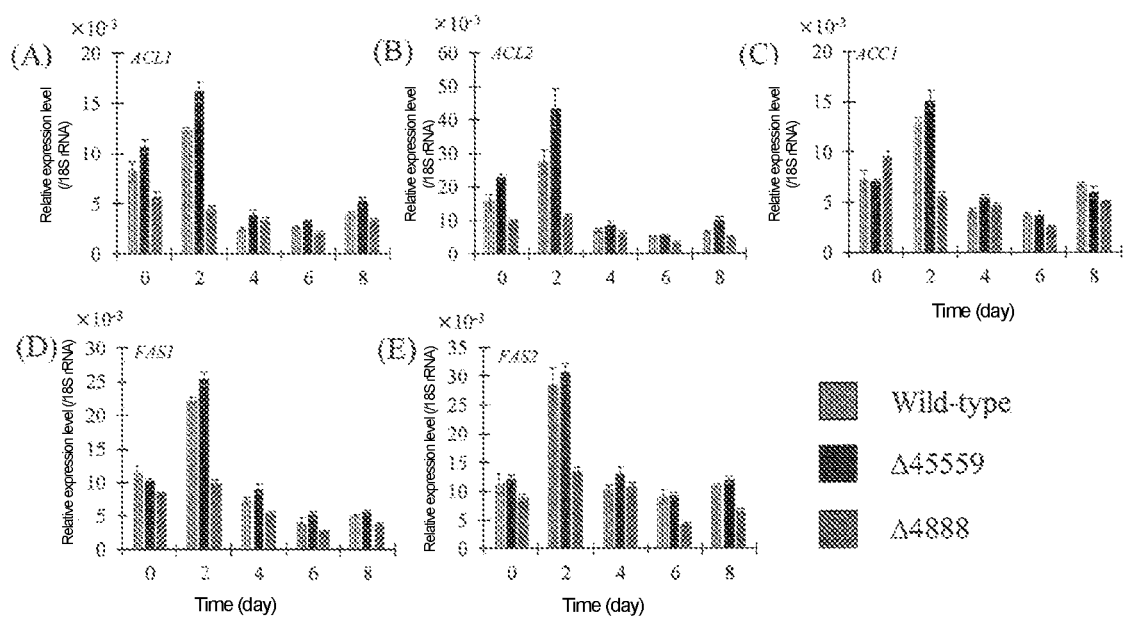

FIG. 22 shows the relative expression levels of acyl CoA-related genes: (A) ACL1, (B) ACL2, (C) ACC1, (D) FAS1, and (E) FAS2 in 4888 gene-disrupted strain and 45559 gene-disrupted strain. Each graph shows the average of three independent measurements, and error bars show standard errors. The horizontal axis of each graph shows the elapsed time from the start of culture.

Figure 23:
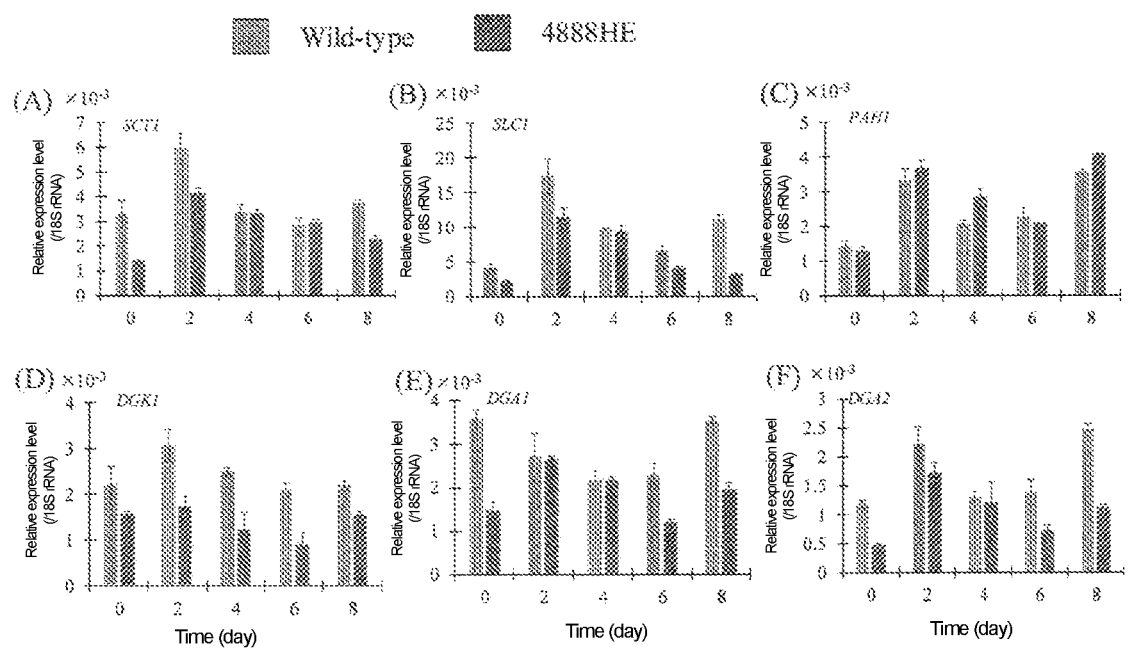

FIG. 23 shows the relative expression levels of Kennedy pathway-related genes: (A) SCT1, (B) SLC1, (C) PAH1, (D) DGK1, (E) DGA1, and (F) DGA2 in 4888 gene high-expression strain. Each graph shows the average of three independent measurements, and error bars show standard errors. The horizontal axis of each graph shows the elapsed time from the start of culture.

Figure 24:
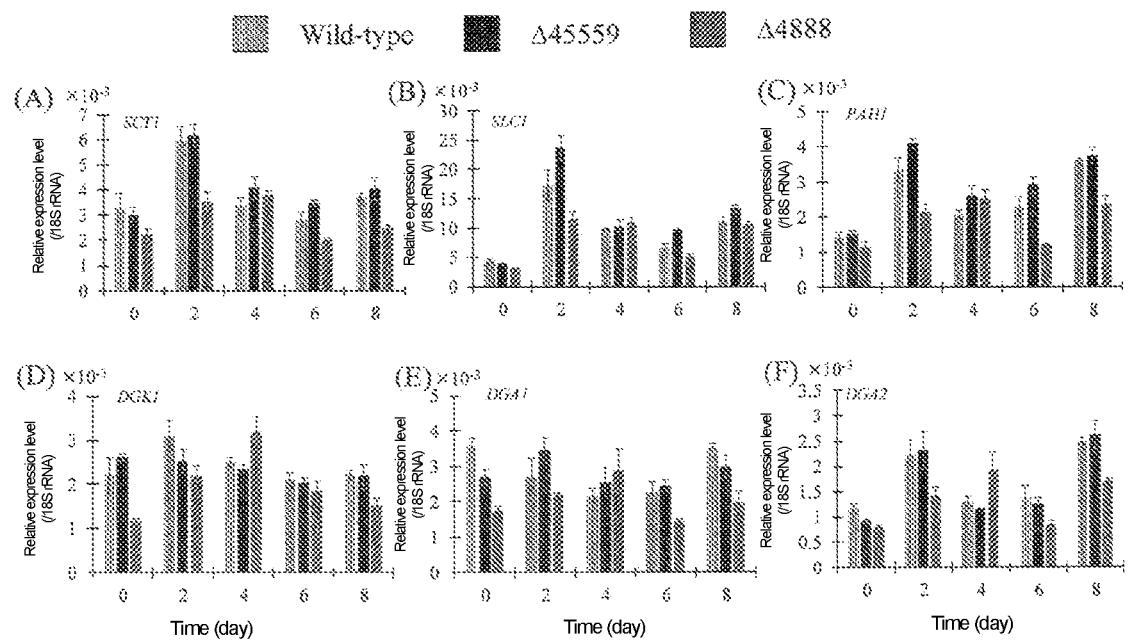

FIG. 24 shows the relative expression levels of Kennedy pathway-related genes: (A) SCT1, (B) SLC1, (C) PAH1, (D) DGK1, (E) DGA1, and (F) DGA2 in 4888 gene-disrupted strain and 45559 gene-disrupted strain. Each graph shows the average of three independent measurements, and error bars show standard errors. The horizontal axis of each graph shows the elapsed time from the start of culture.

DESCRIPTION OF EMBODIMENTS

1. Definition

In the present specification, the phrase "yeast XXX gene" refers to a gene identified by the Transcript Id number (which corresponds to "XXX (multi-digit number)" in the phrase) of Lipomyces starkeyi in a database for genes (https://mycocosm.jgi.doe.gov/Lipst1_1/ Lipst1_1.home.html), and also refers to an orthologous gene of the gene.

In the present specification, the expressions "comprise," "include, and "contain" include the concepts of "comprising," "containing," "consisting essentially of," and "consisting of."

In the present specification, the "identity" of amino acid sequences refers to the degree to which two or more contrastable amino acid sequences match each other. Thus, the greater the degree of match between two amino acid sequences, the greater the identity or similarity of those sequences. The degree of the identity of amino acid sequences can be determined by using, for example, FASTA, a tool for sequence analysis, with default parameters. Alternatively, the degree of identity of amino acid sequences can be determined by using BLAST, an algorithm by Karlin and Altschul (Karlin S, Altschul SF. Methods for assessing statistical significance of molecular sequence features by using general scoring schemes. Proc Natl Acad Sci USA. 87, pp. 2264-2268 (1990), Karlin S, Altschul SF. Applications and statistics for multiple high-scoring segments in molecular sequences. Proc Natl Acad Sci USA. 90: 5873-7 (1993)). A program called "BLASTX" has been developed based on the BLAST algorithm. The specific techniques of these analysis methods are known and can be found at the National Center of Biotechnology Information (NCBI) website (http://www.ncbi.nlm.nih.gov/). The "identity" of bases sequences is also defined according to the above description.

In the present specification, "conservative substitution" refers to the substitution of an amino acid residue with another amino acid residue with a similar side chain. For example, substitution between amino acid residues each having a basic side chain such as lysine, arginine, or histidine is the conservative substitution. The following substitution is also considered to be conservative substitution: substitution between amino acid residues with an acidic side chain such as aspartic acid or glutamic acid; substitution between amino acid residues with an uncharged polar side chain such as glycine, asparagine, glutamine, serine, threonine, tyrosine, or cysteine; substitution between amino acid residues with a nonpolar side chain such as alanine, valine, leucine, isoleucine, proline, phenylalanine, methionine, or tryptophan; substitution between amino acid residues with a β-branched side chain such as threonine, valine, or isoleucine; and substitution between amino acid residue with an aromatic side chain such as tyrosine, phenylalanine, tryptophan, or histidine.

In the present specification, known chemical modification may be added to polynucleotides such as DNA and RNA as described below as examples. To prevent degradation caused by hydrolytic enzymes such as nucleases, the phosphoric acid residue (phosphate) of each nucleotide can be substituted with a chemically modified phosphoric acid residue, such as phosphorothioate (PS), methylphosphonate, or phosphorodithionate. The hydroxyl group at the 2-position of the ribose of each ribonucleotide may be substituted with —OR (R represents, for example, $CH_3$ (2'-O-Me), $CH_2CH_2OCH_3$ (2'-O-MOE), $CH_2CH_2NHC(NH)NH_2$, $CH_2CONHCH_3$, or $CH_2CH_2CN$). Chemical modification may also be added to a base moiety (pyrimidine, purine), for example, by introducing a methyl group or a cationic functional group into the 5-position of the pyrimidine base, or by substituting the carbonyl group at the 2-position with thiocarbonyl. Additionally, chemical modification also includes, but is not limited to, the phosphoric acid moiety or the hydroxyl moiety modified with, for example, biotin, an amino group, a lower alkylamine group, or an acetyl group. Also preferably usable is BNA (LNA) whose sugar moiety of the nucleotide is fixed in the conformation of N-form due to the 2'-oxygen of the sugar moiety crosslinked with the 4'-carbon.

2. A Method for Producing a Yeast with a Regulated Lipid

Production Capacity

In an aspect, the present invention relates to a method for producing a yeast with a regulated lipid production capacity, the method comprising performing on a yeast at least one selected from the group consisting of the following (1), (2), (3), and (4):

(1) regulating the expression and/or function of a yeast 115694 gene, (2) expressing the yeast 115694 gene having a mutation in a region between the transmembrane domain and the nuclear localization signal, (3) regulating the expression and/or function of a yeast 4888 gene, and (4) regulating the expression and/or function of a yeast 45559 gene (in the present specification, "the method for producing a yeast of the present invention").

This method is described below.

The yeast can be any yeast capable of producing a lipid. The yeast is more preferably an oleaginous yeast. The oleaginous yeast can be any oleaginous yeast with a high lipid accumulation. For example, the oleaginous yeast can achieve a high lipid content, such as 20% (w/w) or more, preferably 30% (w/w) or more, more preferably 40% (w/w) or more, still more preferably 50% (w/w) or more, and yet more preferably 60% (w/w) or more. Specifically, examples of oleaginous yeasts include yeasts that belong to the genus Rhodosporidium such as Rhodosporidium toruloides, yeasts that belong to the genus Lipomyces such as Lipomyces starkeyi, yeasts that belong to the genus *Cryptococcus* such as *Cryptococcus albidus*, yeasts that belong to the genus *Rhizopus* such as *Rhizopus arrhizus*, and yeasts that belong to the genus *Yarrowia* such as *Yarrowia lipolytica*. Of these, the oleaginous yeast is preferably a yeast that belongs to the genus Rhodosporidium, a yeast that belongs to the genus Lipomyces, and a yeast that belongs to the genus *Cryptococcus*, more preferably a yeast that belongs to the genus Lipomyces, and still more preferably Lipomyces starkeyi.

The yeast 115694 gene encodes a protein with an IPT/TIG domain, an Ankyrin repeat domain, a nuclear localization signal, and a transmembrane region. The protein is a transcription factor located on the membrane, and is expected to be cleaved at a site between the nuclear localization signal and the transmembrane region when translocated to the nucleus. In various yeasts, the base sequence and amino acid sequence of the yeast 115694 gene are known, or can be readily determined based on a known base sequence or amino acid sequence of the yeast 115694 gene (e.g., by analysis of identity with these sequences). For example, the amino acid sequence of the yeast 115694 gene of Lipomyces starkeyi is the amino acid sequence represented by SEQ ID NO: 1, and the base sequence encoding the protein of the yeast 115694 gene of Lipomyces starkeyi is the base sequence represented by SEQ ID NO: 2.

The base sequence and amino acid sequence of the yeast 4888 gene are known in various yeasts, or can be readily determined based on a known base sequence or amino acid sequence of the yeast 4888 gene (e.g., by analysis of identity with these sequences). For example, the amino acid sequence of the yeast 4888 gene of Lipomyces starkeyi is the amino acid sequence represented by SEQ ID NO: 68, and the base sequence encoding the protein of the yeast 4888 gene of Lipomyces starkeyi is the base sequence represented by SEQ ID NO: 69.

The yeast 45559 gene encodes an intramembrane metalloprotease. In various yeasts, the base sequence and amino acid sequence of the yeast 45559 gene are known, or can be readily determined based on a known base sequence or amino acid sequence of the yeast 45559 gene (by analysis of identity with these sequences). For example, the amino acid sequence of the yeast 45559 gene of Lipomyces starkeyi is the amino acid sequence represented by SEQ ID NO: 70, and the base sequence encoding the protein of the yeast 45559 gene of Lipomyces starkeyi is the base sequence represented by SEQ ID NO: 71.

In the present specification, these three genes (yeast 115694 gene, yeast 4888 gene, and yeast 45559 gene) are collectively referred to as a "target gene."

The target gene includes naturally occurring variants. The target gene may have base mutations such as substitution, deletion, addition, or insertion, as long as the properties of the protein encoded by the target gene are not significantly impaired. The mutations are preferably a mutation that does not result in amino acid substitution in the protein translated from mRNA, or preferably a mutation that causes conservative substitution of an amino acid.

For example, the amino acid sequence of the protein encoded by the target gene has, for example, at least 95%, preferably at least 98%, and more preferably at least 99% identity with the amino acid sequence of the protein encoded by the wild-type target gene of an animal of the same species. For example, the amino acid sequence of the protein encoded by the target gene is identical to the amino acid sequence of the protein encoded by the wild-type target gene of an animal of the same species; or has one, or two or more (e.g., 2 to 10, preferably 2 to 5, more preferably 2 to 3, and still more preferably 2) substitutions, deletions, additions, or insertions compared with the amino acid sequence of the protein encoded by the wild-type target gene of an animal of the same species.

The yeast 115694 gene in particular includes a yeast 115694 gene having a mutation in a region between the transmembrane domain and the nuclear localization signal. The transmembrane domain is, for example, the amino acid region at positions 1232 to 1254 from the N-terminus in the amino acid sequence of the yeast 115694 gene of Lipomyces starkeyi (SEQ ID NO: 1), and the nuclear localization signal is, for example, the amino acid region at positions 515 to 524 from the N-terminus in the amino acid sequence (SEQ ID NO: 1). The region that has one or more mutations is preferably the amino acid region at positions 1100 to 1200, more preferably the amino acid region at positions 1100 to 1150, and still more preferably the amino acid regions at positions 1100 to 1125 from the N-terminus in the amino acid sequence of the yeast 115694 gene represented by SEQ ID NO: 1. In particular, in the amino acid sequence of the yeast 115694 gene represented by SEQ ID NO: 1, an amino acid mutation is preferably present in at least one amino acid selected from the group consisting of the amino acid at position 1108, the amino acid at position 1115, and the amino acid at position 1119, all of which are from the N-terminus. Mutation in these positions appears to make it easier for cleavage to occur between the nuclear localization signal and the transmembrane domain, promote nuclear translocation, and enhance the function of the gene as a transcription factor.

The phrase "regulating the expression and/or function" of the target gene means regulating (increasing or decreasing) the expression level of the target gene or the function of the target gene (i.e., inherent function), and is not particularly limited as long as it is so. The "expression" of the target gene includes both the expression of mRNA of the target gene and the expression of the protein of the target gene, and is preferably the expression of the protein of the target gene. The "increase" mans that the activity and/or the expression level of the target gene in a sample collected from a yeast obtained by the yeast production method of the present invention (a yeast at a given point in time during culture, preferably a yeast at an early stage from the start of culture; e.g., after one day from culture) is higher than the activity and/or the expression level of the target gene in a sample obtained from the yeast that is before subjected to the yeast production method of the present invention (e.g., 1.5-fold, 2-fold, 3-fold, 4-fold, or 5-fold). The "decrease" means that the activity and/or the expression level of the target gene in a sample collected from a yeast obtained by the yeast production method of the present invention (a yeast at a given point in time during culture, preferably a yeast at an early stage from the start of culture; e.g., after one day from culture) is lower than the activity and/or the expression level of the target gene in a sample obtained from the yeast that is before subjected to the yeast production method of the present invention (e.g., $\frac{1}{2}$, $\frac{1}{5}$, $\frac{1}{10}$, $\frac{1}{20}$, $\frac{1}{50}$, $\frac{1}{100}$, $\frac{1}{200}$, $\frac{1}{500}$, $\frac{1}{1000}$, $\frac{1}{2000}$, $\frac{1}{5000}$, or $\frac{1}{10000}$ or less). The activity and/or the expression level of the target gene can be measured in accordance with a known method.

The method for regulating the expression and/or function of the target gene is not particularly limited, and can be a method in accordance with or pursuant to a known method. To increase the expression and/or function of the target gene, for example, a technique such as the following can be used: introducing an expression cassette of the target gene, and modifying the expression control region of the target gene (e.g., replacing the promoter with a more active promoter, or introducing a transcriptional activation element). Examples of highly active promoters usable as a promoter of the expression cassette or as a promoter after replacement include, but are not limited to, TDH3 promoter, GAL10 promoter, CMV promoter, EF1 promoter, SV40 promoter, MSCV promoter, CAG promoter, and an artificial promoter prepared by artificially combining a transcriptional activation element and a core promoter. To decrease the expression and/or function of the target gene, for example, a technique such as the following can be used: deleting the target gene, introducing a mutation into the protein-coding region of the target gene (e.g., introducing a stop codon in the middle of the coding region, or introducing a mutation that causes frame shift), introducing a mutation into the splicing regulatory region of the target gene (e.g., introducing a mutation into the cis-element of the splicing control), and introducing a mutation into the expression control region of the target gene (e.g., introducing a mutation into the transcriptional activation element); of these, gene deletion is preferable. More specifically, these methods can be performed by using a technique such as the CRISPR/Cas system, TALEN system, siRNA, miRNA, or transformation in accordance with or pursuant to a known genetic engineering technique.

The method for producing a yeast of the present invention preferably includes performing at least one member selected from the group consisting of the following (1A), (2), (3A), and (4A):
 (1A) increasing the expression and/or function of the yeast 115694 gene,
 (2) expressing the yeast 115694 gene having a mutation in a region between the transmembrane domain and the nuclear localization signal,
 (3A) increasing the expression and/or function of the yeast 4888 gene, and
 (4A) decreasing the expression and/or function of the yeast 45559 gene.

This enables the production of a yeast with an increased lipid production capacity.

The method for producing a yeast of the present invention more preferably includes performing at least one member selected from the group consisting of (1Aa), (2), (3Aa), and (4Aa):
 (1Aa) increasing the expression of the yeast 115694 gene,
 (2) expressing the yeast 115694 gene having a mutation in a region between the transmembrane domain and the nuclear localization signal,
 (3Aa) increasing the expression of the yeast 4888 gene, and
 (4Aa) decreasing the expression of the yeast 45559 gene.

This enables the production of a yeast with an increased lipid production capacity.

3. Reagent for Producing a Yeast with a Regulated Lipid Production Capacity

In an aspect, the present invention relates to a reagent for use in the production of a yeast with a regulated lipid production capacity containing at least one selected from the group consisting of the following (1'), (2'), (3'), and (4'):
 (1') at least one member selected from the group consisting of an expression regulator for the yeast 115694 gene and a function regulator for the yeast 115694 gene,
 (2') at least one member selected from the group consisting of a mutation introducer for a region between the transmembrane domain and the nuclear localization signal of the yeast 115694 gene, and an expression cassette of the yeast 115694 gene having a mutation in a region between the transmembrane domain and the nuclear localization signal, (3') at least one member selected from the group consisting of an expression regulator of the yeast 4888 gene and a function regulator of the yeast 4888 gene, and (4') at least one member selected from the group consisting of an expression regulator of the yeast 45559 gene and a function regulator of the yeast 45559 gene (in the present specification, "the reagent for use in the production of a yeast of the present invention").

The following describes the reagent. For matters not described in this section, the description in section "2. A method for producing a yeast with a regulated lipid production capacity" above is applicable.

3-1. Target Gene Expression Regulator

The target gene expression regulator can be any expression regulator that can regulate the expression of the target gene protein or target gene mRNA. Examples of target gene expression regulators include target gene expression inhibitors, and target gene expression promoters. These target gene expression regulators can be used singly or in a combination of two or more.

3-1-1. Target Gene Expression Inhibitor

The target gene expression inhibitor can be any expression inhibitor that can limit the expression level of the target gene protein or target gene mRNA. Examples of target gene expression inhibitors include target-gene-specific small interfering RNA (siRNA), target-gene-specific microRNA (miRNA), target-gene-specific antisense nucleic acids, and expression vectors of these; target-gene-specific ribozymes; and target gene editors using a CRISPR/Cas system.

3-1-1-1. siRNA, miRNA, Antisense Nucleic Acid, and Ribozyme

The target-gene-specific siRNA is not particularly limited as long as the target-gene-specific siRNA is a double-stranded RNA molecule that specifically limits the expression of the target gene. In an embodiment, siRNA is preferably, for example, 18 bases or more, 19 bases or more, 20 bases or more, or 21 bases or more in length. siRNA is preferably, for example, bases or less, 24 bases or less, 23 bases or less, or 22 bases or less in length. The upper limit and lower limit of the length of siRNA described above can be freely combined. For example, a length by the following combination is assumed: a length with its lower limit of 18 bases and its upper limit of bases, 24 bases, 23 bases, or 22 bases; a length with its lower limit of 19 bases and its upper limit of 25 bases, 24 bases, 23 bases, or 22 bases; a length with its lower limit of bases and its upper limit of 25 bases, 24 bases, 23 bases, or 22 bases; and a length with its lower limit of 21 bases and its upper limit of 25 bases, 24 bases, 23 bases, or 22 bases.

siRNA may be shRNA (small hairpin RNA). shRNA can be designed so as to partially form a stem-loop structure. For example, shRNA can be designed as follows: the sequence of a region is determined to be sequence a, and the complementary strand for sequence a is determined to be sequence b; sequence a, a spacer, and sequence b are arranged so as to be present in this order in a single RNA strand with the entire length being to 60 bases. Sequence a is a sequence of a portion of the base sequence encoding the target gene of interest. The target region is not particularly limited, and any region can be selected as a candidate. The sequence a is 19 to 25 bases, and preferably 19 to 21 bases in length.

The target-gene-specific siRNA may have additional bases at the 5' or 3'-terminus. The length of the additional bases is typically about 2 to 4 bases. The additional bases may be DNA or RNA; the use of DNA may improves the stability of the nucleic acid. Examples of the sequence of such additional bases include, but are not limited to, sequences such as ug-3', uu-3', tg-3', tt-3', ggg-3', guuu-3', gttt-3', ttttt-3', and uuuuu-3'.

siRNA may have a protruding sequence (overhang) at the 3'-terminus, specifically, a sequence having dTdT (dT denotes deoxythymidine) added. siRNA may also have a blunt end, which has no terminal addition. siRNA may have a sense strand and an antisense strand whose number of bases differ, such as an asymmetrical interfering RNA (aiRNA) whose antisense strand has a protruding sequence (overhang) at the 3'-terminus and the 5'-terminus. A typical aiRNA has an antisense strand composed of 21 bases and a sense strand composed of 15 bases, with each end of the antisense strand having an overhang structure of 3 bases.

The location of the target sequence of target-gene-specific siRNA is not particularly limited. In an embodiment, it is preferable to select a target sequence from the region other than the following: 5'-UTR, about 50 bases from the initiation codon, and 3'-UTR. It is preferable to examine the candidate group of selected target sequences to find homology in mRNA other than the target in a continuous sequence of 16-17 bases by using homology search software such as BLAST (http://www.ncbi.nlm.nih.gov/BLAST/) and confirm the specificity of the selected target sequences. For specificity-confirmed target sequences, double-stranded RNA that has a sense strand having a 3'-terminal overhang of TT or UU in 19-21 bases after AA (or NA) and an antisense strand with a sequence complementary to the 19-21 bases and a 3'-terminal overhang of TT or UU may be designed as siRNA. shRNA, which is a precursor of siRNA, can be designed by suitably selecting a linker sequence that can form a loop structure (e.g., about 5-25 bases), and linking the sense strand with the antisense strand via the linker sequence.

The sequence of siRNA and/or shRNA can be searched by using search software provided free of charge on various websites. Examples of such websites include the following: siRNA Target Finder provided by Ambion, Inc. (http://www.ambion.com/jp/techlib/misc/siRNA_finder.html), pSilencer® Expression Vector insert design tool (http://www.ambion.com/jp/techlib/misc/psilencer_converter.html) and GeneSeer (http://codex.cshl.edu/scripts/newsearchhairpin.cgi) provided by RNAi Codex.

siRNA can be prepared by synthesizing the sense strand and the antisense strand of a target sequence on mRNA with a DNA/RNA automatic synthesizer, degenerating the synthesized strands in an appropriate annealing buffer solution at about 90 to about 95° C. for about 1 minute, and then annealing the strands at about 30 to about 70° C. for about 1 to about 8 hours. siRNA can also be prepared by synthesizing shRNA (a precursor of siRNA), and cleaving it with an RNA cleavage protein dicer.

Target-gene-specific miRNA can be any miRNA that inhibits the translation of the target gene. For example, miRNA may bind to the 3'-untranslated region (UTR) of the target to inhibit the translation, unlike siRNA, which cleaves target mRNA. miRNA may be pri-miRNA (primary miRNA), pre-miRNA (precursor miRNA), or mature miRNA. The length of miRNA is not particularly limited. The length of pri-miRNA is typically hundreds to thousands of bases, the length of pre-miRNA is typically 50 to 80 bases, and the length of mature miRNA is typically 18 to 30 bases. In an embodiment, target-gene-specific miRNA is preferably pre-miRNA or mature miRNA, and more preferably mature miRNA. Such target-gene-specific miRNA may be synthesized by a known technique or purchased from a vendor that provides synthetic RNA.

A target-gene-specific antisense nucleic acid refers to a nucleic acid that has a base sequence complementary or substantially complementary to the base sequence of mRNA of the target gene, or a nucleic acid that contains a portion of such a base sequence, and has functionality of binding to the mRNA, forming a specific, stable double strand to inhibit the protein synthesis of the target gene. The antisense nucleic acid may be DNA, RNA, or a DNA-RNA chimera. An antisense nucleic acid in the form of DNA allows endogenous ribonuclease H (RNase H) to recognize a RNA:DNA hybrid formed by a target RNA and the antisense DNA, causing selective degradation of the target RNA. Thus, if the antisense nucleic acid is RNase H degradation-oriented antisense DNA, the target sequence may be the sequence of an intron region in the initial translation product of the target gene as well as a sequence in mRNA. The intron sequence can be determined by comparing a genomic sequence with the cDNA base sequence of the target gene by using a homology search program such as BLAST or FASTA.

The length of the target region of the target-gene-specific antisense nucleic acid is not limited as long as the hybridization of the antisense nucleic acid results in the inhibition of translation of the target gene into protein. The target-gene-specific antisense nucleic acid may be a full sequence or a partial sequence of mRNA encoding the target gene. Given the simplicity of synthesis and the issues of antigenicity and intracellular migration, the target-gene-specific antisense nucleic acid is preferably, but is not limited to, an oligonucleotide composed of about 10 to about 40 bases, particularly about 15 to about 30 bases. More specifically, for example, the 5'-terminal hairpin loop, the 5'-terminal untranslated region, the translation initiation codon, the protein coding region, the ORF translation stop codon, the 3'-terminal untranslated region, the 3'-terminal palindromic domain, or the 3'-terminal hairpin loop of the target gene can be selected as a preferable target region of the antisense nucleic acid, although the target region is not limited to these.

The target-gene-specific antisense nucleic acid may be not only an antisense nucleic acid that hybridizes with mRNA of the target gene or its initial transcript to inhibit the translation of the gene into a protein, but may also be an antisense nucleic acid that binds to these genes (double-stranded DNA) to form a triple strand (triplex), thereby inhibiting the transcription into RNA (antigene).

The target-gene-specific siRNA, target-gene-specific miRNA, and target-gene-specific antisense nucleic acid can be prepared by determining the target sequence of mRNA or an initial transcript on the basis of the cDNA sequence or the genomic DNA sequence of the target gene, and synthesizing a sequence complementary to the determined sequence by using a commercially available DNA/RNA automatic synthesizer. Antisense nucleic acids with various modifications can also be chemically synthesized by a known technique.

The expression cassette of target-gene-specific siRNA, target-gene-specific miRNA, or target-gene-specific antisense nucleic acid can be any polynucleotide into which target-gene-specific siRNA, target-gene-specific miRNA, or a target-gene-specific antisense nucleic acid is incorporated in an expressible state. Typically, the expression cassette is a polynucleotide containing a promoter sequence and a sequence encoding target-gene-specific siRNA, target-gene-specific miRNA, or a target-gene-specific antisense nucleic acid (optionally with a transcription termination signal sequence), and optionally contains other sequences. The promoter is not particularly limited, and examples include RNA polymerase II (polII) promoters such as CMV promoter, EF1 promoter, SV40 promoter, MSCV promoter, hTERT promoter, R-actin promoter, and CAG promoter; and RNA polymerase III (polIII) promoters such as mouse-and-human U6-snRNA promoter, human H1-RNase P RNA promoter, and human valine-tRNA promoter. Of these, polIII promoters are preferable from the standpoint of their capability to accurately transcribe short RNAs. Various promoters that can be induced by a drug are also usable. Other sequences for use are not particularly limited and can be various known sequences that can be incorporated in an expression vector. An example of such sequences is replication origin or a drug-resistant gene. The type of drug-resistant genes and the type of vectors are those as described above.

Another example of target gene expression inhibitors is a target-gene-specific ribozyme. Although the term "ribozyme" in a narrow sense refers to RNA with enzymatic activity that cleaves a nucleic acid, the term "ribozyme" in the present invention also includes DNA that has sequence-specific nucleic acid cleavage activity. The most versatile ribozyme nucleic acid is self-splicing RNA found in infectious RNA such as viroid and virusoid; hammerhead ribozymes and hairpin ribozymes are known. The hammerhead ribozymes exerts enzyme activity in a length of about 40 bases. Several bases of the ribozymes at each end adjacent to the portion of the hammerhead structure (about 10 bases in total) arranged so as to be complementary to the desired cleavage site of mRNA make it possible to specifically cleave only target mRNA. This type of ribozyme nucleic acid is advantageous in that such a ribozyme nucleic acid does not attack genomic DNA because of its use of only RNA as a substrate. If mRNA of the target gene has a double-stranded structure itself, the use of a hybrid ribozyme linked with an RNA motif derived from a viral nucleic acid that can specifically bind to RNA helicase allows the target sequence to form as a single strand (Proc. Natl. Acad. Sci. USA, 98 (10): 5572-5577 (2001)). Additionally, if a ribozyme is used in the form of an expression vector that contains DNA encoding the ribozyme, the ribozyme can be a hybrid ribozyme further linked with a tRNA-modified sequence to facilitate the migration of the transcript to cytoplasm (Nucleic Acids Res., 29 (13): 2780-2788 (2001)).

3-1-1-2. Gene Editor

The target gene editor can be any gene editor that can inhibit the expression of the target gene by using a target-sequence-specific nuclease system (e.g., CRISPR/Cas system). The expression of the target gene can be inhibited by, for example, disruption of the target gene or inhibition of the activity of the promoter by modifying the promoter of the target gene.

For example, if the CRISPR/Cas system is used, the target gene editor for use can be typically, but is not limited to, a guide RNA expression cassette targeting the target gene or its promoter, or a vector containing a Cas protein expression cassette (target gene editing vector). In addition to this typical example, a combination of a vector containing guide RNA targeting the target gene or its promoter and/or a vector containing a Cas protein expression cassette and/or the expression cassette is usable as a target gene editor.

The guide RNA expression cassette can be any polynucleotide used for expressing guide RNA in a yeast. Typical examples of expression cassettes include polynucleotides that contain a promoter and a sequence encoding the entire guide RNA or a portion of guide RNA placed under the control of the promoter. In other words, the phrase "placed under the control of the promoter" means that the sequence encoding guide RNA is placed such that the transcription of the sequence is controlled by the promoter. In a specific embodiment of placement, for example, the sequence encoding guide RNA is placed immediately under the 3'-terminus of the promoter (e.g., an embodiment in which the number of base pairs (bp) from the base at the 3'-terminus of the promoter to the base of the 5'-terminus of the sequence encoding guide RNA is, for example, 100 bp or less, and preferably 50 bp or less).

The promoter for the guide RNA expression cassette is not particularly limited, and can be a pol II promoter. From the standpoint of accurate transcription of relatively short RNA, pol III promoters are preferable. Pol III promoters are not particularly limited; examples include mouse-and-human U6-snRNA promoter, human H1-RNase P RNA promoter, and human valine-tRNA promoter. Various promoters that can be induced by a drug are also usable.

The sequence encoding guide RNA can be any base sequence that encodes guide RNA.

The guide RNA can be any guide RNA usable in the CRISPR/Cas system. For example, a range of RNAs that bind to the target site of genomic DNA (e.g., the target gene, and its promoter) and also bind to Cas protein to guide the Cas protein into the target site of genomic DNA are usable.

In the present specification, the target site refers to a site on genomic DNA formed of a PAM (Proto-spacer Adjacent Motif) sequence, a DNA strand (target strand) composed of a sequence of about 17 to 30 bases adjacent to the 5'-terminus of the PAM sequence (preferably 18 to 25 bases, more preferably 19 to 22 bases, and particularly preferably 20 bases in length), and its complementary DNA strand (non-target strand).

The PAM sequence varies depending on the type of Cas protein for use. For example, the PAM sequence corresponding to Cas9 protein derived from *S. pyogenes* (type II) is 5'-NGG. The PAM sequence corresponding to Cas9 protein derived from *S. solfataricus* (type I-A1) is 5'-CCN. The PAM sequence corresponding to Cas9 protein derived from *S. solfataricus* (type I-A2) is 5'-TCN. The PAM sequence corresponding to Cas9 protein derived from *H. walsbyi* (type I-B) is 5'-TTC. The PAM sequence corresponding to Cas9 protein derived from *E. coli* (type I-E) is 5'-AWG. The PAM sequence corresponding to Cas9 protein derived from *E. coli* (type I-F) is 5'-CC. The PAM sequence corresponding to Cas9 protein derived from *P. aeruginosa* (type I-F) is 5'-CC. The PAM sequence corresponding to Cas9 protein derived from S. *Thermophilus* (type II-A) is 5'-NNAGAA. The PAM sequence corresponding to Cas9 protein derived from *S. agalactiae* (type II-A) is 5'-NGG. The PAM sequence corresponding to Cas9 protein derived from *S. aureus* is 5'-NGRRT or 5'-NGRRN. The PAM sequence corresponding to Cas9 protein derived from *N. meningitidis* is 5'-NNNNGATT. The PAM sequence corresponding to Cas9 protein derived from *T. denticola* is 5'-NAAAAC.

Guide RNA has a sequence involved in binding to the target site of genomic DNA (also referred to as "crRNA (CRISPR RNA) sequence"). Because this crRNA sequence complementarily (preferably, complementarily and specifically) binds to a sequence formed by removing the sequence complementary to the PAM sequence of the non-target strand, guide RNA can bind to the target site of genomic DNA.

The phrase "complementarily binds . . . " includes not only the binding based on a complete complementary relationship (A and T, and G and C), but also binding based on a complementary relationship to the extent that hybridization occurs under stringent conditions. Stringent conditions can be determined based on the melting temperature (Tm) of a nucleic acid to which a complex or probe binds, as taught by Berger and Kimmel (1987, Guide to Molecular Cloning Techniques Methods in Enzymology, Vol. 152, Academic Press, San Diego, CA). For example, washing conditions after hybridization are typically the following: 1×SSC, 0.1% SDS, and 37° C. Guide RNA is preferably the one that maintains its hybridized form after washing under the conditions. Although hybridization conditions are not particular limited, more stringent hybridization conditions for washing are the following: 0.5×SSC, 0.1% SDS, and 42° C.; further more stringent hybridization conditions are the following: 0.1×SSC, 0.1% SDS, and 65° C.

Specifically, within the crRNA sequence, the sequence that binds to the target sequence has, for example, at least 90%, preferably at least 95%, more preferably at least 98%, still more preferably at least 99%, and particularly preferably at least 100% identity with the target strand. For guide RNA to bind to the target site, within the crRNA sequence, 12 bases at the 3'-terminus of the sequence that binds to the target sequence are considered to be important. Thus, if the sequence that binds to the target sequence within the crRNA sequence is not identical to the target strand, it is preferred that the bases different from the target strand be present outside the 12 bases at the 3'-terminus of the sequence that binds to the target sequence within the crRNA sequence.

Guide RNA has a sequence involved in the binding with Cas protein (also referred to as "tracrRNA (trans-activating crRNA) sequence"). This tracrRNA sequence binds to Cas protein to guide Cas protein into the target site of genomic DNA.

The tracrRNA sequence is not particularly limited. The tracrRNA sequence is typically RNA composed of a sequence of about 50 to 100 bases in length that can form multiple (typically three) stem-loops, and the sequence varies according to the type of the Cas protein for use. Various known sequences are usable as a tracrRNA sequence, according to the type of the Cas protein for use.

Guide RNA typically contains the crRNA sequence described above and a tracrRNA sequence. In an embodiment, guide RNA may be single-stranded RNA (sgRNA) containing a crRNA sequence and a tracrRNA sequence, or an RNA complex formed by RNA containing a crRNA sequence complementarily bound to RNA containing a tracrRNA sequence.

The Cas protein expression cassette can be any polynucleotide that is used for expressing Cas protein in an organism that is a target for metabolism improvement. Typical examples of expression cassettes include polynucleotides that contain a promoter and a sequence encoding Cas protein placed under the control of the promoter. The phrase "placed under control of the promoter" is defined in the same manner as for the guide RNA expression cassette.

The promoter for the Cas protein expression cassette is not particularly limited; for example, various pol II promoters are usable. The pol II promoters are not particularly limited; examples include TDH3 promoter, GAL10 promoter, CMV promoter, EF1 promoter, SV40 promoter, MSCV promoter, and CAG promoter. Various promoters that can be induced by a drug are also usable.

The sequence encoding Cas protein can be any base sequence encoding the amino acid sequence of Cas protein.

The Cas protein can be any Cas protein usable in the CRISPR/Cas system. For example, various Cas proteins that bind to the target site of genomic DNA while forming a complex with guide RNA, and that can cleave the target site are usable. Cas proteins derived from various organisms are known. Examples include Cas9 protein derived from *S. pyogenes* (type II), Cas9 protein derived from *S. solfataricus* (type I-A1), Cas9 protein derived from *S. solfataricus* (type I-A2), Cas9 protein derived from *H. walsbyi* (type I-B), Cas9 protein derived from *E. coli* (type I-E), Cas9 protein derived from *E. coli* (type I-F), Cas9 protein derived from *P. aeruginosa* (type I-F), Cas9 protein derived from *S. Thermophilus* (type II-A), Cas9 protein derived from *S. agalactiae* (type II-A), Cas9 protein derived from *S. aureus*, Cas9 protein derived from *N. meningitidis*, Cas9 protein derived from *T. denticola*, and Cpf1 protein derived from *F. novicida* (type V). Of these, Cas9 proteins are preferable, and Cas9 proteins inherently present in bacteria that belong to the genus *Streptococcus* are more preferable. The information of the amino acid sequences of various Cas proteins and their coding sequences are readily available from various databases such as the NCBI.

The Cas protein may be a wild-type double-stranded cleaving Cas protein or a nickase Cas protein. The Cas protein may have a mutation (e.g., substitution, deletion, insertion, and addition) in the amino acid sequence, or may have a protein added, such as a known protein tag, signal sequence, or enzyme protein, as long as its activity is not impaired. Examples of protein tags include biotin, His tag, FLAG tag, Halo tag, MBP tag, HA tag, Myc tag, V5 tag, and PA tag. Examples of signal sequences include a cytoplasmic localization signal.

The vector for editing the target gene may include other sequences. Other sequences for use are not particularly limited, and can be various known sequences that can be incorporated in an expression vector. An example of such sequences is replication origin or a drug-resistant gene.

Examples of drug-resistant genes include the chloramphenicol resistance gene, tetracycline resistance gene, neomycin resistance gene, erythromycin resistance gene, spectinomycin resistance gene, kanamycin resistance gene, hygromycin resistance gene, and puromycin resistance gene.

The vector can be of any type. Examples of vectors include plasmid vectors, such as animal cell expression plasmids; virus vectors, such as retrovirus, lentivirus, adenovirus, adeno-associated virus, herpesvirus, and Sendai virus; and *Agrobacterium* vectors.

The target gene editor can be readily prepared in accordance with a known genetic engineering procedure. For example, the target gene editor can be prepared by using PCR, restriction enzyme fragmentation, a DNA ligation technique, an in vitro transcription-translation technique, or a recombinant protein preparation technique.

3-1-2. Target Gene Expression Promoter

The target gene expression promoter can be any gene expression promoter that can increase the amount of the target gene in cells.

The target gene expression promoter is, for example, an expression cassette of the target gene. The expression cassette of the target gene can be any cassette into which the target gene is incorporated in an expressible state. Typically, the expression cassette of the target gene contains a polynucleotide containing a promoter sequence and a sequence encoding the target gene (and optionally a transcription termination signal sequence). The expression cassette may be in the form of a vector.

The expression vector can be any expression vector. Examples include plasmid vectors, such as animal cell expression plasmids; and virus vectors, such as retrovirus, lentivirus, adenovirus, adeno-associated virus, herpesvirus, and Sendai virus.

The promoter can be any promoter. Examples include TDH3 promoter, GAL10 promoter, CMV promoter, EF1 promoter, SV40 promoter, MSCV promoter, and CAG promoter. Various promoters that can be induced by a drug are also usable.

The expression vector may also contain other elements that can be contained in expression vectors in addition to the above elements. Examples of other elements include origin of replication and drug-resistant genes. The drug-resistant gene is not particularly limited; examples include chloramphenicol resistance gene, tetracycline resistance gene, neomycin resistance gene, erythromycin resistance gene, spectinomycin resistance gene, kanamycin resistance gene, hygromycin resistance gene, and puromycin resistance gene.

The expression vector for the target gene can be readily prepared in accordance with a known genetic engineering procedure. For example, the expression vector for the target gene can be prepared by using PCR, restriction enzyme fragmentation, or a DNA ligation technique.

Another example of the target gene expression promoter is a transcription activator of the target gene, an expression vector of such a transcription activator, or a low-molecular compound that can activate the transcription of the target gene. The embodiments of the expression vector are as described above for the expression vector of the target gene.

3-2. Target Gene Function Regulator

The target gene function regulator can be any regulator that can regulate the function of the target gene protein or target gene mRNA. Examples include target gene function inhibitors, and target gene function promoters. The target gene function regulators can be used singly, or in a combination of two or more.

The target gene function regulator can be, for example, a neutralizing antibody for a target gene protein. The neutralizing antibody refers to an antibody that binds to the target gene to thereby inhibit the activity of the target gene protein.

The antibody includes polyclonal antibodies, monoclonal antibodies, chimeric antibodies, single-stranded antibodies, and antigen-bindable portions of these antibodies such as Fab fragments and fragments formed based on a Fab expression library. Antibodies antigen-bindable to a polypeptide composed of at least consecutive, typically 8 amino acids, preferably 15 amino acids, and more preferably 20 amino acids, of the amino acid sequence of the target gene, are also included in the antibody of the present invention.

The neutralizing antibody is preferably antigen-bindable to, for example, the amino acid sequence of a site of the target gene protein bindable to other molecules (e.g., a nucleic acid, a protein, and a substrate). The binding site can be determined based on known information and/or can be predicted based on known information (e.g., a docking model construction).

The methods for producing these antibodies are already well known, and the antibody of the present invention can also be prepared in accordance with these ordinary methods (Current Protocols in Molecular Biology, Chapter 11.12 to 11.13 (2000)). Specifically, a polyclonal antibody as the antibody of the present invention can be obtained in accordance with an ordinary method from the serum of a non-human animal (e.g., a rabbit) immunized with the target gene that has been expressed in *Escherichia coli* and purified in accordance with an ordinary method, or with an oligopeptide partially containing the amino acid sequence of the target gene synthesized in accordance with an ordinary method. A monoclonal antibody as the antibody of the present invention can be obtained from hybridoma cells prepared by immunizing a non-human animal (e.g. a mouse) with the target gene that has been expressed in *Escherichia coli* and purified in accordance with an ordinary method, or with an oligopeptide partially containing the amino acid sequence of the target gene, and then cell-fusing the obtained splenocytes and myeloma cells (Current Protocols in Molecular Biology, edit. Ausubel et al. (1987) Publish. John Wiley and Sons. Section 11.4 to 11.11).

The target gene for use as an immunizing antigen in the preparation of an antibody can be obtained from the following operations: DNA cloning, construction of plasmids, transfection into a host organism, culturing a transformant, and the collection of protein from the cultured product based on known gene sequence information. These operations can be performed pursuant to, for example, a method known to a person skilled in the art or a method according to a reference (Molecular Cloning, T. Maniatis et al., CSH Laboratory (1983), DNA Cloning, DM. Glover, IRL PRESS (1985)).

Specifically, recombinant DNA (expression vector) that allows the target gene to express in desired host cells is prepared and introduced into a host cell to transform it, and the transformant is cultured. From the obtained cultured product, a target protein is collected, thereby obtaining the protein as an immunizing antigen for use in the production of the antibody of the present invention. A partial peptide of the target gene can be prepared in accordance with a typical chemical synthesis method (peptide synthesis) on the basis of known gene sequence information.

The antibody of the present invention may also be prepared by using an oligopeptide partially having the amino acid sequence of the target gene. Although the oligopeptide (or polypeptide) for use in the production of such an antibody does not need to have functional biological activity, the oligopeptide (or polypeptide) preferably has the same immunogenic characteristics as those of the target gene. A preferable example of the oligopeptide is an oligo- (or poly)peptide that has such immunogenic characteristics and that is composed of at least consecutive 8 amino acids, preferably 15 amino acids, and more preferably 20 amino acids of the amino acid sequence of the target gene.

The antibody for the oligo- (or poly)peptide can also be produced by increasing immunological reaction by using various adjuvants according to the host. Examples of such adjuvants include, but are not limited to, mineral gels such as Freund's adjuvant, and aluminum hydroxide; surface-active substances such as lysolecithin, Pluronic Polyol, polyanion, peptide, oil emulsion, keyhole limpet hemocyanin, and dinitrophenol; and human adjuvants such as BCG (Bacille de Calmette et Guérin) and *Corynebacterium parvum*.

The target gene function regulator for use can also be a target gene antagonist, a target gene agonist, or a target-gene-dominant negative variant, for example, in addition to the target gene neutralizing antibody. A protein such as a neutralizing antibody for use as a target gene function regulator can be replaced with an expression cassette of the protein. The expression cassette is defined in the same manner as in section 3-1. Target gene expression regulator above.

3-3. Others

For the "mutation introducer for a region between the transmembrane domain and the nuclear localization signal of the yeast 115694 gene" usable in the reagent for use in the production of a yeast of the present invention, for example, the gene editor described above can be used. For the "expression cassette of the yeast 115694 gene having a mutation in a region between the transmembrane domain and the nuclear localization signal" usable in the reagent for use in the production of a yeast of the present invention, the expression cassette described above can be used.

The reagent for use in the production of a yeast of the present invention is used in the production of a yeast with a regulated lipid production capacity. Specifically, the reagent for use in the production of a yeast of the present invention is used in the production of a yeast with a regulated lipid production capacity by introducing the reagent into a yeast to regulate the expression of the target gene in the yeast, or to express an exogenous gene.

The reagent for use in the production of a yeast of the present invention is preferably a reagent for use in the production of a yeast with an increased lipid production capacity and contains at least one selected from the group consisting of the following (1A'), (2'), (3A'), and (4A'):

(1A') at least one member selected from the group consisting of an expression promoter for the yeast 115694 gene and a function promoter for the yeast 115694 gene, (2') at least one member selected from the group consisting of a mutation introducer for a region between the transmembrane domain and the nuclear localization signal of the yeast 115694 gene, and an expression cassette of the yeast 115694 gene having a mutation in a region between the transmembrane domain and the nuclear localization signal, (3A') at least one member selected from the group consisting of an expression promoter for the yeast 4888 gene and a function promoter for the yeast 4888 gene, and (4A') at least one member selected from the group consisting of an expression inhibitor for the yeast 45559 gene and a function inhibitor for the yeast 45559 gene.

The reagent for use in the production of a yeast of the present invention is more preferably a reagent for use in the production of a yeast with an increased lipid production capacity and contains at least one selected from the group consisting of the following (1Aa'), (2'), (3Aa'), and (4Aa'):

(1Aa') an expression promoter for the yeast 115694 gene, (2') at least one member selected from the group consisting of a mutation introducer for a region between the transmembrane domain and the nuclear localization signal of the yeast 115694 gene, and an expression cassette of the yeast 115694 gene having a mutation in a region between the transmembrane domain and the nuclear localization signal, (3Aa') an expression promoter for the yeast 4888 gene, and (4Aa') an expression inhibitor for the yeast 45559 gene.

The reagent for use in the production of a yeast of the present invention may be composed only of the essential components (at least one member selected from the group consisting of elements (1'), (2'), (3'), and (4') described above); however, the reagent may also contain various other components, for example, according to the type of the contained essential components, the dosage form, described later, or the mode of use, in addition to the essential components. Although the content of the essential components (dry weight) in the reagent for use in the production of a yeast of the present invention can be suitably determined, for example, according to the dosage form, described later, or the mode of use, the content of the essential components (dry weight) is, for example, 0.0001 to 100 mass %.

Examples of other components include bases, carriers, solvents, dispersants, emulsifiers, buffers, stabilizers, excipients, binders, disintegrants, lubricants, thickeners, humectants, colorants, aroma components, and chelators. The reagent for use in the production of a yeast of the present invention can be of any form, such as a dry form, or a solution form, or even a kit form. The reagent in a kit form may optionally contain other materials necessary for yeast culture (e.g., a nucleic-acid-introducing reagent and a buffer solution), reagents, and instruments.

4. A Lipid-Producing Yeast, a Composition for Lipid Production, and a Method for Producing a Lipid In an aspect, the present invention relates to a lipid-producing yeast in at least one state selected from the group consisting of the following (1Aa"), (3Aa"), and (4Aa"):
- (1Aa") having the expression of the yeast 115694 gene increased,
- (3Aa") having the expression of the yeast 4888 gene increased, and
- (4Aa") having the expression of the yeast 45559 gene decreased (in the present specification, "the lipid-producing yeast of the present invention").

In an aspect, the present invention also relates to a composition for lipid production containing the lipid-producing yeast of the present invention (in the present specification, "the composition for lipid production of the present invention").

In an aspect, the present invention further relates to a method for producing a lipid, including collecting a lipid from at least one member selected from the group consisting of a cultured product of the lipid-producing yeast of the present invention and the composition for lipid production of the present invention (in the present specification, "the method for producing a lipid of the present invention").

The following describes the yeast, the composition, and the method. For matters not described in this section, the description in section "2. A method for producing a yeast with a regulated lipid production capacity" above is applicable.

The lipid-producing yeast of the present invention is not particularly limited to the extent that the lipid-producing yeast is obtained from the method for producing a yeast of the present invention.

The lipid-producing yeast of the present invention may further have a mutation added. For example, the lipid-producing yeast of the present invention may have a mutation in the fatty acid transformation pathway. More specifically, for example, a mutation may be added in the fatty acid transformation pathway of the C16/C18 fatty acid elongase, $\Delta 9$ desaturase, $\Delta 9$ elongase, $\Delta 8$ desaturase, $\Delta 5$ desaturase, $\Delta 15$ desaturase, $\Delta 17$ desaturase, or the like, by introducing an exogenous gene, or modifying an endogenous gene or its promoter. This can further increase, for example, the content of polyunsaturated fatty acids, preferably the content of polyunsaturated fatty acids with a high added value, such as DHA or EPA.

The composition for lipid production of the present invention is not particularly limited as long as the composition contains the lipid-producing yeast of the present invention. The composition for lipid production of the present invention may be, for example, a cultured product of the lipid-producing yeast of the present invention, or a suspension of the lipid-producing yeast of the present invention.

Culture can be performed by using a culture broth containing a carbon source according to a known technique. The carbon source for use can be a saccharide, sugar alcohol, acidic sugar, or biomass containing these, without particular limitation. In the present invention, the term "biomass" refers to a renewable material containing the above carbon source.

The saccharide includes monosaccharides, oligosaccharides, and polysaccharides. Oligosaccharides refer to those from disaccharides to decasaccharides, and these may be homo-oligosaccharides or hetero-oligosaccharides. Polysaccharides refer to saccharides with a higher number of monosaccharide units than oligosaccharides, and these may be homo-polysaccharides or hetero-polysaccharides. Specifically, monosaccharides include pentoses such as L-arabinose, D-xylose, and D-ribose, hexoses such as D-glucose, D-galactose, D-fructose, and D-mannose, and 6-deoxyhexoses such as L-rhamnose. Oligosaccharides include disaccharides such as sucrose, maltose, lactose, cellobiose, trehalose, and melibiose; and trisaccharides such as raffinose. Polysaccharides include starch, cellulose, glycogen, dextran, mannan, and xylan. These saccharides can be used singly, or in any combination. The combinations include a starch hydrolysate. The saccharide for use may also be a raw material containing a saccharide as a main component, such as blackstrap molasses and okara (soy pulp).

The sugar alcohol includes D-sorbitol, D-mannitol, galactitol, and maltitol. The acidic sugar includes glucuronic acid, and galacturonic acid.

The amount of the carbon source in a medium is not particularly limited and is typically about 3 to 15% (w/w).

The medium may contain a nitrogen source, an inorganic substance, and other nutrients in addition to the carbon source. The nitrogen source for use can be an inorganic or organic nitrogen compound such as ammonia, ammonium chloride, ammonium sulfate, ammonium carbonate, ammonium acetate, sodium nitrate, or urea. The nitrogen source for use can also be a nitrogen-containing natural substance such as peptone, meat extract, yeast extract, corn steep liquor, casein hydrolysate, fish meal, its digest, defatted soymeal, or its digest. The inorganic substance for use can be monopotassium phosphate, dipotassium phosphate, magnesium sulfate, sodium chloride, ferrous sulfate, ferrous chloride, manganese sulfate, calcium chloride, calcium carbonate, zinc sulfate, copper sulfate, boric acid-molybdic acid ammonium, or potassium iodide.

One embodiment of culture conditions is the following. Culture is performed under aerobic conditions such as shaking culture or deep stirring culture. Generally, the culture temperature is preferably 20 to 35° C.; however, other temperatures may be applied as long as bacteria grow. The pH of the medium during culture is typically 4.0 to 7.2. The culture period is not particularly limited and is, for example, 2 to 10 days.

The obtained cultured product and the cells in the cultured product contain lipids such as oleic acid, palmitic acid, stearic acid, linoleic acid, and palmitoleic acid.

Collection of lipids from the cultured product can be performed in accordance with or pursuant to a known method. For example, lipids can be collected by a technique such as squeezing, French press, or ball mill.

The lipids accumulated in cells can be collected, for example, by removing the liquid fraction from the cultured product as necessary and obtaining a lipid-containing extract from the obtained cells in accordance with or pursuant to a known method. The liquid fraction can be removed by an operation such as centrifugation and static sedimentation, or by using an apparatus such as a separator, a decanter, or a filter.

Extracellularly secreted lipids can be collected, for example, by adding a solvent to a cultured product, or by adding a solvent to a liquid fraction obtained by removing cells from the cultured product as necessary, to dissolve the lipids in the solvent. The solvent for use is preferably an organic solvent that dissolves lipids, that is immiscible or less miscible with water, and that is liquid at room temperature, such as halogenated lower alkanes (chloroform, methylene chloride, carbon tetrachloride, 1,2-dichloroethane), n-hexane, ethyl ether, ethyl acetate, and aromatic hydrocarbons (benzene, toluene, xylene). The amount of the extraction solvent added is not particularly limited as long as the solvent can sufficiently collect the lipids produced and accumulated in the cultured product or its liquid fraction.

EXAMPLES

The present invention is described in detail below based on Examples; however, the present invention is not limited by these Examples.

Test Example 1. Acquisition of Lipid Accumulation Mutant Strains

To acquire lipid accumulation mutant strains, a mutagen, ethyl methane sulfonic acid or UV, was allowed to act on *L. starkeyi* CBS1807 strain, and the mutant strain group with induced mutation was cultured and fractionated by Percoll density gradient centrifugation. Since the density of oil is lower than that of water, high lipid accumulation cells and low lipid accumulation cells have different densities. It is expected that high lipid accumulation cells are fractionated into a low-density fraction, and that low lipid accumulation cells are fractionated into a high-density fraction. High lipid accumulation mutant cells can be concentrated by repeating the process of culture after fractionation of the low-density fraction, and refractionation by density gradient centrifugation (PTL 1).

Subsequently, a solution of each concentrated fraction was spread on a medium plate and isolated as a colony. The obtained colonies were liquid-cultured, and lipid accumulation mutant strains were screened by a combination of (1) evaluation of lipid productivity by flow cytometry after fluorescent staining of lipids, (2) evaluation of the size of fat globules by microscopic observation, and (3) quantification of lipids. As a result, high lipid accumulation mutant strains E15, E47, A42, K13, and K14 with higher lipid productivity than the wild strain were acquired (NPL 1). In the comparative culture of the wild strain and the high lipid accumulation mutant strains, the intracellular fat globules of the wild strain and high lipid accumulation mutant strains E15, E47, A42, K13, and K14 did not change much in size on the first day of culture; however, on the third day of culture, the intracellular fat globules of all the high lipid accumulation mutant strains were larger than those of the wild strain, and E15 and K14 were particularly prominent.

On the third day of culture, the amount of TAG per cell of the high lipid accumulation mutant strains E15, E47, A42, K13, and K14 was, respectively, 2.0, 1.4, 1.5, 1.9, and 2.3 times that of the wild strain, and E15 and K14 were more than twice as high (NPL 1). Further, in order to acquire mutant strains with an improved lipid accumulation, the high lipid accumulation mutant strain E15 was used as a parent strain, and mutagenesis was performed by UV irradiation. Thereafter, the high lipid accumulation mutant strain was concentrated by density gradient centrifugation of the mutant-treated cells using Percoll reagent in the same manner as when the E15 strain was obtained. After colony isolation, culture was performed using a 50-mL tube, primary screening evaluated by microscopic observation and culture using a 200-mL baffled flask were performed, and selection was performed by secondary screening evaluated by measuring the cell concentration and the amount of TAG. The ultra-high lipid accumulation mutant strains, i.e., E15-11 strain, E15-15 strain, and E15-25 strain, selected by secondary screening were cultured, and their TAG productivity was compared. On the fourth day of culture, the ultra-high lipid accumulation mutant strains showed the maximum amount of lipid accumulation, and the amount of lipid accumulation per cell was about 5 times the wild strain in the E15-11 and −25 strains and 7.1 times in the E15-15 strain.

Further, low lipid accumulation mutant strains, i.e., m45, m47, sr5, sr17, and sr22 strains, were acquired in the same manner as for the high lipid accumulation mutant strains. In the comparative culture of the wild strain and the low lipid accumulation mutant strains, the amount of TAG per cell of the low lipid accumulation mutant strains, m45, m47, sr5, sr17, sr22 strains, on the third day of culture was, respectively, 0.5, 0.6, 0.3, 0.4, and 0.1 times the wild strain.

Test Example 2. Acquisition of Lipid Production Control Factors Using Comparative Genomic Analysis To acquire lipid productivity-improving factors, an attempt was made to compare the genomic base sequences of the wild strain and lipid accumulation mutant strains and to extract genes that greatly contributed to the improvement of lipid productivity from the mutant genes. In conducting comparative genome analysis, the focus was set on nonsense mutations, frameshift mutations, splicing abnormalities, and missense mutations.

As a result of focusing on, among these mutations and abnormal sites, genes commonly found in mutant strains showing high lipid accumulation, Transcript ID: 115694 (https://mycocosm.jgi.doe.gov/Lipst1_1/Lipst1_1.home.html) that showed missense mutations in K13, K14, E15-11, E15-15, and E15-25 was found (Table 1). The numbers for the base substitutions below indicate the numbers from the ATG in the genomic DNA containing an intron. The numbers in the amino acid coding sequence (cDNA) are as follows: 3381→3323, 3402→3344, and 3413→3355.

TABLE 1

Missense mutations of wild strain and lipid accumulation mutant strains in Transcript ID: 115694

| Lipid accumulation mutant strain | Missense mutation | |
|---|---|---|
| | Base substitution | Amino acid substitution |
| K13 | 3381 T > C | M1108T |
| K14 | 3402 T > C | F1115S |
| E15-11 | 3413 A > G | K1119E |
| E15-15 | 3413 A > G | K1119E |
| E15-25 | 3413 A > G | K1119E |

As a result of analyzing the base sequence of Transcript ID: 115694, a structure with 3 exon sites and 2 intron sites was expected. RNA was extracted from *L. starkeyi* CBS1807 strain (method 1), cDNA was synthesized by reverse transcription (method 2), the cDNA was used as a template to amplify Transcript ID: 115694, and the base sequence thereof was analyzed (method 3). As a result, exons and introns were found at the expected positions. SEQ ID NO: 1 represents the amino acid sequence of the 115694 gene, and SEQ ID NO: 2 represents the amino acid coding sequence of the 115694 gene.

Method 1: RNA Extraction from *L. starkeyi*

1. 2 to 3 mL of the culture was collected in a 15-mL tube and centrifuged at 4000×g for 5 minutes.
2. The supernatant was discarded, and 1 mL of 1×PBS was added and suspended.
3. The suspension was placed in a 2-mL multibead shocker tube and centrifuged at 8,000×g for 1 minute, and the supernatant was discarded.
4. TES and water-saturated phenol (each 350 μL) were added to the bacteria sample.
5. 1.4 g of zirconia beads (particle size: 0.5 mm) were added.
6. The bacterial cells were disrupted using a multibead shocker (Yasui Kikai) (disruption conditions: 2,500 rpm, 4° C., on-time 60 seconds, off-time 60 seconds, 12 cycles).
7. A needle (Terumo) was used to puncture the bottom of the tube, which was then placed on a 2-mL tube and centrifuged at 400×g for 30 seconds to collect the suspension.
8. The collected suspension was centrifuged at 20,000×g for 10 minutes.
9. 350 μL of the supernatant was transferred to a new 1.5-mL tube, and 900 μL of ISOGEN II (Nippon Gene) was added.
10. The resulting mixture was vortexed and allowed to stand at room temperature for 5 minutes.
11. 240 μL of chloroform was added and vortexed.
12. Centrifugation was performed at 20,000×g for 5 minutes.
13. 800 μL of the supernatant was transferred to a new 1.5-mL tube, and 480 μL of 100% ethanol was added and mixed by inversion.
14. The entire sample of item 13 was provided in an RNA extraction column of illustra RNAspin Mini RNA Isolation Kit (GE Healthcare) and centrifuged at 8,000×g for 30 seconds. (After that, the reagent included in the kit was used.)
15. The column was placed on a new tube.
16. 350 μL of MDB (membrane desalting buffer) was added to the column and centrifuged at 11,000×g for 1 minute.
17. The column was placed on a new tube.
18. 10 μL of DNase I working solution and 90 μL of DNase reaction buffer were added to a 1.5-mL RNase-free tube, and pipetting was performed to prepare a DNase mixture.
19. 95 μL of the DNase mixture was added to the column and allowed to stand at room temperature for 15 minutes.
20. 200 μL of RA2 (DNase inhibitor) was added to the column and centrifuged at 11,000×g for 1 minute.
21. The column was placed on a new tube.
22. 600 μL of RA3 working solution was added to the column and centrifuged at 11,000×g for 1 minute.
23. The column was placed on a new tube.
24. 250 μL of RA3 working solution was added to the column and centrifuged at 11,000×g for 2 minutes.
25. The column was placed on a new tube.
26. Centrifugation was performed at 11,000×g for 1 minute.
27. The column was placed on the 1.5-mL tube included in the kit, 40 μL of RNase-free water was added to the column and centrifuged at 11,000×g for 1 minute, and the eluate was used as a total RNA solution in subsequent experiments.

Method 2: Reverse Transcription (cDNA Synthesis) PrimeScript RT Reagent Kit (Perfect Real Time) (TaKaRa) was Used 1. A reaction solution shown below was prepared in ice. (As a negative control, a reaction solution in which 0.5 μL of RNase-free water was added instead of reverse transcriptase was also prepared.)
Reaction solution 1 (RT+) (composition: 5× PrimeScript Buffer (for Real Time): 2 μL, PrimeScript RT enzyme Mix I: 0.5 μL, Oligo dT Primer (50 μM): 0.5 μL, Random 6 mers (100 μM): 0.5 μL, RNase-free water: 1.5 μL, total RNA: 500 ng/5 μL, total: 10 μL)
Reaction solution 2 (RT-) (5× PrimeScript Buffer (for Real Time): 2 μL, Oligo dT Primer (50 μM): 0.5 μL, Random 6 mers (100 μM): 0.5 μL, RNase-free water: 2 μL, total RNA: 500 ng/5 μL, total: 10 μL)
2. Reverse transcription reaction was performed at 37° C. for 15 minutes→85° C. for 5 seconds→4° C. ∞.
3. After completion of the reaction, 90 μL of TE was added to the reaction solution to prepare a 10-fold diluted solution, and this solution was further diluted stepwise with TE to 1000-fold. These solutions were used as a template for cDNA amplification and a template for real-time PCR expression analysis.

Method 3: Amplification of 115694 cDNA and Base Sequence Analysis

A PCR reaction solution (composition: KOD One Master Mix (Toyobo): 25 μL, 10 μM 115694 kpn Fw (5'-ggggtac-cATGGACCCGTTAATGGACAATG-3' (SEQ ID NO: 3)): 1.5 μL, 10 μM 115694 pst Rv (5'-ttctgcagTCACT-CAACTAGTACAATCCGATTCTG-3' (SEQ ID NO: 4)): 1.5 μL, template (reverse transcription solution of *L. starkeyi* CBS1807): 10 μL, sterile water: 12 μL) was prepared, and 115694 cDNA was amplified under the following PCR reaction conditions (first denaturation at 98° C. for 2 minutes; then 10 seconds at 98° C., 5 seconds at 58° C., and 40 seconds at 68° C. for 30 cycles; and final elongation at 68° C. for 1 minute). The amplified fragment was purified by phenol-chloroform/ethanol precipitation, and after digestion with KpnI (TaKaRa) and PstI (TaKaRa), the resultant was ligated with a DNA fragment obtained by digesting pQE-80L (Qiagen) with KpnI (TaKaRa) and PstI (TaKaRa) using Ligation high Ver. 2 (Toyobo), and transformed into *E. coli* DH5a. The plasmid was extracted from the colony of the transformed *E. coli*, and the base sequence of 115694 cDNA was analyzed.

Moreover, as a result of domain analysis of the amino acid sequence expected from that base sequence using Pfam (https://pfam.xfam.org), the amino acid sequence from 680 to 756 was an IPT/TIG domain. This domain is often found in intracellular transcription factors and cell surface receptors that have the ability to bind DNA. In addition, the result is presented that the amino acid sequence from 839 to 913 was an Ankyrin repeat domain. This domain is often found in the construction of protein-protein interaction platforms. Next, the expected amino acid sequence was analyzed by localization prediction PSORT II Prediction (https://psort.hgc.jp/form2.html), cNLS Mapper (http://nls-mapper.iab.keio.ac.jp/cgi-bin/NLS_Mapper_form.cgi). As a result, the amino acid sequence from 515 to 524 was expected as a nuclear localization signal. Next, the expected amino acid sequence was analyzed by using membrane protein prediction and transmembrane domain prediction SOSUI (http://harrier.nagahama-i-bio.ac.jp/sosui/). As a result, the amino acid sequence from 1232 to 1254 indicated a transmembrane region. From the above, the protein predicted from Transcript ID: 115694 was a transcription factor located on the membrane, and when translocated to the nucleus, it was expected to be cleaved at a location between the nuclear localization signal and the transmembrane region, and translocated to the nucleus.

Test Example 3. Production of 115694 Gene Mutant and/or High-Expression Strains

Next, in order to clarify whether the mutation found in Transcript ID: 115694 led to the improvement of lipid productivity in the oleaginous yeast *L. starkeyi*, the strains shown in Tables 2 and 3 below were produced. In the tables, 115694UHA represents E15-11, -15, and -25-derived mutant 115694, 115694K13 represents K13-derived mutant 115694, 15694K14 represents K14-derived mutant 115694, and HE represents high expression.

TABLE 2

| Strain name | Relevant genotype |
| --- | --- |
| *Lipomyces starkeyi* CBS1807 | Wild-type |
| Δ Islig4 | Δ Islig4::$P_{TDH3}$-Sh ble-$T_{TDH3}$ |
| Δ Islig4(115694) | Δ Islig4::$P_{TDH3}$-Sh ble-$T_{TDH3}$ 18S rDNA::115694- $P_{ACT1}$-hph-$T_{ACT1}$ |
| Δ Islig4(115694UHA) | Δ Islig4::$P_{TDH3}$-Sh ble-$T_{TDH3}$ 18S rDNA::1 m115694UHA - $P_{ACT1}$-hph-$T_{ACT1}$ |
| Δ Islig4(115694K13) | Δ Islig4::$P_{TDH3}$-Sh ble-$T_{TDH3}$ 18S rDNA::m115694K13- $P_{ACT1}$-hph-$T_{ACT1}$ |
| Δ Islig4(115694K14) | Δ Islig4::$P_{TDH3}$-Sh ble-$T_{TDH3}$ 18S rDNA:m115694K14- $P_{ACT1}$-hph-$T_{ACT1}$ |
| Δ Islig4(115694) Δ 115694 | Δ Islig4::$P_{TDH3}$-Sh ble-$T_{TDH3}$ 18S rDNA::115694-$P_{ACT1}$-hph-$T_{ACT1}$ Δ 115694:: $P_{TDH3}$-sNAT1-$T_{TDH3}$ |
| Δ Islig4(115694UHA) Δ 115694 | Δ Islig4::$P_{TDH3}$-Sh ble-$T_{TDH3}$ 18S rDNA:: m115694UHA-$P_{ACT1}$-hph-$T_{ACT1}$ Δ 115694:: $P_{TDH3}$-sNAT1-$T_{TDH3}$ |

TABLE 2-continued

| Strain name | Relevant genotype |
| --- | --- |
| Δ Islig4(115694K13) Δ 115694 | Δ Islig4::$P_{TDH3}$-Sh ble-$T_{TDH3}$ 18S rDNA:: m115694K13-$P_{ACT1}$-hph-$T_{ACT1}$ Δ 115694:: $P_{TDH3}$-sNAT1-$T_{TDH3}$ |
| Δ Islig4(115694K14) Δ 115694 | Δ Islig4::$P_{TDH3}$-Sh ble-$T_{TDH3}$ 18S rDNA:: m115694K14-$P_{ACT1}$-hph-$T_{ACT1}$ Δ 115694:: $P_{TDH3}$-sNAT1-$T_{TDH3}$ |

TABLE 3

| Strain name | Relevant genotype |
| --- | --- |
| Δ Islig4(HE115694) | Δ Islig4::$P_{TDH3}$-Sh ble-$T_{TDH3}$ 18S rDNA:: $P_{TDH3}$-115694-$T_{TDH3}$-$P_{ACT1}$-hph-$T_{ACT1}$ |
| Δ Islig4(HE115694UHA) | Δ Islig4::$P_{TDH3}$-Sh ble-$T_{TDH3}$ 18S rDNA:: $P_{TDH3}$-m115694UHA-$T_{TDH3}$-$P_{ACT1}$-hph-$T_{ACT1}$ |
| Δ Islig4(HE115694K13) | Δ Islig4::$P_{TDH3}$-Sh ble-$T_{TDH3}$ 18S rDNA:: $P_{TDH3}$-m115694K13-$T_{TDH3}$-$P_{ACT1}$-hph-$T_{ACT1}$ |
| Δ Islig4(HE115694K14) | Δ Islig4::$P_{TDH3}$-Sh ble-$T_{TDH3}$ 18S rDNA:: $P_{TDH3}$-m115694K14-$T_{TDH3}$-$P_{ACT1}$-hph-$T_{ACT1}$ |
| Δ Islig4(HE115694) Δ 115694 | Δ Islig4::$P_{TDH3}$-Sh ble-$T_{TDH3}$ 18S rDNA:: $P_{TDH3}$-115694-$T_{TDH3}$-$P_{ACT1}$-hph-$T_{ACT1}$ Δ 115694:: $P_{TDH3}$-sNAT1-$T_{TDH3}$ |
| Δ Islig4(HE115694UHA) Δ 115694 | Δ Islig4::$P_{TDH3}$-Sh ble-$T_{TDH3}$ 18S rDNA:: $P_{TDH3}$-115694UHA-$T_{TDH3}$-$P_{ACT1}$-hph-$T_{ACT1}$ Δ 115694:: $P_{TDH3}$-sNAT1-$T_{TDH3}$ |
| Δ Islig4(HE115694K13) Δ 115694 | Δ Islig4::$P_{TDH3}$-Sh ble-$T_{TDH3}$ 18S rDNA:: $P_{TDH3}$-115694K13-$T_{TDH3}$-$P_{ACT1}$-hph-$T_{ACT1}$ Δ 115694:: $P_{TDH3}$-sNAT1-$T_{TDH3}$ |
| Δ Islig4(HE115694K14) Δ 115694 | Δ Islig4::$P_{TDH3}$-Sh ble-$T_{TDH3}$ 18S rDNA:: $P_{TDH3}$-115694K13-$T_{TDH3}$-$P_{ACT1}$-hph-$T_{ACT1}$ Δ 115694:: $P_{TDH3}$-sNAT1-$T_{TDH3}$ |

The method for producing the strains in the tables is as described below.

Test Example 3-1. Production of pBluescript II KS (+)/18S rDNA

Amplification of pBluescript II KS (+) Fragment

The following PCR reaction solution was prepared, and pBluescript II KS (+) fragment was amplified under the following PCR reaction conditions (first denaturation at 94° C. for 2 minutes; then 10 seconds at 98° C. and 90 seconds at 68° C. for 25 cycles; and final elongation at 68° C. for 4 minutes and 30 seconds).

TABLE 4

| 10 × PCR Buffer for KOD-Fx-Neo (TOYOBO) | 5 μL |
| --- | --- |
| 2 mM dNTPs (TOYOBO) | 5 μL |
| 25 mM MgSO$_4$ (TOYOBO) | 4 μL |
| 100 μM pKSFw Primer (SEQ ID NO: 5) (5'-GGGCTGCAGGAATTCGATATCAAGCTTATCGATACCGTC-3') | 1 μL |
| 100 μM pKSRv Primer (SEQ ID NO: 6) (5'-GGGGGATCCACTAGTTCTAGAG-3') | 1 μL |
| Template (1 μg/μl pBluescript II KS (+)) | 1 μL |
| KOD-Fx-Neo (TOYOBO) | 1 μL |
| Sterile water | 32 μL |
| Total | 50 μL |

Amplification of 18S rDNA Fragment

The following PCR reaction solution was prepared, and 18S rDNA fragment was amplified under the following PCR reaction conditions (first denaturation at 94° C. for 2 minutes; then 10 seconds at 98° C., 30 seconds at 55° C., and 42 seconds at 68° C. for cycles; and final elongation at 68° C. for 2 minutes)

TABLE 5

| | |
|---|---|
| 10 × PCR Buffer for KOD-Fx-Neo (TOYOBO) | 5 μL |
| 2 mM dNTPs (TOYOBO) | 5 μL |
| 25 mM MgSO$_4$ (TOYOBO) | 4 μL |
| 100 μM p18SrDNA Fw Primer (SEQ ID NO: 7) (5'-actagtggatccccGGGGCTTCTTCGGAAGCTC-3') | 1 μL |
| 100 μM 18SrDNA Rv Primer (SEQ ID NO: 8) (5'-gaattcctgcagcccGGGCGACTATATCTTAAGCCG -3') | 1 μL |
| Template (1 μg/μg L. starkeyi CBS1807 genomic DNA) | 1 μL |
| KOD-Fx-Neo (TOYOBO) | 1 μL |
| Sterile water | 32 μL |
| Total | 50 μL |

The above two DNA fragments (amplification of pBluescript II KS (+) fragment and 18S rDNA fragment) were linked together using the Gibson assembly system (NEB) and transformed into E. coli DH5ca. The plasmid was extracted from the colony of the transformed E. coli to obtain pBluescript II KS (+)/18S rDNA.

Test Example 3-2. Production of pBluescript II KS (+)/5'-UTR (18S rDNA)/P$_{act1}$-Hph-TT$_{act1}$/P$_{TDH3}$-ACC1-TT$_{TDH3}$/3'-UTR (18S rDNA)

Amplification of pBluescript II KS (+)/18SrDNA Fragment

The following PCR reaction solution was prepared, and pBluescript II KS (+)/18SrDNA fragment was amplified under the following PCR reaction conditions (first denaturation at 94° C. for 2 minutes; then 10 seconds at 98° C., 30 seconds at 55° C., and 120 seconds at 68° C. for 35 cycles; and final elongation at 68° C. for 6 minutes).

TABLE 6

| | |
|---|---|
| 10 × PCR Buffer for KOD-Fx-Neo (TOYOBO) | 5 μL |
| 2 mM dNTPs (TOYOBO) | 5 μL |
| 25 mM MgSO$_4$ (TOYOBO) | 4 μL |
| 100 μM pBlue18SFw Primer (SEQ ID NO: 9) (5'-AACTAGCTCAAGGGACGTG-3') | 1 μL |
| 100 μM pBlue18S Rv Primer (SEQ ID NO: 10) (5'-AACTAGCCGGTACCTTTCCG-3') | 1 μL |
| Template (1 μg/μl pBluescript II KS (+)/18S rDNA) | 1 μL |
| KOD-Fx-Neo (TOYOBO) | 1 μL |
| Sterile water | 32 uL |
| Total | 50 μL |

Amplification of ACT1-P+HPH+ACT1-TT Fragment

The following PCR reaction solution was prepared, and ACT1-P+HPH+ACT1-TT fragment was amplified under the following PCR reaction conditions (first denaturation at 94° C. for 2 minutes; then 10 seconds at 98° C., 30 seconds at 56° C., and 60 seconds at 68° C. for 35 cycles; and final elongation at 68° C. for 3 minutes).

TABLE 7

| | |
|---|---|
| 10 × PCR Buffer for KOD-Fx-Neo (TOYOBO) | 5 μL |
| 2 mM dNTPs (TOYOBO) | 5 μL |
| 25 mM MgSO$_4$ (TOYOBO) | 4 μL |
| 100 μM ACTp Fw Primer (SEQ ID NO: 11) (5'-acgcgcggaaaggtaccggctagttTTACCGTCTACCGCTGACG-3') | 1 μL |
| 100 μM ACTt Rv Primer (SEQ ID NO: 12) (5'-ttcagcaaattaaAGGAGTATAGAGTTGAATTTAATGGACGTTG-3') | 1 μL |
| Template (1 μg/μl synthesized ACT1-P + HPH + ACT1-TTDNA*) | 1 μL |
| KOD-Fx-Neo (TOYOBO) | 1 μL |
| Sterile water | 32 μL |
| Total | 50 μL |

*SEQ ID NO: 13

Amplification of TDH3-P+ACC1+TDH3-TT Fragment

The following PCR reaction solution was prepared, and TDH3-P+ACC1+TDH3-TT fragment was amplified under the following PCR reaction conditions (first denaturation at 94° C. for 2 minutes; then 10 seconds at 98° C., 30 seconds at 55° C., and 4 minutes at 68° C. for 35 cycles; and final elongation at 68° C. for 12 minutes).

TABLE 8

| | |
|---|---|
| 10 × PCR Buffer for KOD-Fx-Neo (TOYOBO) | 5 µL |
| 2 mM dNTPs (TOYOBO) | 5 µL |
| 25 mM MgSO$_4$ (TOYOBO) | 4 µL |
| 100 µM TDHACC1 Fw Primer (SEQ ID NO: 14) (5'-actctatactcctTTAATTTGCTGAAGCGGTTTGCC-3') | 1 µL |
| 100 µM TDHACC1 Rv Primer (SEQ ID NO: 15) (5'-gaatagcacgtcccttgagctagttATGTAGCGGGTGGTGATG -3') | 1 µL |
| Template (Gibson assembly solution*) | 1 µL |
| KOD-Fx-Neo (TOYOBO) | 1 µL |
| Sterile water | 32 µL |
| Total | 50 µL |

*A reaction solution obtained in the following manner. TDH3-P fragment and TDH3-TT fragment were amplified using *L. starkeyi* CBS1807 genomic DNA as a template, and using KOD-Fx-Neo (Toyobo) with primer set TDH-P (accatcaccacccgctacatTTAATTTGCTGAAGCGGTTTG (SEQ ID NO: 16) and ccgcagcagacatTGCGAATGTGGATTAGAG (SEQ ID NO: 17)) and primer set TDH-TT (cttctaattaaGTGTGCGGTTGATGGTCTTC (SEQ ID NO: 18) and gcacgtcccttgagctagttATGTAGCGGGTGGTGATG (SEQ ID NO: 19)), respectively, under the following PCR reaction conditions (first denaturation at 94° C. for 2 minutes; then 10 seconds at 98° C., 30 seconds at 57° C., and 30 seconds at 68° C. for 35 cycles; and final elongation at 68° C. for 90 seconds). ACC1 fragment was amplified using *L. starkeyi* CBS1807 cDNA as a template, and using KOD-Fx-Neo (Toyobo) with primer set ACC1 (cacatcgcaATGTCTGCTGCGGCCAGT (SEQ ID NO: 20) and aaccgcacacTTAATTAGAAGCCTGCTTGAAAATCGCATC (SEQ ID NO: 21)) under the following PCR reaction conditions (first denaturation at 94° C. for 2 minutes; then 10 seconds at 98° C. and 3 minutes and 30 seconds at 68° C. for 35 cycles; and final elongation at 68° C. for 10 minutes). The above three DNA fragments (TDH3-P fragment, TDH3-TT fragment, and ACC1 fragment) were linked together using the Gibson assembly system (NEB).

The above three DNA fragments (pBluescript II KS (+)/18SrDNA fragment, ACT1-P+HPH+ACT1-TT fragment, and TDH3-P+ACC1+TDH3-TT fragment) were linked together using the Gibson assembly system (NEB), and transformed into *E. coli* DH5a. The plasmid was extracted from the colony of the transformed *E. coli* to obtain pBluescript II KS (+)/5'-UTR (18S rDNA)/P$_{act1}$-hph-TT$_{act1}$/P$_{TDH3}$-ACC1-TT$_{TDH3}$/3'-UTR (18S rDNA).

Test Example 3-3. Production of pBluescript II KS (+)/HE115694, pBluescript II KS (+)/HE115694UHA, pBluescript II KS (+)/HE115694K13, and pBluescript II KS (+)/HE115694K14

Amplification of HE115694 Fragment, HE115694UHA Fragment, HE115694K13 Fragment, and HE115694K14 Fragment The following PCR reaction solution was prepared, and HE115694 fragment, HE115694UHA fragment, HE115694K13 fragment, and HE115694K14 fragment were amplified under the following PCR reaction conditions (first denaturation at 94° C. for 2 minutes; then 10 seconds at 98° C., 30 seconds at 60° C., and 4 minutes and 30 seconds at 68° C. for 35 cycles; and final elongation at 68° C. for 1 minute).

TABLE 9

| | |
|---|---|
| 10 × PCR Buffer for KOD-Plus-Neo (TOYOBO) | 5 µL |
| 2 mM dNTPs (TOYOBO) | 5 µL |
| 25 mM MgSO$_4$ (TOYOBO) | 3 µL |
| 20 µM HE115694 Fw Primer (SEQ ID NO: 22) (5'-tatcttactctaatccacattcgcaATGGACCCGTTAATGGACAATG-3') | 1 µL |
| 20 µM HE115694 Rv Primer (SEQ ID NO: 23) (5'-agatagaagaccatcaaccgcacacTCACTCAACTAGTACAATCCGATTC-3') | 1 µL |
| Template (1 µg/µl *L. starkeyi* genomic DNA*) | 1 µL |
| KOD-Fx-Neo (TOYOBO) | 1 µL |
| Sterile water | 33 µL |
| Total | 50 µL |

*L. starkeyi* CBS1807 genomic DNA was used as a template for HE115694 fragment, *L. starkeyi* E15-15 genomic DNA for HE115694UHA fragment, *L. starkeyi* K13 genomic DNA for HE115694K13 fragment, and *L. starkeyi* K14 genomic DNA for HE115694K14 fragment.

Amplification of TDH3-18SrDNA-ACT1-Hph Fragment

The following PCR reaction solution was prepared, and TDH3-18SrDNA-ACT1-hph fragment was amplified under the following PCR reaction conditions (first denaturation at 94° C. for 2 minutes; then 10 seconds at 98° C., 30 seconds at 60° C., and 4 minutes and 30 seconds at 68° C. for 35 cycles; and final elongation at 68° C. for 1 minute)

TABLE 10

| | |
|---|---|
| 10 × PCR Buffer for KOD-Plus-Neo (TOYOBO) | 5 μL |
| 2 mM dNTPs (TOYOBO) | 5 μL |
| 25 mM MgSO$_4$ (TOYOBO) | 3 μL |
| 20 μM TDH3-18SrDNA-ACT1-hph Fw Primer (SEQ ID NO: 24) (5'-GTGTGCGGTTGATGGTCTTCTATCTTCC-3') | 1 μL |
| 20 μM TDH3-18SrDNA-ACT1-hph Rv Primer (SEQ ID NO: 25) (5'-TGCGAATGTGGATTAGAGTAAGATAGATAACTTTTATCTGG-3') | 1 μL |
| Template (1 μg/μl pBluescript II KS (+)/5'-UTR (18S rDNA)/P$_{act1}$-hph-TT$_{act1}$/ P$_{TDH3}$-ACC1-TT$_{TDH3}$/3'-UTR (18S rDNA)) | 1 μL |
| KOD-Fx-Neo (TOYOBO) | 1 μL |
| Sterile water | 33 μL |
| Total | 50 μL |

The above four DNA fragments (HE115694 fragment, HE115694UHA fragment, HE115694K13 fragment, and HE115694K14 fragment) were each linked with TDH3-18SrDNA-ACT1-hph fragment using the Gibson assembly system (NEB), and transformed into *E. coli* DH5a. The plasmid was extracted from the colony of the transformed *E. coli* to obtain pBluescript II KS (+)/HE115694, pBluescript II KS (+)/HE115694UHA, pBluescript II KS (+)/HE115694K13, and pBluescript II KS (+)/HE115694K14.

Test Example 3-4. Production of pBluescript II KS (+)/115694, pBluescript II KS (+)/115694UHA, pBluescript II KS (+)/115694K13, and pBluescript II KS (+)/115694K14

Amplification of 115694 Fragment, 115694UHA Fragment, 115694K13 Fragment, and 115694K14 Fragment The following PCR reaction solution was prepared, and 115694 fragment, 115694UHA fragment, 115694K13 fragment, and 115694K14 fragment were amplified under the following PCR reaction conditions (first denaturation at 94° C. for 2 minutes; then 10 seconds at 98° C., 30 seconds at 60° C., and 4 minutes and 30 seconds at 68° C. for 35 cycles; and final elongation at 68° C. for 1 minute).

TABLE 11

| | |
|---|---|
| 10 × PCR Buffer for KOD-Plus-Neo (TOYOBO) | 5 μL |
| 2 mM dNTPs (TOYOBO) | 5 μL |
| 25 mM MgSO$_4$ (TOYOBO) | 3 μL |
| 20 μM 115694 Fw Primer (SEQ ID NO: 26) (5'-ccattaaattcaactctatactcctACATACTCGGCGAGGCCTTC-3') | 1 μL |
| 20 μM 115694 Rv Primer (SEQ ID NO: 27) (5'-gaatagcacgtcccttgagctagttACTACATCTCATTAGCAAACCTCTC-3') | 1 μL |
| Template (1 μg/μl *L. starkeyi* genomic DNA*) | 1 μL |
| KOD-Fx-Neo (TOYOBO) | 1 μL |
| Sterile water | 33 μL |
| Total | 50 μL |

*L. starkeyi* CBS1807 genomic DNA was used as a template for 115694 fragment, *L. starkeyi* E15-15 genomic DNA for 115694UHA fragment, *L. starkeyi* K13 genomic DNA for 115694K13 fragment, and *L. starkeyi* K14 genomic DNA for 115694K14 fragment.

Amplification of 18SrDNA-ACT1-Hph Fragment

The following PCR reaction solution was prepared, and 18SrDNA-ACT1-hph fragment was amplified under the following PCR reaction conditions (first denaturation at 94° C. for 2 minutes; then 10 seconds at 98° C., 30 seconds at 60° C., and 4 minutes and 30 seconds at 68° C. for 35 cycles; and final elongation at 68° C. for 1 minute).

TABLE 12

| | |
|---|---|
| 10 × PCR Buffer for KOD-Plus-Neo (TOYOBO) | 5 μL |
| 2 mM dNTPs (TOYOBO) | 5 μL |
| 25 mM MgSO$_4$ (TOYOBO) | 3 μL |
| 20 μM TDH3-18SrDNA-ACT1-hph Fw Primer (SEQ ID NO: 28) (5'-AACTAGCTCAAGGGACGTGC-3') | 1 μL |

TABLE 12-continued

| | |
|---|---|
| 20 uM TDH3-18SrDNA-ACT1-hph Rv Primer (SEQ ID NO: 29) (5'-AGGAGTATAGAGTTGAATTTAATGGACGTTG-3') | 1 μL |
| Template (1 μg/μl pBluescript II KS (+)/5'-UTR (18S rDNA)/$P_{act1}$-hph-$TT_{act1}$/$P_{TDH3}$-ACC1-$TT_{TDH3}$/3'-UTR (18S rDNA)) | 1 μL |
| KOD-Fx-Neo (TOYOBO) | 1 μL |
| Sterile water | 33 μL |
| Total | 50 μL |

The above four DNA fragments (115694 fragment, 115694UHA fragment, 115694K13 fragment, and 115694K14 fragment) were each linked to 18SrDNA-ACT1-hph fragment using the Gibson assembly system (NEB), and transformed into *E. coli* DH5ca. The plasmid was extracted from the colony of the transformed *E. coli* to obtain pBluescript II KS (+)/115694, pBluescript II KS (+)/115694UHA, pBluescript II KS (+)/115694K13, and pBluescript II KS (+)/115694K14.

Test Example 3-5. Production of pBluescript II KS (+)/Δ115694

Amplification of pBluescript II KS (+) Fragment

The following PCR reaction solution was prepared, and pBluescript II KS (+) fragment was amplified under the following PCR reaction conditions (first denaturation at 94° C. for 5 minutes; then 10 seconds at 98° C. and 90 seconds at 68° C. for 35 cycles; and final elongation at 68° C. for 1 minute).

TABLE 13

| | |
|---|---|
| 10 × PCR Buffer for KOD-Fx-Neo (TOYOBO) | 5 μL |
| 2 mM dNTPs (TOYOBO) | 5 μL |
| 25 mM MgSO$_4$ (TOYOBO) | 3 μL |
| 20 μM pBlueFw Primer (SEQ ID NO: 30) (GGGCCCCATCGAATTCCTG) | 1 μL |
| 20 μM pBlueRv Primer (SEQ ID NO: 31) (GGGCCCGGTACCCAGCTTTTG) | 1 μL |
| Template (1 μg/μl pBluescript II KS (+)) | 1 μL |
| KOD-Fx-Neo (TOYOBO) | 1 μL |
| Sterile water | 33 μL |
| Total | 50 μL |

TABLE 14

| | |
|---|---|
| 10 × PCR Buffer for KOD-Fx-Neo (TOYOBO) | 5 μL |
| 2 mM dNTPs (TOYOBO) | 5 μL |
| 25 mM MgSO$_4$ (TOYOBO) | 3 μL |
| 20 μM pNatFw Primer (SEQ ID NO: 32) (ccccggcgtcccaTTAATTTGCTGAAGCGGTTTGCC) | 1 μL |
| 20 μM pNatRv Primer (SEQ ID NO: 33) (gacgagaagtagtATGTAGCGGGTGGTGATG) | 1 μL |
| Template (1 μg/μl pKS-sNAT1*) | 1 μL |
| KOD-Fx-Neo (TOYOBO) | 1 μL |
| Sterile water | 33 μL |
| Total | 50 μL |

*Y. Oguro, H. Yamazaki, S. Ara, Y. Shida, W. Ogasawara, M. Takagi & H. Takaku: Curr. Genet. 63, 751 (2017).

Transcript ID: 115694 5'-untranslated region fragment

The following PCR reaction solution was prepared, and Transcript ID: 115694 5'-untranslated region fragment was amplified under the following PCR reaction conditions (first denaturation at 94° C. for 5 minutes; then 10 seconds at 98° C., 30 seconds at 67° C., and 90 seconds at 68° C. for 35 cycles; and final elongation at 68° C. for 1 minute)

TABLE 15

| | |
|---|---|
| 10 × PCR Buffer for KOD-Fx-Neo (TOYOBO) | 5 μL |
| 2 mM dNTPs (TOYOBO) | 5 μL |
| 25 mM MgSO$_4$ (TOYOBO) | 3 μL |
| 20 μM pTranscript Id: 115694 5'Fw Primer (SEQ ID NO: 34) (ggaacaaaagctgggtaccgggcccCAAGCGGGAGCGGTTGCTCAATTTGC) | 1 μL |
| 20 μM pTranscript Id: 115694 5'Rv Primer (SEQ ID NO: 35) (ttcagcaaattaaTGGGACGCCGGGGGTGCA) | 1 μL |
| Template (1 μg/μl *L. starkeyi* CBS1807 genomic DNA) | 1 μL |
| KOD-Fx-Neo (TOYOBO) | 1 μL |
| Sterile water | 33 μL |
| Total | 50 μL |

TDH3-P+NAT+TDH3-TT Fragment

The following PCR reaction solution was prepared, and TDH3-P+NAT+TDH3-TT fragment was amplified under the following PCR reaction conditions (first denaturation at 94° C. for 5 minutes; then 10 seconds at 98° C. and 90 seconds at 68° C. for 35 cycles; and final elongation at 68° C. for 1 minute).

Transcript ID: 115694 3'-Untranslated Region Fragment

The following PCR reaction solution was prepared, and Transcript ID: 115694 3'-untranslated region fragment was amplified under the following PCR reaction conditions (first denaturation at 94° C. for 5 minutes; then 10 seconds at 98°

C., 30 seconds at 57° C., and 90 seconds at 68° C. for 35 cycles; and final elongation at 68° C. for 1 minute)

TABLE 16

| | |
|---|---|
| 10 × PCR Buffer for KOD-Fx-Neo (TOYOBO) | 5 µL |
| 2 mM dNTPs (TOYOBO) | 5 µL |
| 25 mM MgSO₄ (TOYOBO) | 3 µL |
| 20 µM pTranscript Id: 115694 3'Fw Primer (SEQ ID NO: 36) (ccacccgctacatACTACTTCTCGTCAACAGGGG) | 1 µL |
| 20 µM pTranscript Id: 115694 3'Rv Primer (SEQ ID NO: 37) (gggctgcaggaattcgatggggcccTACAAACTGTCCGGCTGAAC) | 1 µL |
| Template (1 µg/µl *L. starkeyi* CBS1807 genomic DNA) | 1 µL |
| KOD-Fx-Neo (TOYOBO) | 1 µL |
| Sterile water | 33 µL |
| Total | 50 µL |

The above four DNA fragments (pBluescript II KS (+) fragment, TDH3-P+NAT+TDH3-TT fragment, Transcript ID: 115694 5'-untranslated region fragment, and Transcript ID: 115694 3'-untranslated region fragment) were linked together using the Gibson assembly system (NEB), and transformed into *E. coli* DH5ca. The plasmid was extracted from the colony of the transformed *E. coli* to obtain pBluescript II KS (+)/Δ115694.

Test Example 3-6. Production of Δlslig4(115694) Δ115694, Δlslig4(115694UHA) Δ115694, Δlslig4(115694K13) Δ115694, and Δlslig4(115694K14) Δ115694 strains After pBluescript II KS (+)/115694, pBluescript II KS (+)/115694UHA, pBluescript II KS (+)/115694K13, and pBluescript II KS (+)/115694K14 were digested with HpaI, each DNA fragment was transformed into Δlslig4 strain by electroporation*. Thereafter, the obtained Δlslig4(115694), Δlslig4 (115694UHA), Δlslig4 (115694K13), and Δlslig4 (115694K14) strains were cultured, mixed with a DNA fragment obtained by digesting pBluescript II KS (+)/ Δ115694 with HpaI, and transformed by electroporation*. As a result, Δlslig4(115694) 0115694, Δlslig4 (m115694UHA) Δ115694, Δlslig4 (m115694K13) 0115694, and Δlslig4 (m115694K14) 0115694 strains were acquired.

After pBluescript II KS (+)/HE115694, pBluescript II KS (+)/HE115694UHA, pBluescript II KS (+)/HE115694K13, and pBluescript II KS (+)/HE115694K14 were digested with HpaI, each DNA fragment was transformed into Δlslig4 strain by electroporation. Then, the obtained Δlslig4 (HE115694), Δlslig4 (HE 115694UHA), Δlslig4 (HE 115694K13), and Δlslig4 (HE 115694K14) strains were cultured, mixed with a DNA fragment obtained by digesting pBluescript II KS (+)/Δ115694 with HpaI, and transformed by electroporation. As a result, Δlslig4 (HE115694) 0115694, Δlslig4 (HE115694UHA) 0115694, Δlslig4 (HE115694K13) 0115694, and Δlslig4 (HE115694K14) Δ115694 strains were acquired.

Test Example 4. Analysis 1 of 115694 Gene Mutant and/or Overexpression Strains

Four strains, i.e., Δlslig4(115694)Δ115694 (control strain), Δlslig4(115694UHA)Δ115694, Δlslig4(115694K13) Δ115694, and Δlslig4(115694K14)Δ115694, were each cultured in a 500-mL baffled flask containing 300 mL of S medium (0.5% (NH₄)₂SO₄, 0.1% KH₂PO₄, 0.01% NaCl, 0.1% yeast extract, 0.05% MgSO₄·7H₂O, 0.01% CaCl₂·2H₂O, 7% glucose) at 30° C. and 120 rpm for 7 days, and their phenotypes were analyzed. The results are shown in FIGS. 1 and 2.

Compared with the control strain (Δlslig4(115694) Δ115694), the cell concentration of the mutant strains with mutant 115694 (Δlslig4(115694UHA)Δ115694, Δlslig4 (115694K13)Δ115694, and Δlslig4(115694K14)Δ115694) showed only a slight difference in growth. Despite the slight difference in their cell concentrations, the glucose consumption rate of the three mutant strains with mutant 115694 was much faster than that of the control strain. That is, the glucose consumption rate of individual cells increased. The amount of TAG per medium of the three mutant strains with mutant 115694 was much higher (2 to 2.7 times) than that of the control strain, and the amount of TAG per cell was 2 to 3 times higher than that of the control strain. The lipid content and lipid conversion rate of the three mutant strains with mutant 115694 were about twice those of the control strain, indicating high lipid productivity. These results revealed that the mutation found in Transcript ID: 115694 greatly increased lipid productivity in the oleaginous yeast *L. starkeyi* (FIG. 1)

Four strains, i.e., Δlslig4 (HE115694)Δ115694 with highly expressed mutant 115694 (control strain), and Δlslig4 (HE115694UHA)Δ115694, Δlslig4 (HE115694K13) Δ115694, and Δlslig4 (HE115694K14)Δ115694 each with highly expressed mutant 115694, were each cultured in a 500-mL baffled flask containing 300 mL of S medium (glucose concentration: 7%) at 30° C. and 120 rpm for 7 days, and their phenotypes were analyzed. Compared with the control strain with highly expressed wild-type 115694 (Δlslig4 (HE115694)Δ115694), the cell concentrations of the mutant strains with highly expressed mutant 115694 (Δlslig4 (HE115694UHA)Δ115694, Δlslig4 (HE115694K13)Δ115694, and Δlslig4 (HE115694K14) Δ115694) was somewhat lower. Despite their low cell concentrations, the glucose consumption rate of the three mutant strains with highly expressed mutant 115694 was much faster than that of the control strain with highly expressed wild-type 115694. That is, the glucose consumption rate of individual cells increased. The amount of TAG per medium of the three mutant strains with highly expressed mutant 115694 was about 1.7 times that of the control strain, and the amount of TAG per cell was about 1.4 times that of the control strain, indicating high lipid productivity. In addition, the lipid content and lipid conversion rate were also improved. These results reconfirm that the mutation found in Transcript ID: 115694 greatly increases lipid productivity in the oleaginous yeast *L. starkeyi* (FIG. 2).

Figure 1:
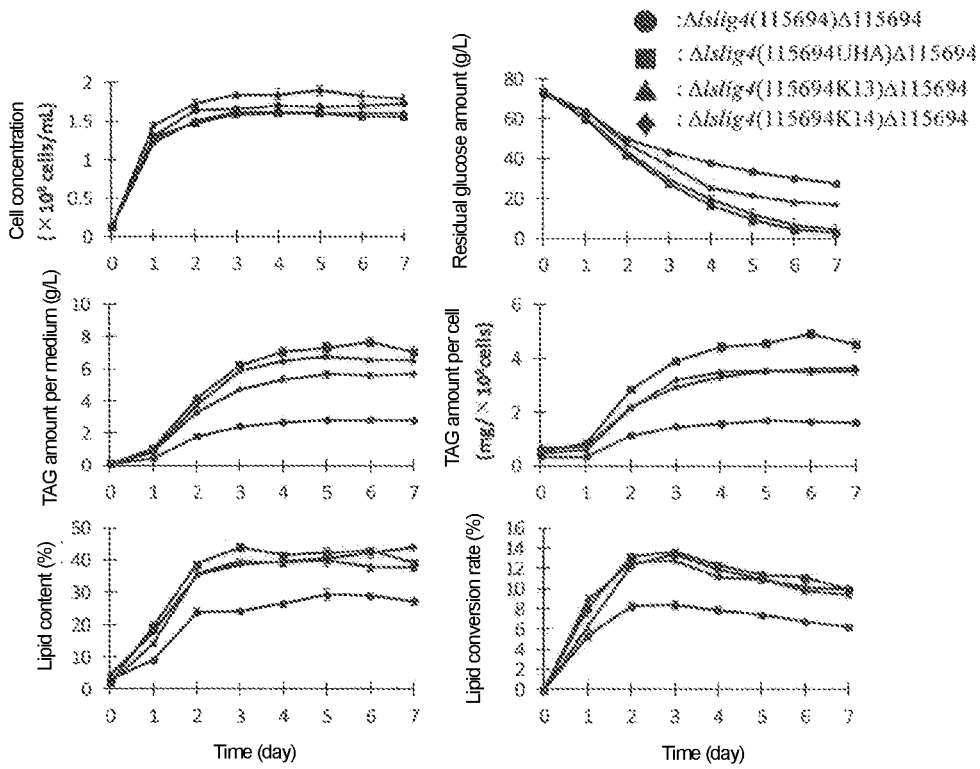
FIG. 1 shows the lipid productivity of mutant strains with mutant 115694 gene. The horizontal axis of each graph shows the elapsed time from the start of culture.
Figure 2:
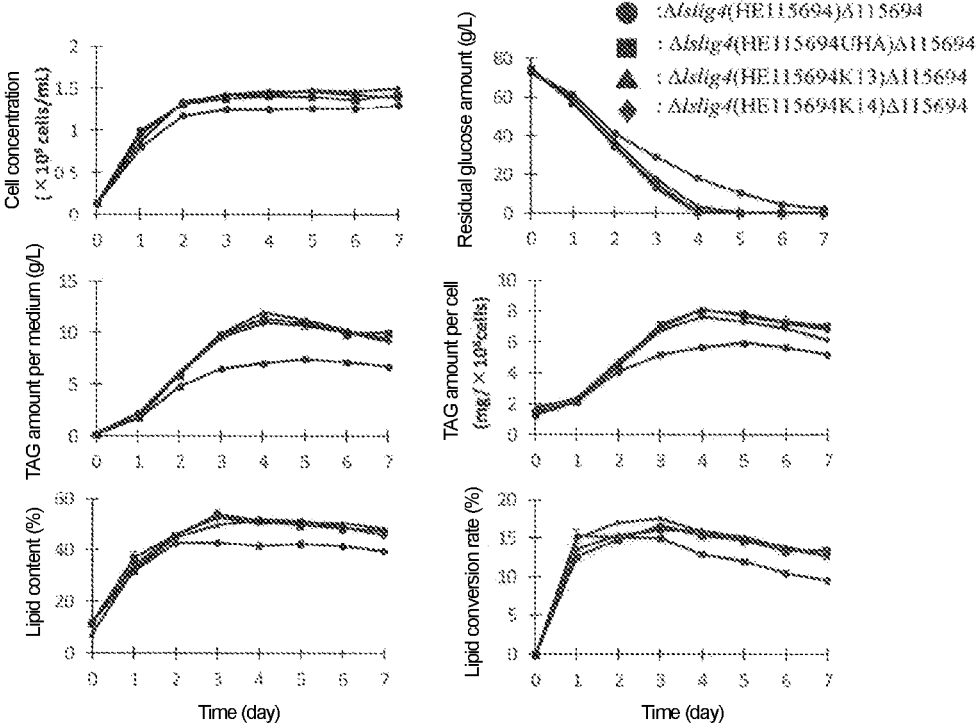
FIG. 2 shows the lipid productivity of wild-type 115694 gene high-expression strain and mutant 115694 gene high-expression strains. The horizontal axis of each graph shows the elapsed time from the start of culture.
Figure 3:
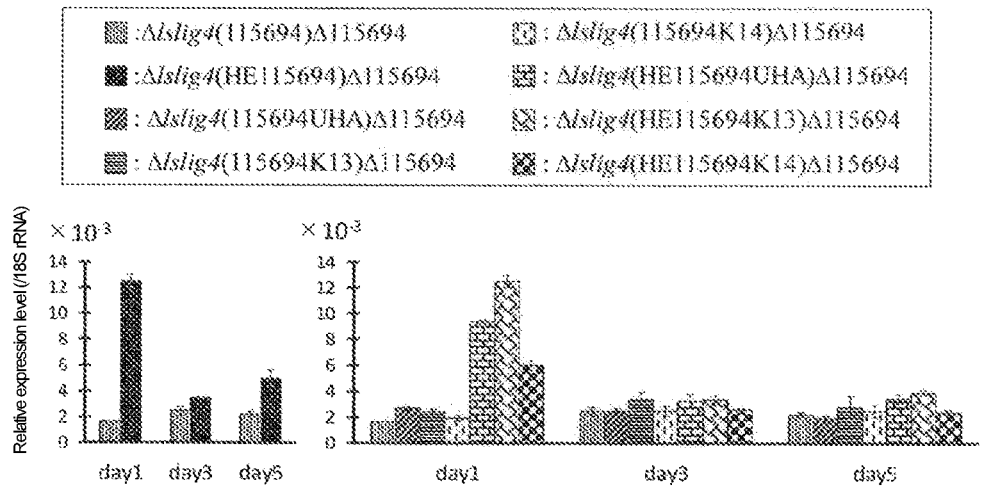
FIG. 3 shows the expression levels of 115694 gene in 115694 gene non-high-expression and high-expression strains. The horizontal axis of each graph shows the elapsed time from the start of culture.

When the four non-high-expression strains shown in FIG. 1 (Δlslig4(115694)Δ115694, Δlslig4(115694UHA)Δ115694, Δlslig4(115694K13)Δ115694, and Δlslig4(115694K14) Δ115694) were compared with the four Transcript ID: 115694 high-expression strains (Δlslig4 (HE115694) Δ115694, Δlslig4 (HE115694UHA)Δ115694, Δlslig4 (HE115694K13)Δ115694, and Δlslig4 (HE115694K14) Δ115694) shown in FIG. 2, it was revealed that high expression of either wild-type Transcript ID: 115694 or mutant Transcript ID: 115694 improved lipid productivity. Further, as a result of analyzing the expression levels of the 115694 gene in each strain, the 115694 gene expression level in the Transcript ID: 115694 high-expression strain was increased about 6 times that of the control non-high-expression strain on the first day of culture (FIG. 3). That is, it was clarified that the high expression of Transcript ID: 115694 in *L. starkeyi* cells was effective to improve lipid productivity.

Figure 6:
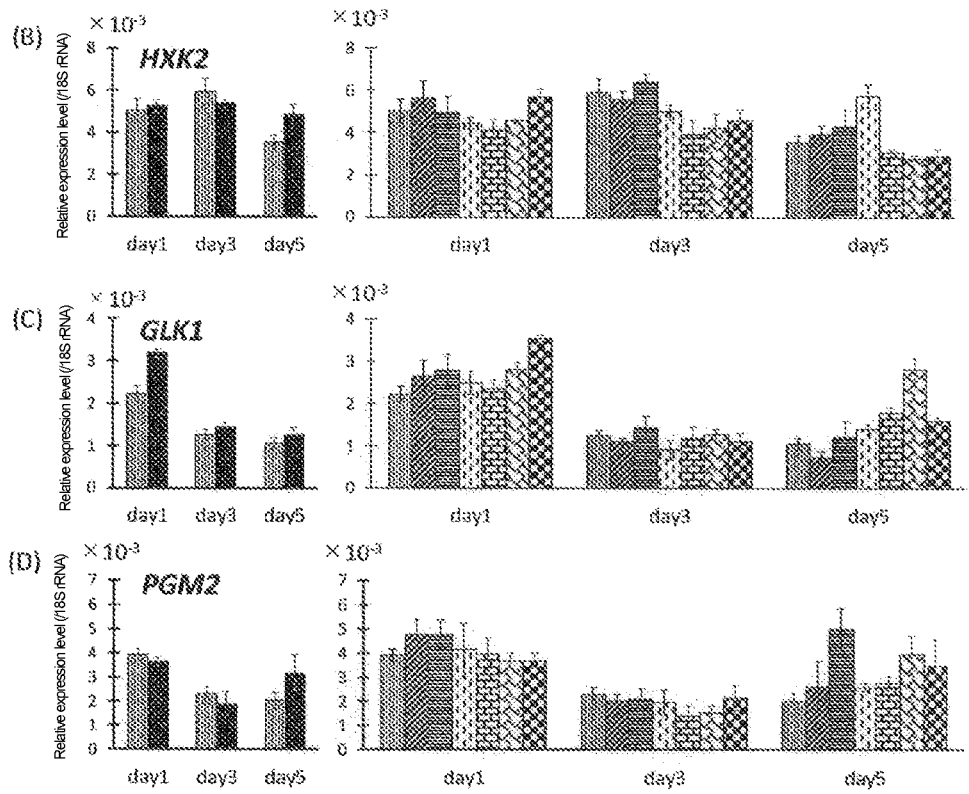
FIG. 6 shows the relative expression levels of glycolysis-related genes: (B) HXK2, (C) GLK1, and (D) PGM2. Others, such as the legend and horizontal axis, are the same as those in FIG. 5.
Figure 7:
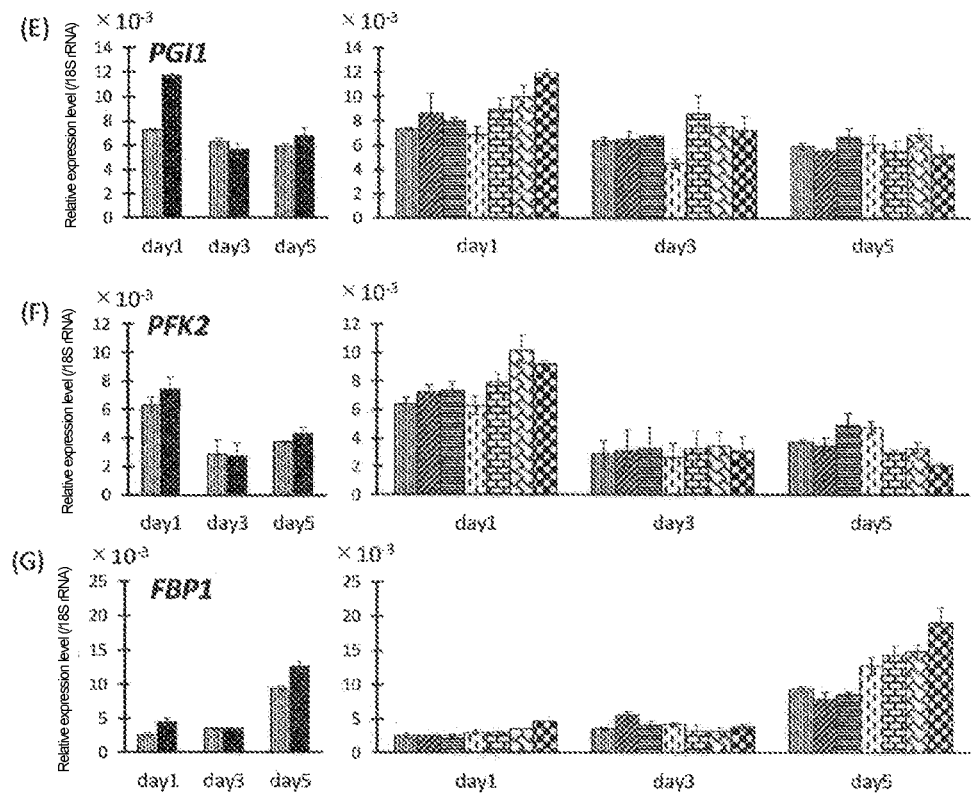
FIG. 7 shows the relative expression levels of glycolysis-related genes: (E) PGI1, (F) PFK2, and (G) FBP1. Others, such as the legend and horizontal axis, are the same as those in FIG. 5.
Figure 8:
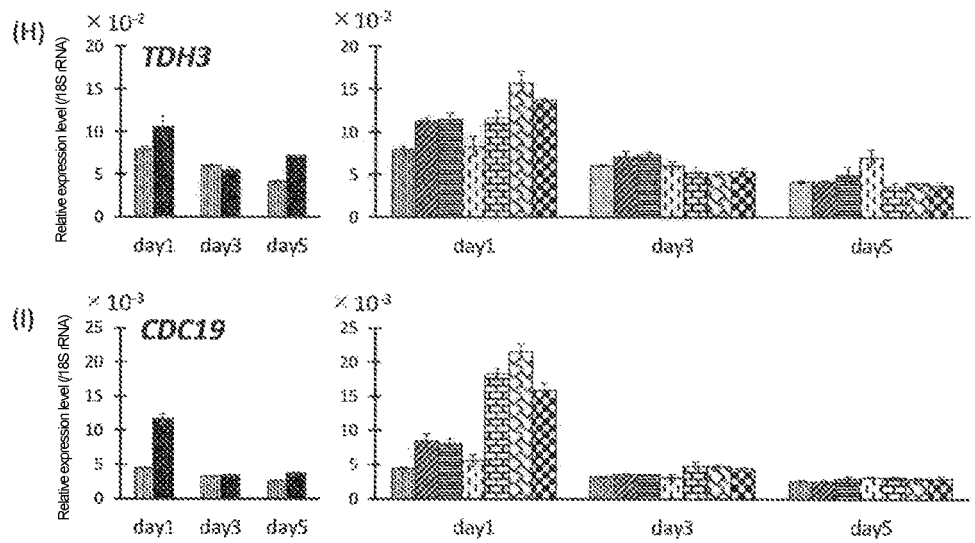
FIG. 8 shows the relative expression levels of glycolysis-related genes: (H) TDH3 and (I) CDC19. Others, such as the legend and horizontal axis, are the same as those in FIG. 5.

Next, as a result of analyzing the fatty acid compositions of the accumulated lipids in the four non-high-expression strains (Δlslig4(115694)Δ115694, Δlslig4(115694UHA) Δ115694, Δlslig4(115694K13)Δ115694, and Δlslig4 (115694K14)Δ115694) shown in FIG. 1, and the four Transcript ID: 115694 high-expression strains (Δlslig4 (HE115694)Δ115694, Δlslig4 (HE115694UHA)Δ115694, Δlslig4 (HE115694K13)Δ115694, and Δlslig4 (HE115694K14)Δ115694) shown in FIG. 2, in the strains with mutant 115694, the stearic acid content was lower and the oleic acid content was increased by 2 to 4% compared to the control strain. It was considered that the above mutation affected the increase in the amount of oleic acid (Table 17).

mutant Transcript ID: 115694 were highly expressed (FIG. 6). After that, the glycolytic pathway diverged from glucose 6-phosphate; however, there was no particular change between strains for PGM2, which leads to the polysaccharide synthesis pathway (FIG. 6). When the wild-type and mutant Transcript ID: 115694 were highly expressed, PGI1, PFK2, and TDH3 were slightly highly expressed (FIGS. 7 and 8). In addition, the gene encoding the enzyme responsible for the irreversible reaction, which is considered to be the rate-determining step in the glycolysis system, was analyzed. The expression level of CDC19 was increased when Transcript ID: 115694 was highly expressed, and mutant Transcript ID: 115694 was more highly expressed than the control (FIG. 8).

Next, TCA cycle-related genes were analyzed. In general, in other yeasts, the expression of IDH1 and 2 decreases

TABLE 17

| Fatty Acid | | Δ lslig4 (115694) Δ115694 | Δ lslig4 (115694UHA) Δ115694 | Δ lslig4 (115694K13) Δ115694 | Δ lslig4 (115694K14) Δ115694 | Δ lslig4 (HE115694) Δ115694 | Δ lslig4 (HE115694UHA) Δ115694 | Δ lslig4 (HE115694K13) Δ115694 | Δ lslig4 (HE115694K14) Δ115694 |
|---|---|---|---|---|---|---|---|---|---|
| C16:0 | Palmitic acid | 36.19 | 38.71 | 36.61 | 37.43 | 37.83 | 38.96 | 38.62 | 39.19 |
| C16:1 | Palmitoleic acid | 3.16 | 3.70 | 3.77 | 3.85 | 3.30 | 3.27 | 3.44 | 3.44 |
| C18:0 | Stearic acid | 6.87 | 4.28 | 4.90 | 4.30 | 5.87 | 5.37 | 4.95 | 4.99 |
| C18:1n9c | Oleic acid | 44.37 | 48.11 | 48.51 | 47.76 | 45.72 | 47.05 | 47.95 | 46.13 |
| C18:2n9c | Linoleic acid | 3.63 | 1.76 | 2.12 | 2.66 | 3.79 | 2.37 | 2.30 | 3.26 |
| | Others | 5.78 | 3.44 | 4.09 | 4.00 | 3.50 | 2.99 | 2.75 | 2.99 |

Test Example 5. Analysis 2 of 115694 Gene Mutant and/or Overexpression Strain

Next, in order to clarify the involvement of Transcript ID: 115694 in lipid synthesis and degradation pathways, comparative analysis of lipid synthesis and degradation pathway-related gene expression behavior was performed on days 1, 3, and 5 during culture shown in FIGS. 1 and 2, and the following three patterns were compared.

(1) Comparative analysis of lipid synthesis and degradation pathway-related gene expression behavior due to the difference in the expression levels of wild-type Transcript ID: 115694 (Δlslig4(115694)Δ115694 vs Δlslig4 (HE115694)Δ115694)

(2) Comparative analysis of lipid synthesis and degradation pathway-related gene expression behavior due to the difference between wild-type Transcript ID: 115694 and mutant Transcript ID: 115694 (Δlslig4(115694) Δ115694 vs Δlslig4(115694UHA) Δ115694, Δlslig4 (115694K13)Δ115694, and Δlslig4(115694K14) Δ115694)

(3) Comparative analysis of lipid synthesis and degradation pathway-related gene expression behavior due to mutation at high expression of wild-type Transcript ID: 115694 and mutant Transcript ID: 115694 and high expression (Δlslig4 (115694)Δ115694 vs Δlslig4 (HE115694UHA)Δ115694, Δlslig4 (HE115694K13) Δ115694, and Δlslig4 (HE115694K14)Δ115694).

Figure 4:
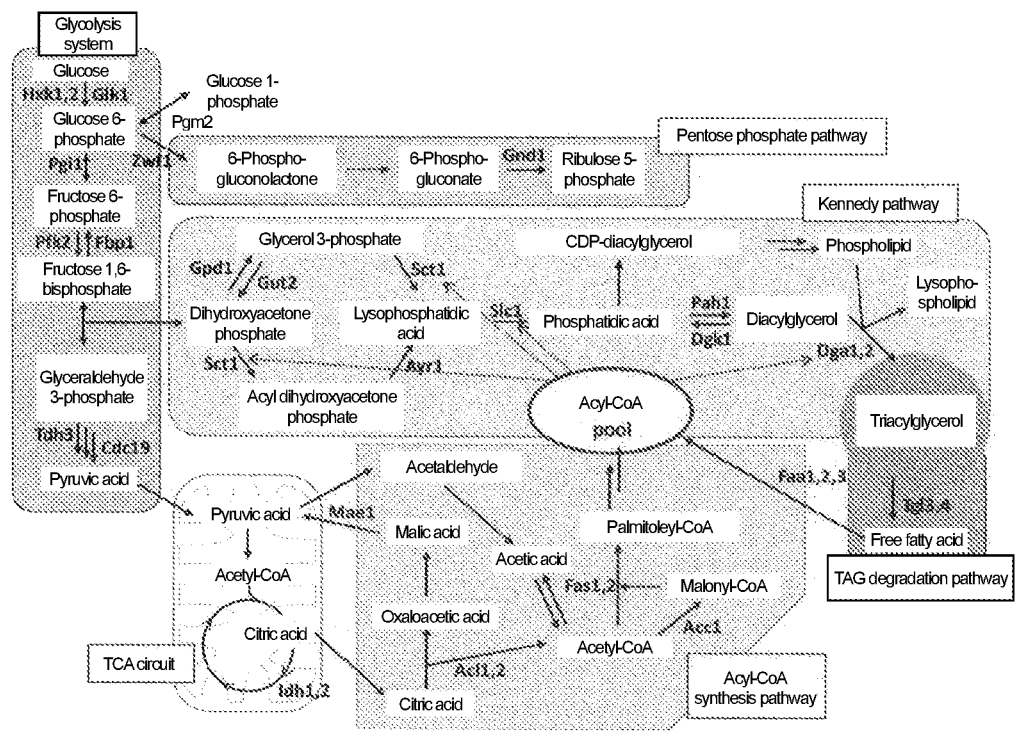
FIG. 4 shows the predicted metabolic pathway of *L. starkeyi*.
Figure 5:
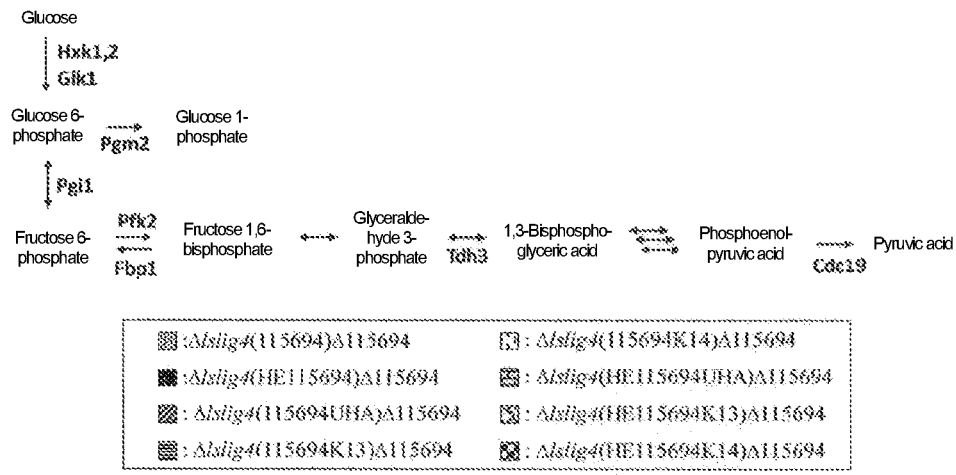
FIG. 5 shows the relative expression levels of glycolysis-related gene: (A) HXK1 in wild-type 115694 gene high-expression strain, 115694 gene mutant strains, and mutant 115694 gene high-expression strains. Each graph shows the average of three independent measurements, and error bars show standard errors. The horizontal axis of each graph shows the elapsed time from the start of culture.
Figure 5:
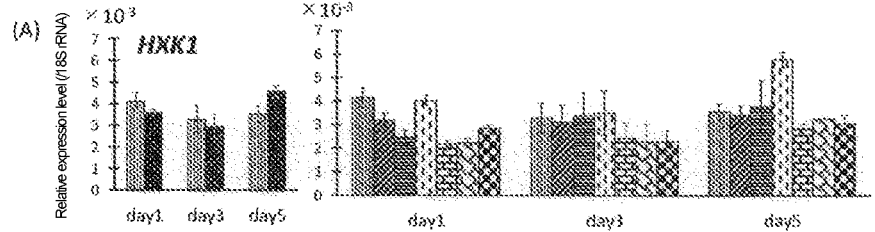
Figure 9:
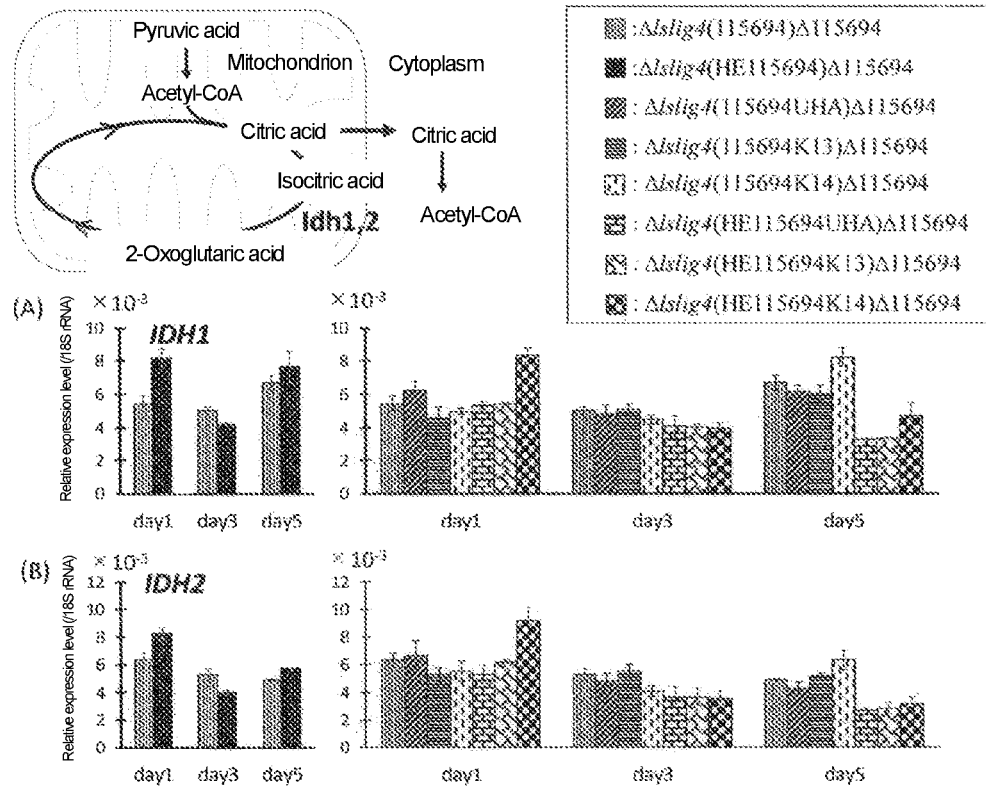
FIG. 9 shows the relative expression levels of TCA cycle-related genes: (A) IDH1 and (B) IDH2 in wild-type 115694 gene high-expression strain, 115694 gene mutant strains, and mutant 115694 gene high-expression strains.

FIG. 4 shows the lipid synthesis and degradation pathway from glucose by *L. starkeyi*. First, expression analysis of glycolysis-related genes was performed. There is no particular change between strains for two genes involved in glucose uptake (HXK1 and HXK2), and the involvement of Transcript ID: 115694 is unlikely (FIGS. 5 and 6). GLK1 was slightly highly expressed when the wild-type and during the lipid accumulation period, citric acid preferentially transfers from the mitochondria to the cytoplasm, and acetyl-CoA, which is the starting material of the acyl-CoA synthesis pathway, is synthesized. As a result of analyzing these two genes, the expression level was higher or similar in all strains as compared with the control, and it is considered that the above pathway is not suppressed in *L. starkeyi* (FIG. 9).

Next, acyl-CoA synthesis pathway-related genes were analyzed. Since the acyl-CoA synthesis pathway is particularly highly expressed in the gene expression analysis of the high lipid accumulation mutant strains, it is considered to be a gene cluster important for high lipid accumulation. As a result of analysis, high expression of Transcript ID: 115694 in 5 genes ACL1 and 2, ACC1, and FAS1 and 2 also showed high expression of each gene, and high expression of each gene was also observed in the mutant Transcript ID: 115694-introduced strain (FIGS. 10 to 12). This result suggested the involvement of the acyl-CoA synthesis pathway genes and Transcript ID: 115694. In addition, since NADPH is used for fatty acid elongation, an NADP-linked malic acid enzyme may be involved as its source; however, the malic acid enzyme of *L. starkeyi* is highly likely an NAD-linked malic acid enzyme from amino acid sequence analysis. Conversely, the expression of MAE1 was decreased in the Transcript ID: 115694 high-expression strains (FIG. 12)

From the above, it was considered that there were other sources of NADPH. Next, pentose phosphate pathway-related genes were analyzed. The expression level of ZWF1 was similar to that of the wild-type in both introduced strains and high-expression strains. Although there was no difference for GND1 between the wild-type and the mutants, the expression level in the high-expression strains was about twice that of the introduced strains (FIG. 13). From this, it was considered that NADPH supply was performed in the pentose phosphate pathway.

Finally, Kennedy pathway-related genes were analyzed. Dihydroxyacetone phosphate, which is the starting material of the Kennedy pathway, is a substance produced in the process of glycolysis reaction. Dihydroxyacetone phosphate is then subjected to a number of enzymatic reactions, and TAG is finally synthesized. As a result of analysis, the expression levels of SCT1, GPD1, SLC1, PAH1, and DGA1 and 2 were increased due to the high expression of Transcript ID: 115694 (FIGS. 14 to 17). Further, the mutant Transcript ID: 115694-introduced strain showed high expression in most of the genes, and the mutant high-expression strain showed even higher expression and low expression of DGK1, which is a reverse reaction (FIG. 16). These results suggested that some genes were involved with Transcript ID: 115694.

Test Example 6. Acquisition of Lipid Production Control Factors Using Expression Control Network Construction Technology Test Example 6-1. Extraction of Candidate Factors In addition to the wild strain, the microarray data of low lipid accumulation mutant strains m45, m47, sr5, sr17, and sr22, high lipid accumulation mutant strains A42, E15, E47, K13, and K14, and ultra-high lipid accumulation mutant strains E15-11, E15-15, and E15-25 were acquired at eight time points (days 0, 1, 2, 3, 4, 5, 6, and 7) in lipid production culture. Thereafter, a lipid production control network model was constructed by the following methods (1) to (3) (FIG. 18). (1) Select 15 genes that are highly correlated with lipid productivity (oil g/L/day). To estimate the causal relationship between the selected 15-gene group and lipid productivity, (2) construct an initial model using a Bayesian network (BN) model. (3) Model optimization by a structural equation model.

From the constructed lipid production control network, eight genes encoding factors capable of controlling lipid productivity (Transcript IDs: 1072, 4888, 45559, 62497, 65921, 74168, 76736, and 216324) were extracted.

Test Example 6-2. Production of Candidate Factor-Disrupted Strains and High-Expression Strains Gene high-expression strains (HE1072, HE4888, HE65921, and HE216324) or gene-disrupted strains (Δ4888 and Δ45559) were prepared.

Test Example 6-2-1. Production of pBluescript II KS (+)/HE1072, pBluescript II KS (+)/HE4888, pBluescript II KS (+)/HE65921, and pBluescript II KS (+)/HE216324

Amplification of HE1072 Fragment, HE4888 Fragment, HE65921 Fragment, and HE216324 Fragment The following PCR reaction solution was prepared, and HE1072 fragment, HE4888 fragment, HE65921 fragment, and HE216324 fragment were amplified under the following PCR reaction conditions (first denaturation at 94° C. for 2 minutes; then 10 seconds at 98° C., 10 seconds at 55° C., and 25 seconds at 68° C. for cycles; and final elongation at 68° C. for 1 minute and 15 seconds).

TABLE 18

| | |
|---|---|
| 10 × PCR Buffer for KOD-Plus-Neo (TOYOBO) | 5 μL |
| 2 mM dNTPs (TOYOBO) | 5 μL |
| 25 mM MgSO$_4$ (TOYOBO) | 3 μL |
| 20 μM Fw Primer[×1] | 1 μL |
| 20 μM Rv Primer[×2] | 1 μL |
| Template (*L. starkeyi* CBS1807 reverse transcription solution) | 1 μL |
| KOD-Fx-Neo (TOYOBO) | 1 μL |
| Sterile water | 33 μL |
| Total | 50 μL |

[*1] HE1072 fragment amplification Fw Primer (5'-tactctaatccacattcgcaATGTCACAATCACGACAG-3' (SEQ ID NO: 38)), HE4888 fragment amplification Fw Primer (5'-tactctaatccacattcgcaATGAAGAAGAGCGTGATCAAGC-3' (SEQ ID NO: 39)), HE65921 fragment amplification Fw Primer (5'-tactctaatccacattcgcaATGTCTGAGGAGCAGAAATATC-3' (SEQ ID NO: 41)), HE216324 fragment amplification Fw Primer (5'-tactctaatccacattcgcaATGTCTTCTCCATTAGCAC-3' (SEQ ID NO: 42)).

[*2] HE1072 fragment amplification Rv Primer (5'-gaagaccatcaaccgcacacTTAATCTAAAGATGCCTCAG-3' (SEQ ID NO: 43)), HE4888 fragment amplification Rv Primer (5'-gaagaccatcaaccgcacacTCACTTCAGCTCGTTGAGTTC-3' (SEQ ID NO: 44)), HE65921 fragment amplification Rv Primer (5'-gaagaccatcaaccgcacacTCACTCCTTGTGACTAGC-3' (SEQ ID NO: 46)), HE216324 fragment amplification Rv Primer (5'-gaagaccatcaaccgcacacTCACTCACATTGTCGTTG-3' (SEQ ID NO: 47)).

Amplification of TDH3-18SrDNA-ACT1-Hph Fragment

The following PCR reaction solution was prepared, and TDH3-18SrDNA-ACT1-hph fragment was amplified under the following PCR reaction conditions (first denaturation at 94° C. for 2 minutes; then 10 seconds at 98° C., 30 seconds at 60° C., and 4 minutes and 30 seconds at 68° C. for 35 cycles; and final elongation at 68° C. for 1 minute).

TABLE 19

| | |
|---|---|
| 10 × PCR Buffer for KOD-Plus-Neo (TOYOBO) | 5 μL |
| 2 mM dNTPs (TOYOBO) | 5 μL |
| 25 mM MgSO$_4$ (TOYOBO) | 3 μL |
| 20 μM TDH3-18SrDNA-ACT1-hph Fw Primer (SEQ ID NO: 48) (5'-GTGTGCGGTTGATGGTCTTCTATCTTCC-3') | 1 μL |
| 20 μM TDH3-18SrDNA-ACT1-hph Rv Primer (SEQ ID NO: 49) (5'-TGCGAATGTGGATTAGAGTAAGATAGATAACTTTTATCTGG-3') | 1 μL |
| Template (1 μg/μl pBluescript II KS (+)/5'-UTR (18S rDNA)/P$_{act1}$-hph-TT$_{act1}$/P$_{TDH3}$-ACC1-TT$_{TDH3}$/3'UTR (18S rDNA) | 1 μL |

TABLE 19-continued

| | |
|---|---|
| KOD-Fx-Neo (TOYOBO) | 1 μL |
| Sterile water | 33 μL |
| Total | 50 μL |

The above four DNA fragments (HE1072 fragment, HE4888 fragment, HE65921 fragment, and HE216324 fragment) were each linked to TDH3-18SrDNA-ACT1-hph fragment using the Gibson assembly system (NEB), and transformed into E. coli DH5ca. The plasmid was extracted from the colony of the transformed E. coli to obtain pBluescript II KS (+)/HE1072, pBluescript II KS (+)/HE4888, pBluescript II KS (+)/HE65921, and pBluescript II KS (+)/HE216324.

Test Example 6-2-2. Production of Gene High-Expression Strains (HE1072, HE4888, HE65921, and HE216324)

After pBluescript II KS (+)/HE1072, pBluescript II KS (+)/HE4888, pBluescript II KS (+)/HE65921, and pBluescript II KS (+)/HE216324 were digested with HpaI, each DNA fragment was transformed into L. starkeyi CBS1807 strain by electroporation. As a result, HE1072, HE4888, HE65921, and HE216324 strains were acquired.

Test Example 6-2-3. Production of pBluescript II KS (+)/Δ4888 and pBluescript II KS (+)/Δ45559

Amplification of pBluescript II KS (+) Fragment

The following PCR reaction solution was prepared, and pBluescript II KS (+) fragment was amplified under the following PCR reaction conditions (first denaturation at 94° C. for 5 minutes; then 10 seconds at 98° C., 30 seconds at 60° C., and 90 seconds at 68° C. for 35 cycles; and final elongation at 68° C. for 3 minutes).

TABLE 20

| | |
|---|---|
| 10 × PCR Buffer for KOD-Plus-Neo (TOYOBO) | 5 μL |
| 2 mM dNTPs (TOYOBO) | 5 μL |
| 25 mM MgSO₄ (TOYOBO) | 3 μL |
| 20 μM pBluescript Fw Primer (SEQ ID NO: 50) (CTGCAGGAATTCGATATCAAGCTTATCGATACCGTCGAC) | 1 μL |
| 20 μM pBluescript Primer (SEQ ID NO: 51) (GGATCCACTAGTTCTAGAGC) | 1 μL |
| Template (1 μg/μL pBluescript II KS (+)) | 1 μL |
| KOD-Plus-Neo (TOYOBO) | 1 μL |
| Sterile water | 33 μL |
| Total | 50 μL |

TDH3-P+Hph+TDH3-TT (4888) Fragment and TDH3-P+Hph+TDH3-TT (45559) Fragment

The following PCR reaction solution was prepared, and TDH3-P+hph+TDH3-TT(4888) fragment and TDH3-P+hph+TDH3-TT (45559) fragment were amplified under the following PCR reaction conditions (first denaturation at 94° C. for 5 minutes; then 10 seconds at 98° C., 30 seconds at 60° C., and 90 seconds at 68° C. for cycles; and final elongation at 68° C. for 3 minutes).

TABLE 21

| | |
|---|---|
| 10 × PCR Buffer for KOD-plus-Neo (TOYOBO) | 5 μL |

TABLE 21-continued

| | |
|---|---|
| 2 mM dNTPs (TOYOBO) | 5 μL |
| 25 mM MgSO₄ (TOYOBO) | 3 μL |
| 20 μM Fw Primer[*1] | 1 μL |
| 20 μM Rv Primer[*2] | 1 μL |
| Template (1 μg/μl pKS-18S-hph[*3]) | 1 μL |
| KOD-plus-Neo (TOYOBO) | 1 μL |
| Sterile water | 33 μL |
| Total | 50 μL |

[*1] TDH3-P+hph+TDH3-TT (4888) fragment amplification Fw Primer (5'-gccctacccagcgTTAATTTGCTGAAGCGGTTTG-3' (SEQ ID NO: 52)), TDH3-P+hph+TDH3-TT (45559) fragment amplification Fw Primer (5'-ttttgtgctctcaTTAATTTGCTGAAGCGGTTTG-3' (SEQ ID NO: 53)).

[*2] TDH3-P+hph+TDH3-TT (4888) fragment amplification Rv Primer (5'-ctctttcttcaacATGTAGCGGGTGGTGATG-3' (SEQ ID NO: 54)), TDH3-P+hph+TDH3-TT (45559) fragment amplification Rv Primer (5'-actctgaatacaaATGTAGCGGGTGGTGATG-3' (SEQ ID NO: 55)).

[*3] Y. Oguro, H. Yamazaki, Y. Shida, W. Ogasawara, M. Takagi & H. Takaku: Biosci. Biotechnol. Biochem., 79, 512 (2015).

Transcript ID: 4888 5'-untranslated region fragment, Transcript ID: 4888 3'-untranslated region fragment, Transcript ID: 45559 5'-untranslated region fragment, and Transcript ID: 45559 3'-untranslated region fragment The following PCR reaction solution was prepared, and Transcript ID: 4888 5'-untranslated region fragment, Transcript ID: 4888 3'-untranslated region fragment, Transcript ID: 45559 5'-untranslated region fragment, and Transcript ID: 45559 3'-untranslated region fragment were amplified under the following PCR reaction conditions (first denaturation at 94° C. for 5 minutes; then 10 seconds at 98° C., 30 seconds at 60° C., and 70 seconds at 68° C. for 35 cycles; and final elongation at 68° C. for 2 minutes and 20 seconds).

TABLE 22

| | |
|---|---|
| 10 × PCR Buffer for KOD-plus-Neo (TOYOBO) | 5 μL |
| 2 mM dNTPs (TOYOBO) | 5 μL |
| 25 mM MgSO₄ (TOYOBO) | 3 μL |
| 20 μM Fw Primer[*1] | 1 μL |
| 20 μM Rv Primer[*2] | 1 μL |
| Template (1 μg/μl L. starkeyi CBS1807 genomic DNA) | 1 μL |
| KOD-plus-Neo (TOYOBO) | 1 μL |
| Sterile water | 33 μL |
| Total | 50 μL |

[*1] Transcript ID: 4888 5'-untranslated region fragment amplification Fw Primer (5'-cggccgctctagaactagtgatccGCAGTGTTGCCGCAGCCG-3' (SEQ ID NO: 56)), Transcript ID: 4888 3'-untranslated region fragment amplification Fw Primer (5'-ccacccgctacatGTTGAAGAAAGAGACGAATAAG-3' (SEQ ID NO: 57)), Transcript ID: 45559 5'-untranslated region fragment amplification Fw Primer (5'- cggccgctctagaactagtggatccGGCAGGTGATGTTCT-TATG-3' (SEQ ID NO: 58)), Transcript ID: 45559 3'-untranslated region fragment amplification Fw Primer (5'-ccacccgctacatTTGTATTCAGAGTCTG-CATTG-3' (SEQ ID NO: 59)).

*[2] Transcript ID: 4888 5'-untranslated region fragment amplification Rv Primer (5'-ttcagcaaat-taaCGCTGGGTAGGGCCCTGATTG-3' (SEQ ID NO: 60)), Transcript ID: 4888 3'-untranslated region fragment amplification Rv Primer (5'-taagcttgatatcgaat-tcctgcagATTTACAGAGTTTTTCGACAG-3' (SEQ ID NO: 61)), Transcript ID: 45559 5'-untranslated region fragment amplification Rv Primer (5'-ttcagcaaattaaT-GAGAGCACAAAATCATG-3' (SEQ ID NO: 62)), Transcript ID: 45559 3'-untranslated region fragment amplification Rv Primer (5'-taagcttgatatcgaattcctgca-gATTGAAGGCGATTATAGAC-3' (SEQ ID NO: 63)).

In order to obtain pBluescript II KS (+)/Δ4888, the above four DNA fragments (pBluescript II KS (+) fragment, TDH3-P+hph+TDH3-TT(4888) fragment, Transcript ID: 4888 5'-untranslated region fragment, and Transcript ID: 4888 3'-untranslated region fragment), and to obtain pBluescript II KS (+)/Δ45559, the above four DNA fragments (pBluescript II KS (+) fragment, TDH3-P+hph+TDH3-TT (45559) fragment, Transcript ID: 45559 5'-untranslated region fragment, and Transcript ID: 45559 3'-untranslated region fragment) were linked together using the Gibson assembly system (NEB), and transformed into E. coli DH5a. The plasmid was extracted from the colony of the transformed E. coli to obtain pBluescript II KS (+)/Δ4888 and pBluescript II KS (+)/045559.

Test Example 6-2-4. Production of Δ4888 Strain and Δ45559 Strain

In order to amplify a 4888 disruption DNA fragment and a 45559 disruption DNA fragment to be introduced into L. starkeyi CBS1807 strain, pBluescript II KS (+)/Δ4888 and pBluescript II KS (+)/Δ45559 were used as templates, and the 4888 disruption DNA fragment and the 45559 disruption DNA fragment were amplified under the following PCR reaction conditions (first denaturation at 94° C. for 5 minutes; then 10 seconds at 98° C., 30 seconds at 60° C., and 3 minutes and 50 seconds at 68° C. for 35 cycles; and final elongation at 68° C. for 5 minutes and 20 seconds).

TABLE 23

| | |
|---|---|
| 10 × PCR Buffer for KOD-plus-Neo (TOYOBO) | 5 μL |
| 2 mM dNTPs (TOYOBO) | 5 μL |
| 25 mM MgSO$_4$ (TOYOBO) | 3 μL |
| 20 μM Fw Primer[X:1] | 1 μL |
| 20 μM Rv Primer[X:2] | 1 μL |
| Template (1 μg/μl pBluescript II KS (+)/ Δ4888 or pBluescript II KS (+)/Δ45559) | 1 μL |
| KOD-plus-Neo (TOYOBO) | 1 μL |
| Sterile water | 33 μL |
| Total | 50 μL |

*[1] 4888 disruption DNA fragment amplification Fw Primer (5'-cggccgctctagaactagtg-gatccGCAGTGTTGCCGCAGCCG-3' (SEQ ID NO: 64)), 45559 disruption DNA fragment amplification Fw Primer (5'-cggccgctctagaactagtggatccGGCAGGT-GATGTTCTTATG-3' (SEQ ID NO: 65)).

*[2] 4888 disruption DNA fragment amplification Rv Primer (5'-taagcttgatatcgaattcctgcagATTTA-CAGAGTTTTTCGACAG-3' (SEQ ID NO: 66)), 45559 disruption DNA fragment amplification Rv Primer (5'-taagcttgatatcgaattcctgcagATTGAAGGC-GATTATAGAC-3' (SEQ ID NO: 67)).

The acquired 4888 disruption DNA fragment and 45559 disruption DNA fragment were transformed into L. starkeyi CBS1807 strains by electroporation. As a result, Δ4888 strain and Δ45559 strain were acquired.

Test Example 7. Analysis of Candidate Factor-Disrupted Strains and High-Expression Strains The lipid productivity was analyzed. As a result, the lipid productivity of Transcript ID: 4888 and 216324 gene high-expression strains was improved by 1.9 times and 1.2 times, respectively, and the lipid productivity of Transcript ID: 45559 gene-disrupted strain was improved by 1.5 times. Further, the lipid productivity of Transcript ID: 4888 gene-disrupted strain, whose lipid productivity was improved when highly expressed, was reduced by 0.7 times (Table 24).

TABLE 24

| Transcript ID | Lipid productivity (gene high expression) (relative to 6-day cultured wild-type strain) | Lipid productivity (genedisruption) (relative to 6-day cultured wild-type strain) | Notes |
|---|---|---|---|
| 216324 | 1.2 times | — | |
| 45559 | — | 1.5 times | |
| 4888 | 1.9 times | 0.7 times | |
| 62497 | — | — | No prediction essential gene or gene-disrupted strain could be acquired. |
| 65921 | 1.0 times | — | |
| 1072 | 1.1 times | — | |

Focusing on genes whose lipid productivity was improved by 1.5 times or more, the estimated amino acid sequences of these genes were analyzed by Blastp. As a result, Protein ID: 45559 was similar to an intramembrane metal proteinase; however, Protein ID: 4888 was a protein of unknown function. SEQ ID NO: 68 represents the amino acid sequence of the 4888 gene, and SEQ ID NO: 69 represents the amino acid coding sequence of the 4888 gene. Further, SEQ ID NO: 70 represents the amino acid sequence of the 45559 gene, and SEQ ID NO: 71 represents the amino acid coding sequence of the 45559 gene.

Test Example 8. Analysis of 4888 Gene-Disrupted Strain and High-Expression Strain and 45559 Gene-Disrupted Strain Next, in order to clarify in detail the involvement of Transcript IDs: 4888 and 45559 in lipid production, Transcript ID: 4888 gene high-expression strain (4888HE) and Transcript ID: 4888 and 45559 gene-disrupted strains (Δ4888 and Δ45559) were prepared and cultured together with the wild strain in a 500-mL baffled flask containing 300 mL of S medium (0.5% (NH$_4$)$_2$SO$_4$, 0.1% KH$_2$PO$_4$, 0.01% NaCl, 0.1% yeast extract, 0.05% MgSO$_4$·7H$_2$O, 0.01% CaCl$_2$·2H$_2$O, 7% glucose) at 30° C. and 120 rpm for 8 days, and their phenotypes were analyzed over time.

Compared with the wild strain, the cell concentration of the Transcript ID: 4888 gene high-expression strain (4888HE) was reduced. The glucose consumption rate was comparable with that of the wild strain. That is, it was clarified that the glucose consumption rate of individual cells of the 4888HE strain was fast. The amount of TAG per medium of the 4888HE strain was much higher than that of the wild strain (1.4 times), and the amount of TAG per cell was 1.5 times that of the wild strain. Further, the TAG content and TAG conversion rate of the 4888HE strain also significantly exceeded those of the wild strain, indicating high lipid productivity. These results revealed that high gene expression of Transcript ID: 4888 significantly improved lipid productivity in the oleaginous yeast L. starkeyi (FIG. 19).

Among Transcript ID: 4888 and 45559 gene-disrupted strains (Δ4888 and Δ45559), only the Δ45559 strain had a lower cell concentration than that of the wild strain. The glucose consumption rate of each gene-disrupted strain was lower than that of the wild strain. In the Δ45559 strain, the amount of TAG per medium was 1.1 times and the amount of TAG per cell was 1.5 times, as compared with the wild strain. Further, the TAG content and TAG conversion rate exceeded those of the wild strain. In the Δ4888HE strain, the amount of TAG per medium and the amount of TAG per cell were 0.7 times, as compared with the wild strain. Further, the TAG content and TAG conversion rate were lower than those of the wild strain. These results revealed that Transcript ID: 45559 gene deletion significantly improved lipid productivity in the oleaginous yeast L. starkeyi, and that Transcript ID: 4888 gene deletion significantly reduced lipid productivity in the oleaginous yeast L. starkeyi (FIG. 20).

Test Example 9. Analysis 2 of 4888 Gene-Disrupted Strain and High-Expression Strain and 45559 Gene-Disrupted Strain Next, in order to clarify the involvement of Transcript IDs: 4888 and 45559 in lipid synthesis and degradation pathways, comparative analysis of lipid synthesis pathway-related gene expression behavior of Transcript ID: 4888 gene high-expression strain (4888HE), Transcript ID: 4888 and 45559 gene-disrupted strains (Δ4888 and Δ45559), and the wild strain was performed on days 0, 2, 4, 6, and 8 during culture shown in FIGS. 19 and 20.

First, acyl-CoA synthesis pathway-related genes were analyzed (FIGS. 21 and 22). Since the acyl-CoA synthesis pathway is particularly highly expressed in the gene expression analysis of high lipid accumulation mutant strains, it is considered to be a gene cluster important for high lipid accumulation. As a result, compared with the wild strain, the 4888HE strain showed higher expression of ACL1 and 2, ACC1, and FAS1 and 2 on the second day after the start of culture immediately after entering the lipid accumulation period. Further, compared with the wild strain, the Δ45559 strain also showed higher expression of ACL1 and 2, ACC1, and FAS1 and 2 on the second day after the start of culture immediately after entering the lipid accumulation period. Conversely, compared with the wild strain, the Δ4888 strain showed significantly lower expression of ACL1 and 2, ACC1, and FAS1 and 2. That is, a close relationship between the acyl-CoA synthesis pathway-related genes ACL1 and 2, ACC1, and FAS1 and 2, and Transcript IDs: 4888 and 45559 became clear.

Subsequently, Kennedy pathway-related genes were analyzed (FIGS. 23 and 24). As a result, compared with the wild strain, the 4888HE strain showed higher expression of PAH1 and lower expression of DGK1, which encodes the enzyme that performs the reaction of phosphatidic acid from triacylglycerol, on the second and fourth days after the start of culture in the lipid accumulation period. Compared with the wild strain, the Δ4888 strain also showed lower expression of SCT1, SLC1, PAH1, and DGA1 and 2 on the second day after the start of culture in the lipid accumulation period. Compared with the wild strain, the Δ45559 strain showed higher expression of SCT1, SLC1, PAH1, and DGA1 and 2, and lower expression of DGK1 on the second day after the start of culture in the lipid accumulation period. That is, a close relationship between the Kennedy pathway-related genes SCT1, SLC1, PAH1, DGA1 and 2, and DGK1, and Transcript IDs: 4888 and 45559 became clear.

The invention claimed is:

1. A method comprising performing on a yeast at least one selected from the group consisting of the following (1) and (2) to increase or decrease lipid production capacity of the yeast:
   (1) increasing or decreasing the expression of a 115694 gene in the yeast, and
   (2) expressing, in the yeast, the 115694 gene having a mutation in a region between the transmembrane domain and the nuclear localization signal,
   wherein:
      the 115694 gene is a gene encoding a protein consisting of an amino acid sequence having at least 95% identity with an amino acid sequence represented by SEQ ID NO: 1,
      the mutation is at least one mutation selected from the group consisting of M1108T, F1115S, and K1119E of the amino acid sequence represented by SEQ ID NO: 1, and
      the yeast belongs to the genus *Lipomyces*.

2. The method according to claim 1, comprising performing on the yeast at least one selected from the group consisting of the (1A) and (2) to increase the lipid production capacity of the yeast:
   (1A) increasing the expression of the 115694 gene in the yeast, and
   (2) expressing, in the yeast, the 115694 gene having a mutation in a region between the transmembrane domain and the nuclear localization signal.

* * * * *